(12) United States Patent
Parikh et al.

(10) Patent No.: US 12,488,595 B2
(45) Date of Patent: Dec. 2, 2025

(54) OBJECT TRACK MANAGEMENT FOR AUTONOMOUS SYSTEMS AND APPLICATIONS

(71) Applicant: NVIDIA Corporation, Santa Clara, CA (US)

(72) Inventors: Parthiv Parikh, Santa Clara, CA (US); Mehmet K. Kocamaz, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 18/074,708

(22) Filed: Dec. 5, 2022

(65) Prior Publication Data

US 2024/0428596 A1    Dec. 26, 2024

(51) Int. Cl.
*G06V 20/58* (2022.01)

(52) U.S. Cl.
CPC .................... *G06V 20/58* (2022.01)

(58) Field of Classification Search
CPC ........ G06V 20/58; G06V 20/56; G06V 10/82; G06V 10/764; G06V 20/588; G06V 20/64; G06V 10/95; G06V 20/52; G06V 40/20; G06V 20/584; G06V 10/143; G06V 10/48; G06V 40/103; G06V 40/172; G06T 2207/10024; G06T 2207/20081; G06T 2207/20084; G06T 2207/30156; G06T 7/246; G06T 2207/10004; G08G 1/166; G08G 1/167; G08G 1/0104; G08G 1/017; G08G 1/096791; G08G 1/16; G08G 1/161; G08G 1/162; G08G 1/20; G08G 1/205; G08G 1/0112; G08G 1/0141; G08G 1/0175; G08G 1/052; G08G 1/096725; G08G 1/096766; G08G 1/165; G08G 1/0116; G08G 1/0967; G06N 5/02; G06N 3/045; G06N 3/048; G06N 3/08; G06N 20/00; G06N 3/02; G06N 3/0418; G06N 3/044; G06N 3/086; G06N 3/126; G06N 3/0464; G06N 7/01; H04W 4/40; H04W 72/541; H04W 76/14; H04W 4/44; Y02T 10/84; Y02T 10/40; Y02T 10/62; Y02T 10/72;

(Continued)

(56) References Cited

U.S. PATENT DOCUMENTS 11,210,537 B2   12/2021  Koivisto et al.
11,468,582 B2   10/2022  Yoo et al.

(Continued)

*Primary Examiner* — Nimesh Patel
(74) *Attorney, Agent, or Firm* — Iron Summit IP LLP

(57) ABSTRACT

In various examples, object track management for autonomous or semi-autonomous systems and applications is described herein. Systems and methods are disclosed that may limit the number of objects that are tracked based on one or more criteria. For instance, the number of objects that are tracked may be limited to a threshold number of objects when a number of detected objects exceeds a threshold. The systems and methods may use parameters associated with the detected objects to determine priority scores associated with the detected objects, and may then determine to only track the detected objects with the highest scores (e.g., high priority objects). As a result, latency and compute of the system may be reduced while still maintaining tracking with respect to safety-critical objects.

20 Claims, 30 Drawing Sheets

(58) Field of Classification Search
CPC ........ Y02T 90/16; B60T 7/22; B60T 2201/08;
B60T 2201/022; B60T 7/14; B60T
2201/087; B60T 2201/083; B60T
2201/089; B60T 2210/32; B60T 2201/02;
B60T 2201/10; B60W 2420/403; B60W
2555/60; B60W 2556/50; B60W
30/18163; B60W 40/08; B60W 60/00;
B60W 10/18; B60W 2050/143; B60W
2540/12; B60W 2754/30; B60W
2554/801; B60W 2554/00; B60W 30/16;
B60W 2554/4041; B60W 50/045; B60W
40/13; B60W 50/0097; B60W 50/085;
B60W 10/20; B60W 30/12; B60W 30/09;
B60W 60/0027; B60W 2554/406; B60W
50/00; B60W 2554/4029; B60W 30/10;
B60W 60/0053; B60W 2710/18; B60W
30/08; B60W 30/0956; B60Q 9/008;
B60Q 1/535; B60Q 1/543; B60Q 1/5447;
B60Q 5/006; B60Q 1/442; B60Q 1/08;
B60Q 1/143; B60Q 2300/42; B60Q
1/2615; B60Q 9/006; B60R 2300/105;
B60R 2300/302; B60R 2300/804; B60R
1/26; B60R 2300/8093; B60R 2300/806;
B60R 1/27; B60R 2001/1253; B60R 1/28;
B60R 2001/1215; B60R 2300/303; B60R
2300/607; B60R 1/24; B60R 11/04; B60R
2300/30; B60R 2300/301; B60R 2300/80;
B60R 2300/802; B60R 2300/8066; B60R
1/23; B60R 2300/108; B60R 2300/207;
B60R 2300/8073; B60R 2300/70; B60R
2300/8086; B60R 1/06; B60R 19/483;
B60R 2011/004

See application file for complete search history.

(56) References Cited

U.S. PATENT DOCUMENTS

| | | | |
|---|---|---|---|
| 2006/0111841 A1* | 5/2006 | Tseng | G06V 20/58 |
| | | | 340/436 |
| 2015/0266422 A1* | 9/2015 | Chundrlik, Jr. | G06V 20/588 |
| | | | 348/148 |
| 2019/0258251 A1 | 8/2019 | Ditty et al. | |
| 2019/0258878 A1* | 8/2019 | Koivisto | G06V 10/46 |
| 2020/0363815 A1* | 11/2020 | Mousavian | G06T 7/75 |
| 2021/0063578 A1 | 3/2021 | Wekel et al. | |
| 2021/0342609 A1 | 11/2021 | Smolyanskiy et al. | |
| 2022/0172606 A1* | 6/2022 | Pandya | G08G 1/052 |
| 2022/0253706 A1 | 8/2022 | Yang et al. | |
| 2023/0174110 A1* | 6/2023 | Wuu | G06V 10/764 |
| | | | 701/23 |

\* cited by examiner

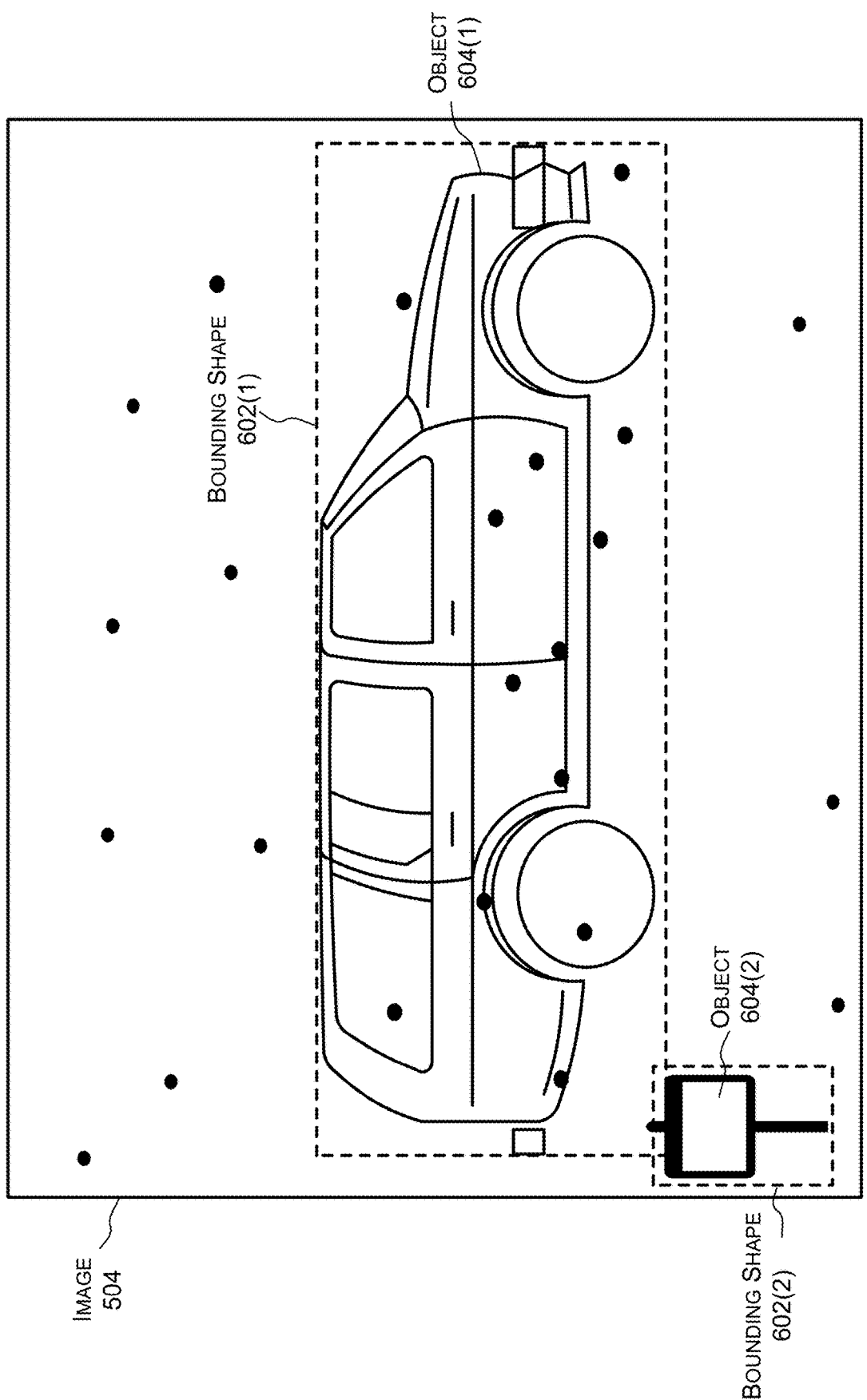

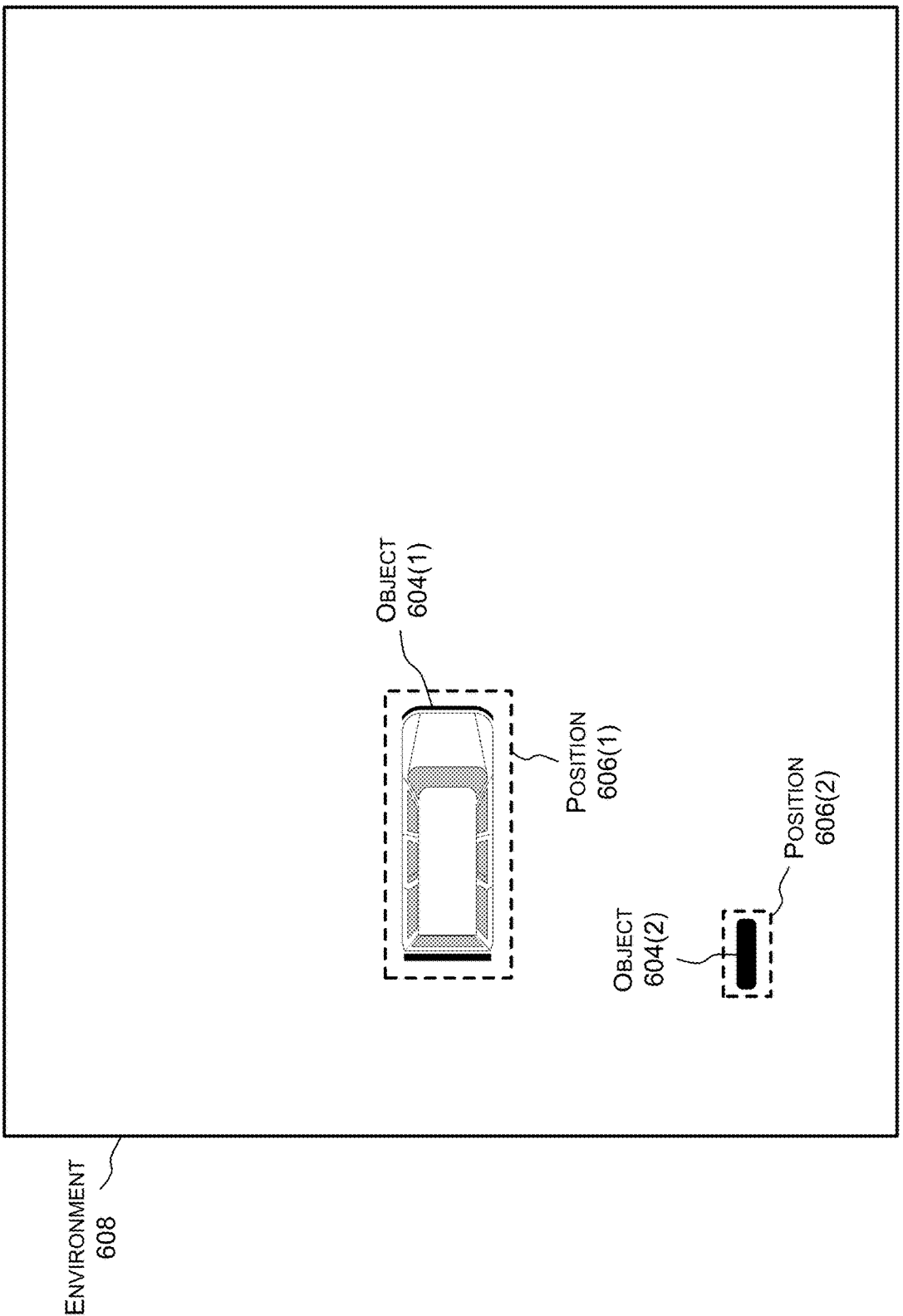

OBJECT TRACK MANAGEMENT FOR AUTONOMOUS SYSTEMS AND APPLICATIONS

BACKGROUND

Object tracking—such as camera-based object tracking—is an essential component of a surround camera vision (e.g., perception) pipeline of an autonomous and/or semi-autonomous machine. For example, software may be used to track detected objects as they appear in consecutive camera images—or other sensor data representations—by assigning them unique identification (ID) numbers. The accuracy of object tracking plays a critical role in robust distance-to-object and object velocity estimations and serves to mitigate missed and false positive object detections. By mitigating missed and false positive object detections, these errors are prevented from propagating into planning and control functions of the autonomous and/or semi-autonomous system that make various decisions about control of an ego-machine.

Multiple different approaches exist to track the objects in a surround vision system. These approaches may include, as a non-limiting example, early-level fusion type trackers which take multiple images (or other sensor data representations) from different sensors with different timestamps, learn and extract features in a deep neural network (DNN) framework, and output a tracked object list with corresponding three-dimensional (3D) signals (e.g., position, velocity, acceleration, shape, class, etc.). Another example of object trackers includes mid-level fusion type trackers, which take lists of detected objects from each camera image, fuse the detections, track the detections, and output a final list of the tracked objects. In such an example, where there are N cameras, N object lists may be input to the tracker. Each detected object may include an object shape and position in the two-dimensional (2D) sensor space (e.g., image space), or may include the position and shape in the 3D world (e.g., world space). Where the position and shape are represented in the 3D world, the objects are tracked in 3D. Another example includes late-level fusion type trackers that use lists of objects from each sensor data representation as input, where the objects in the list may have associated temporal information such as 3D object velocities and/or acceleration. In such examples, the objects may be tracked in each sensor independently to compute the temporal signals.

In many circumstances, these tracking approaches track a large number of objects detected using the, e.g., surround vision system. For instance, an autonomous and/or semi-autonomous vehicle may detect hundreds of objects using a surround vision system, such as other vehicles, pedestrians, animals, signs, structures, and/or so forth. However, tracking such a large number of objects may cause problems, such as with the systems of the autonomous and/or semi-autonomous vehicles. For example, tracking a large number of objects may require a large amount of the computing resources of the autonomous and/or semi-autonomous vehicle, which may reduce other functions of the autonomous and/or semi-autonomous vehicle. Additionally, tracking a large number of objects may increase the latency of the object tracker, which in turn further affects the planning and/or control functions of the autonomous and/or semi-autonomous vehicle.

Because of this, some tracking approaches may limit the number of tracks that are created for objects, such as to a threshold number of tracks, by replacing old tracks with new tracks or by not creating any new tracks once the threshold is reached. For instance, after the threshold number of tracks is reached, the tracking approaches may no longer create new tracks for newly detected objects. While limiting the number of tracks may help conserve computing resources and/or reduce latency, limiting the number of tracks may also result in not tracking a safety-critical object(s). For instance, if a tracking system for an autonomous and/or semi-autonomous vehicle reaches the threshold number of tracks, such that the tracking system no longer creates new tracks for newly detected objects, then the tracking system may not track a new object that is in a path or may enter a path of the autonomous and/or semi-autonomous machine.

SUMMARY

Embodiments of the present disclosure relate to object track management for autonomous and/or semi-autonomous systems and applications. Systems and methods are disclosed that may limit the number of objects that are tracked based on one or more criteria while maintaining tracks of more safety-critical objects. For instance, the number of objects that are tracked may be limited to a threshold number of objects, such as ten objects, fifty objects, one hundred objects, one thousand objects, and/or any other number of objects. In some embodiments, such as when a number of detected objects exceeds the threshold number of objects, the systems and methods may use parameters associated with the detected objects to determine priority scores associated with the detected objects. The parameters may include, but are not limited to, distances to the objects, directions associated with the objects, classifications associated with the objects, time-to-collision (TTC) estimations associated with the objects, and/or any other parameter. The systems and methods may then determine that the detected objects with the highest scores (e.g., high priority objects) are important for tracking while the detected objects with the lowest scores (e.g., low priority objects) are not as important for tracking. As a result, the lower priority objects may be the objects whose tracks are deleted (if already included in the tracked objects) or not added (if new).

In contrast to conventional systems, such as those described above, the current systems may determine which objects to track using criteria that increases the safety for vehicles or other machines. For instance, and as described above, the conventional systems may determine when a threshold number of tracks has been created and then cease creating new tracks for newly detected objects. However, this may cause safety problems for vehicles since the conventional systems may refrain from creating tracks for newly detected objects that are more important to safety than other tracked objects, such as objects that are located proximate to the vehicles and/or objects that are located along the paths of the vehicles. In contrast, the current systems, in some embodiments, use the criteria to identify high priority objects (e.g., objects that are more important or critical to track) and low priority objects (e.g., objects that are less important or critical to track), and then use those determinations to determine which objects to track. This way, the current systems are able to track each of the objects of higher priority while still allowing for a reduction in the amount of compute resources—relative to tracking every detected object—required to perform object tracking. As a result, the safety of the autonomous or semi-autonomous system is maintained while the draw on compute is managed.

BRIEF DESCRIPTION OF THE DRAWINGS

The present systems and methods for object track management for autonomous or semi-autonomous systems and applications are described in detail below with reference to the attached drawing figures, wherein:

FIG. 6A illustrates an example of determining a bounding shape(s) associated with an object(s) depicted in an image, in accordance with some embodiments of the present disclosure;

FIG. 6B illustrates an example of determining a position(s) associated with an object(s) within an environment, in accordance with some embodiments of the present disclosure;

DETAILED DESCRIPTION

Figure 1:
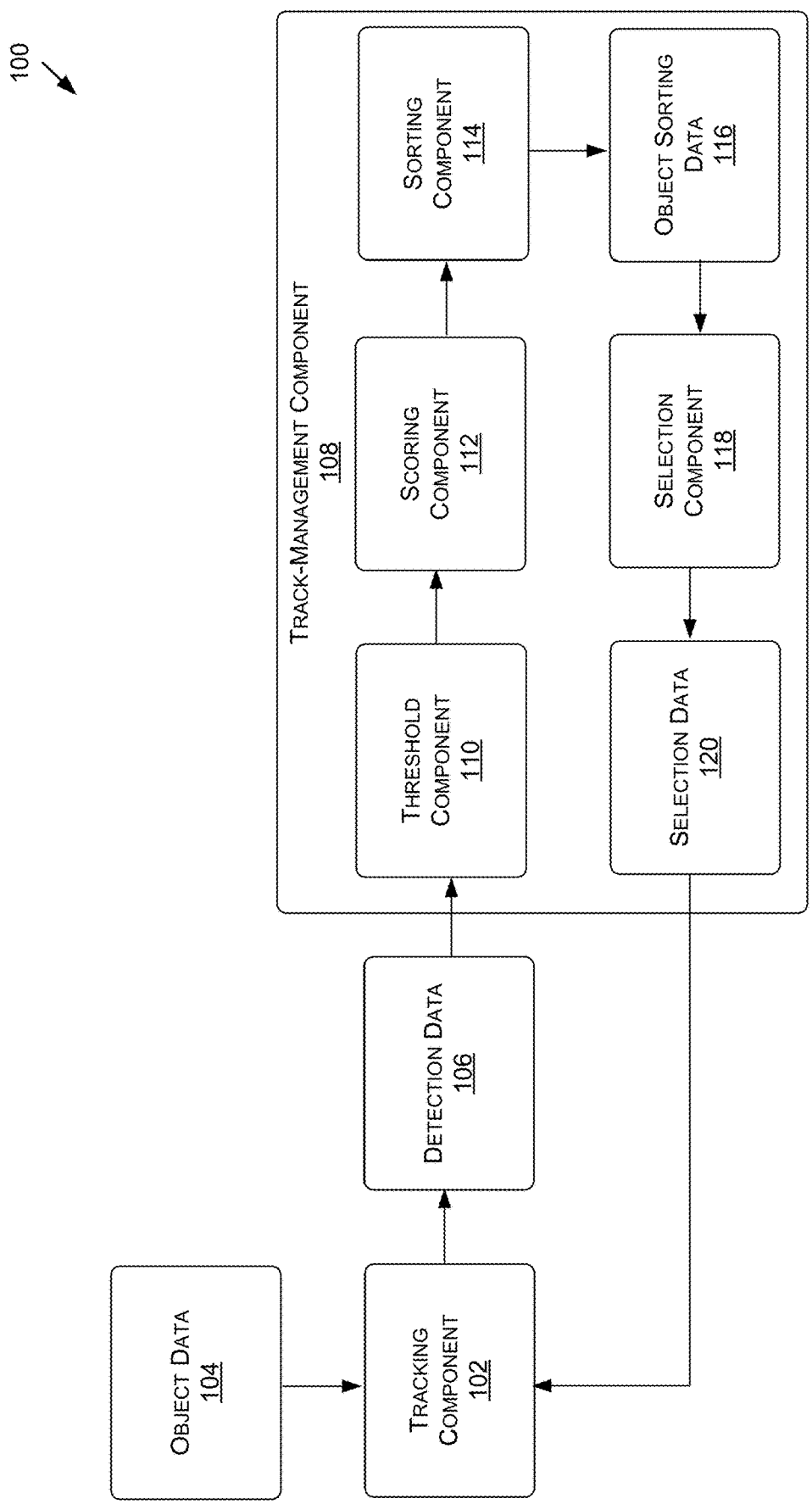
FIG. 1 illustrates an example data flow diagram for a process of managing object tracking for autonomous or semi-autonomous machines and applications, in accordance with some embodiments of the present disclosure.

Systems and methods are disclosed related to object track management for autonomous and/or semi-autonomous systems and applications. Although the present disclosure may be described with respect to an example autonomous or semi-autonomous vehicle or machine 1900 (alternatively referred to herein as "vehicle 1900" or "ego-machine 1900," an example of which is described with respect to FIGS. 19A-19D), this is not intended to be limiting. For example, the systems and methods described herein may be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to object tracking for autonomous and/or semi-autonomous machines, this is not intended to be limiting, and the systems and methods described herein may be used in augmented reality, virtual reality, mixed reality, robotics, security and surveillance, autonomous or semi-autonomous machine applications, and/or any other technology spaces where object tracking may be used.

A system(s) is disclosed that tracks objects, such as by using one or more two-dimensional (2D) tracking and/or three-dimensional (3D) tracking techniques. The system(s) may then generate data representing states of the tracked objects. In some examples, the states may be represented using 2D fields (e.g., 2D state information), 3D fields (e.g., 3D state information), and/or additional fields (e.g., additional state information). The 2D fields may include, but are not limited to, a list of bounding shapes, a list of vectors (e.g., transition vectors that indicate translations and/or scale changes associated with the objects, which is described in more detail herein), a list of feature descriptors (e.g., a list of feature points), and/or the like. Additionally, the 3D fields may include, but are not limited to, a list of object shapes (e.g., centroid, width, height, length), a list of object positions (e.g., coordinates, orientation, etc.), a list of velocities, a list of accelerations, a list of object fence/boundary points, and/or the like. Furthermore, the additional (or alternate) fields may include, but are not limited to, a list of identifiers associated with the objects, a list of object classifications (with associated probabilities, in some examples), a list of object states (e.g., stopped, moving, etc.), visibility/occlusion information, a list of confidences (variances in the locations, the velocity, the acceleration, and/or the like), timestamps associated with detections, and/or the like.

While tracking an object, the system(s) may update the state of the tracked object using state information associated with a detected object that corresponds to the tracked object. For instance, the system(s) may update at least the bounding shape, the vector, the feature descriptors, the object position, the object shape, the velocity, the acceleration, the fence/bounding points, the classification, the confidence(s), and/or the like using the state information associated with the detected object. The system(s) may then perform similar processes for one or more other objects (e.g., each object) being tracked by the system(s). As such, the system(s) may use 2D and/or 3D tracking to track the objects and then update the states associated with the tracked objects using 2D and/or 3D state information.

In some examples, and as described herein, the system(s) may use one or more criteria to limit the number of objects that are tracked. For example, the system(s) may use a component (also referred to as a "track-management component") that is configured to prioritize detected objects. In some examples, the track-management component may begin to prioritize the detected objects based on the number of detected objects satisfying (e.g., being equal to or greater than) a threshold number of objects. The threshold number of objects may include, but is not limited to ten objects, fifty objects, one hundred objects, one thousand objects, and/or any other number of objects. In some examples, the track-management component may begin to prioritize the detected objects based on the number of detected objects being close to (e.g., within a threshold number, such as five, ten twenty, etc.) the threshold number of objects. Still, in some examples, the track-management component may always prioritize the detected objects.

In some examples, the track-management component prioritizes the detected objects based at least on parameters associated with the detected objects. The parameters associated with a detected object may include, but are not limited to, a classification of the detected object (e.g., pedestrian, animal, building, vehicle, sign, curb, driving surface, etc.), a distance to the detected object from the vehicle, a direction to the detected object from the vehicle (e.g., whether the detected object is located along the path of the vehicle), a time-to-collision (TTC) associated with the detected object, a confidence associated with the detected object (e.g., a confidence indicating whether the detected object is an actual object), a velocity of the detected object, an acceleration of the detected object, a direction of travel of the detected object, a lane that the detected object is navigating, and/or any other parameter. In some examples, the system(s) determines one or more of the parameters using image data or more generally sensor data generated by one or more image sensors or other sensor types—such as a RADAR sensor(s), a LiDAR sensor(s), and/or the like.

In some examples, the track-management component may use values of parameters associated with the detected objects to determine scores for the detected objects, where the scores are associated with the priorities. When determining the scores, the track-management component may use an algorithm that weighs one or more of the parameters. For example, the algorithm may provide a first weight for a first parameter (e.g., the distances to the detected objects), a second weight for a second parameter (e.g., the classifications of the detected objects), a third weight for a third parameter (e.g., the directions to the detected objects), and/or so forth. By providing more weight to specific parameters over other parameters, the track-management component may prioritize detected objects that are safety-critical to the vehicle over detected objects that are not safety-critical. For example, a detected object that is located proximate to the vehicle and/or along a current path of the vehicle may be more safety-critical to the vehicle than a detected object that has a high velocity, but is located a far distance from the vehicle.

In some examples, the track-management component may use temporal information associated with one or more of the detected objects when determining the scores. For example, if a detected object includes an object that the system(s) has been tracking (e.g., already includes a current track), then the track-management component may further determine the score using one or more previous scores. For instance, the track-management may determine the score based on an average of the current score and one or more (e.g., a threshold number) of the previous scores. However, in other examples, the track-management component may not use temporal information when determining the scores such that each detected object, including newly detected objects and already tracked objects, are scored using the same criteria.

The track-management component may use the scores to generate data (e.g., data representing a list) that sorts the detected objects based on the scores. For example, the detected object with the highest score may be first, followed by the detected object with the second highest score, followed by the detected object with the third highest score, and/or so forth. The track-management component may then select detected objects for tracking based on the data. In some examples, the track-management component selects a threshold number of the detected objects, such as the threshold number of objects used to activate the track-management component. In some examples, the track-management component selects the threshold number of objects with the highest scores. For example, if the track-management component determines two hundred scores for two hundred detected objects, but the track-management component only selects one hundred detected objects for tracking, then the track-management component may select the one hundred detected objects with the one hundred highest scores.

In some examples, the track-management component may generate data representing the selected objects, data representing objects that need tracks created, and/or data representing objects that need current tracks to be terminated. The system(s) may then use this data to perform one or more processes. For a first example, if the track-management component selects a detected object that is new and not associated with a current track, then the system(s) may cause a new track to be created for the detected object. For a second example, if the track-management component does not select a detected object that is already associated with a current track, then the system(s) may terminate the current track associated with the detected object (although this process may be put on hold until an object is consistently not detected for a number of frames and/or a period of time). Still, for a third example, if the track-management component selects a detected object that is already associated with a current track, then the system(s) may update the state information for the current track associated with the detected object.

In some examples, the system(s) perform these processes of tracking the objects and/or updating the state information at various instances in time. For example, the system(s) may perform these processes every other second, one time per second, two times per second, ten times per second, thirty times per second, sixty times per second, and/or the like. In some examples, the frequency at which the system(s) performs these processes may be based on the sensor data, such as the frame rate associated with the sensor data. For a first example, the system(s) may perform these processes for each frame associated with each instance in time. For instance, if the frame rate associated with the sensor data is sixty frames per second, then the system(s) may perform these processes sixty times per second. For a second example, the system(s) may perform these processes for each other frame, each third frame, each fourth frame, and/or the like. For instance, and again if the frame rate associated with the sensor data is sixty frames per second, then the system(s) may perform these processes thirty times per second using every other frame.

The systems and methods described herein may be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, object tracking, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing object tracking, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

FIG. 1 illustrates an example data flow diagram for a process managing object tracking for autonomous or semi-autonomous systems and applications, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example autonomous vehicle 1900 of FIGS. 19A-19D, example computing device 2000 of FIG. 20, and/or example data center 2100 of FIG. 21.

The process 100 may include a tracking component 102 that is configured to track objects using object data 104. In some examples, the object data 104 may include sensor data, such as image data, RADAR data, LiDAR data, and/or the like, representing one or more objects. In some examples, the object data 104 may represent feature points associated with image data, which is described in more detail herein. Still, in some examples, the object data 104 may represent one or more states associated with a detected object(s) and/or the environment for which the detected object(s) was positioned, where the object data 104 is generated based on processing the sensor data. The state(s) associated with an object may include, but is not limited to, a bounding shape(s) indicating a location(s) of the object within an image(s) (e.g., each image that depicts the object), a shape (e.g., centroid, width, height, length) associated with the object, a position (e.g., coordinates, orientation, etc.) associated with the object, a velocity associated with the object, an acceleration associated with the object, fence/boundary points associated with the object, a classification associated with the object, a state (e.g., stopped, moving, etc.) associated with the object, visibility/occlusion information, and/or the like.

As will be described in more detail herein, the tracking component 102 may process the output data 104 using one or more components, such as a prediction component, an association component, an update component, a creation component, and/or a deletion component. Based on the processing, one or more of the components (e.g., the update component) may output detection data 106. In some examples, the detection data 106 may represent identifiers of objects detected by the tracking component 102, identifiers of objects currently being tracking by the tracking component 102, state information associated with the detected and/or tracked objects, and/or any other information associated with objects.

As described herein, the states may be represented using 2D fields (e.g., 2D state information), 3D fields (e.g., 3D state information), and/or additional fields (e.g., additional state information). The 2D fields may include, but are not limited to, a list of bounding shapes, a list of vectors (e.g., transition vectors that indicate translations and/or scale changes associated with the objects, which is described in more detail herein), a list of feature descriptors (e.g., a list of feature points), and/or the like. Additionally, the 3D fields may include, but are not limited to, a list of object shapes (e.g., centroid, width, height, length), a list of object positions (e.g., coordinates, orientation, etc.), a list of velocities, a list of accelerations, a list of object fence/boundary points, and/or the like. Furthermore, the additional (or alternate) fields may include, but are not limited to, a list of identifiers associated with the objects, a list of object classifications (with associated probabilities, in some examples), a list of object states (e.g., stopped, moving, etc.), visibility/occlusion information, a list of confidences (variances in the locations, the velocity, the acceleration, and/or the like), timestamps associated with detections, and/or the like.

The process 100 may include a track-management component 108 that is configured to use at least the detection data 106 to manage the tracking of objects. While the example of FIG. 1 illustrates the track-management component 108 as being separate from the tracking component 102, in other examples, and as described in more detail herein, the track-management component 108 may be included as part of the tracking component 102. For example, the track-management component 108 may be included as part of the update component, the creation component, and/or the deletion component of the tracking component 102.

In some examples, the track-management component 108 may continuously be processing the detection data 106 from the tracking component 102. In other examples, the track-management component 108 may process the detection data 106 from the tracking component 102 based on the occurrence of one or more events. For example, the track-management component 108 (or one or more components of the track-management component 108) may be deactivated (e.g., turned off, refrain from processing, refrain from providing power, etc.) when a number of detected objects does not satisfy (e.g., is below) a threshold number of objects and be activated (e.g., turned on, processing, receiving power, etc.) when the number of detected objects satisfies (e.g., is equal to or greater than) the threshold number of objects. In such examples, activating and/or deactivating the track-management component 108 may conserve computing resources, which is described in more detail herein.

As shown, the process 100 may include a threshold component 110 of the track-management component 108 processing at least the detection data 106. For example, the threshold component 110 may be configured to process the detection data 106 to determine whether a number of objects detected by the tracking component 102 satisfies (e.g., is equal to or greater than) the threshold number of objects and/or whether the number of objects does not satisfy (e.g., is less than) the threshold number of objects. As described herein, the objects may include both one or more objects that are currently being tracked by the tracking component 102 and one or more objects that are newly detected by the tracking component 102. Additionally, as described herein, the threshold number of objects may include, but is not limited to, ten objects, fifty objects, one hundred objects, one thousand objects, and/or any other number of objects.

In some examples, based on the threshold component 110 determining that the number of objects does not satisfy the threshold number of objects, the remaining components of the track-management component 108 may cease from performing any further processing of the detection data 106. This is because the tracking component 102 is able to generate a track for each of the detected objects (e.g., update the current tracks, generate new tracks for newly detected objects, etc.) without the total number of tracks exceeding the threshold number. However, based on the threshold component 110 determining that the number of objects satisfies the threshold number of objects, remaining components of the track-management component 108 may perform one or more of the following processes.

For instance, the process 100 may include a scoring component 112 of the track-management component 108 determining scores for the detected objects. As described herein, the scoring component 112 may determine a respective score for each detected objects, where the respective score indicates a priority for tracking the detected object. In some examples, the priority may be based on a level of risk for the vehicle. For example, the higher the score associated with an object, the greater the risk that the vehicle may collide with the object while navigating around the environment. Additionally, the lower the score associated with an object, the lower the risk that the vehicle may collide with the object while navigating around the environment.

The scoring component 112 may determine the scores using parameters associated with the detected objects. As described herein, the parameters associated with a detected object may include, but are not limited to, a classification of the detected object, a distance to the detected object from the vehicle, a direction to the detected object from the vehicle (e.g., whether the detected object is located along the path of the vehicle), a TTC to the detected object, a confidence associated with the detected object (e.g., a confidence indicating whether the detected object is an actual object), a velocity of the detected object, an acceleration of the detected object, a direction of travel of the detected object, a lane that the detected object is navigating, and/or any other parameter. In some examples, one or more of the parameters may be determined using image data. In some examples, one or more of the parameters may be determined using one or more other sensors, such as a RADAR sensor(s), a LiDAR sensor(s), and/or the like.

In some examples, the scoring component 112 may determine the score for a detected object using an algorithm that weighs one or more of the parameters. For example, the scoring component 112 may determine the score using the following algorithm:

$$\frac{\sum_{i=1}^{N}(x_i * w_i)}{\sum_{i=1}^{N} w_i} \quad (1)$$

In equation (1), x may include a value for the selected parameter and w may include the weight associated with the parameter. In some examples, equation (1) may weigh one or more parameters that are more important for the safety of the vehicle and/or the detected object higher as compared to one or more other parameters that are less important for the safety of the vehicle and/or detected object. For a first example, equation (1) may provide more weight to a parameter associated with a distance of the detected from the vehicle as compared to a parameter associated with a classification of the object. For a second example, equation (1) may provide more weight to a parameter associated with a direction of the detected object with respect to the vehicle (e.g., whether the detected object is located along the path of the vehicle) as compared to the parameter associated with a classification of the object.

In some examples, the scoring component 112 may use temporal information associated with one or more of the detected objects when determining the scores. For example, if a detected object includes an object that the tracking component 102 has been tracking (e.g., already includes a track), then the scoring component 112 may further determine the score using one or more previous scores. For instance, the scoring component 112 may determine the score based on an average of the current score and one or more (e.g., a threshold number) of the previous scores. However, in other examples, the scoring component 112 may not use temporal information when determining the scores such that each detected object, including newly detected objects and already tracked objects, are scored using the same criteria.

The process 100 may include a sorting component 114 of the track-management component 108 sorting the detected objects based at least on the score. For instance, the sorting component 114 may sort the detected objects in descending order based on the scores. For example, the sorting component 114 may sort the detected objects such that a detected object with the highest score is first, a detected object with a second highest score is second, a detected object with a third highest score is third, and/or so forth. The sorting component 112 may then generate sorting data 116 representing the sorting of the detected objects. For example, the sorting data 116 may represent a list of the detected objects that is arranged based on how the sorting component 114 sorted the detected objects (e.g., in descending order).

The process 100 may include a selection component 118 processing the object sorting data 116 and, based on the processing, selecting one or more detected objects for tracking and/or selecting one or more detected objects for not tracking. For example, the selection component 118 may select a threshold number of the detected objects that includes the highest scores for tracking and select the remaining objects for not tracking. In such an example, the threshold number of detected objects may include the same threshold number of objects used by the threshold component 110 or may include a different threshold number of detected objects.

In some examples, the selection component 118 may additionally, and/or alternatively, use a scoring threshold when selecting the detected objects. For instance, the selection component 118 may determine that detected objects that include a score that satisfies (e.g., is equal to or greater than) a threshold score may always be tracked. For a first example, if the threshold number of objects to track includes one hundred objects and the number of detected objects includes one hundred fifty objects, the selection component 118 may initially select the top one hundred detected objects with the highest one hundred scores to track. However, if one of the non-selected detected objects includes a score that still satisfies the threshold score, the selection component 118 may still select that detected object to track even though it would bring the total number of tracked objects above the threshold number of objects. The selection component 118 may perform such a process in order to ensure that every detected object that has a high enough score (equating to a potential safety criticality of the corresponding object) is tracked.

For a second example, if the number of detected objects includes one hundred fifty objects, the scoring component 112 may only select, for tracking, the detected objects that are associated with scores that satisfy the threshold score. In such an example, the selection component 118 may not use a threshold number of objects when selecting detected objects for tracking. Rather, the selection component 118 may select detected objects that pose some risk of safety to the vehicle to track while determining not to track detected objects that pose no risk of safety to the vehicle. While these are a few example techniques of how the selection component 118 may select detected objects for tracking, in other examples, the selection component 118 may use additional and/or alternative techniques.

Figure 2A:
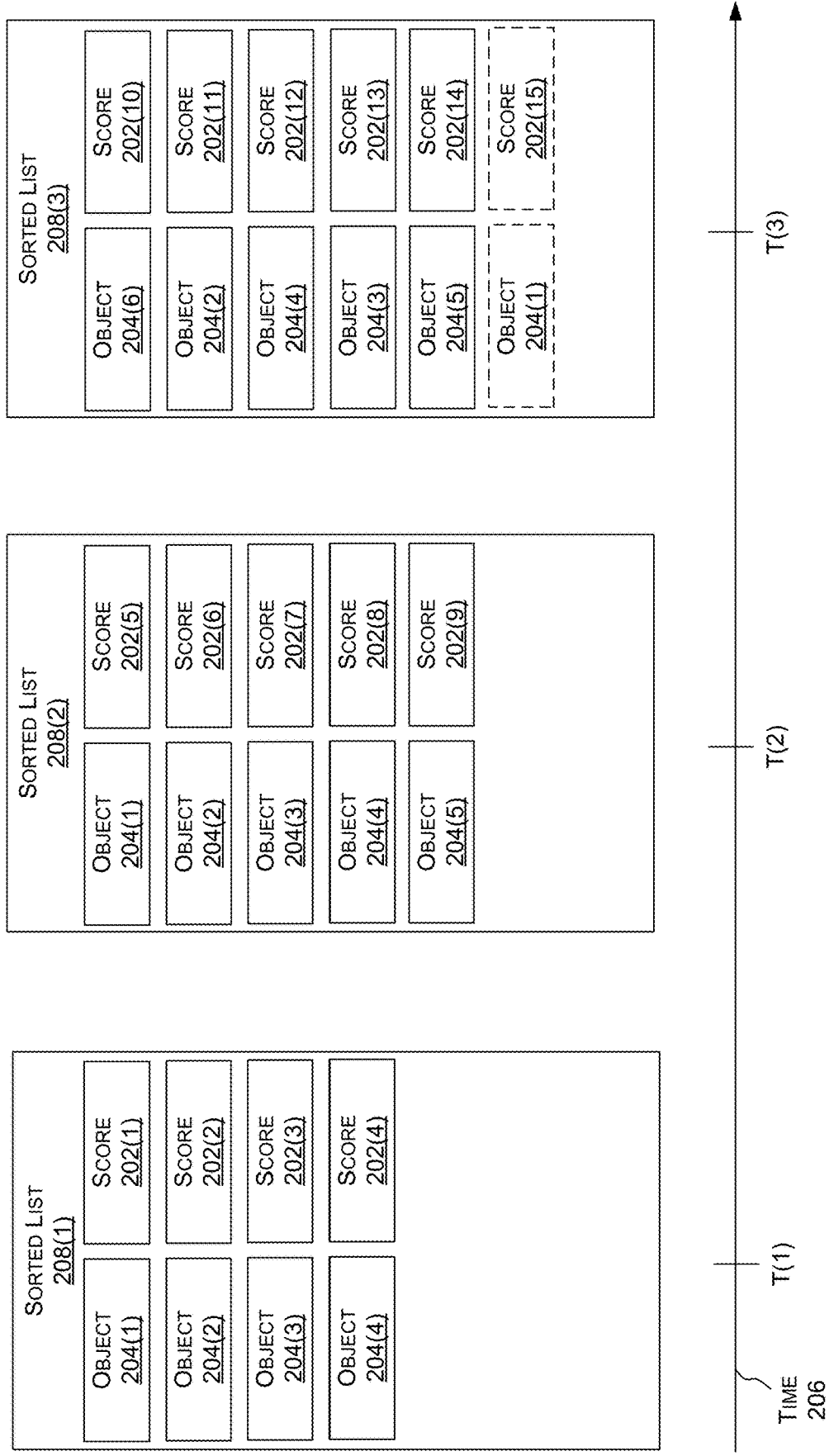
FIGS. 2A-2B illustrate an example of selecting detected objects for tracking, in accordance with some embodiments of the present disclosure.
Figure 2B:
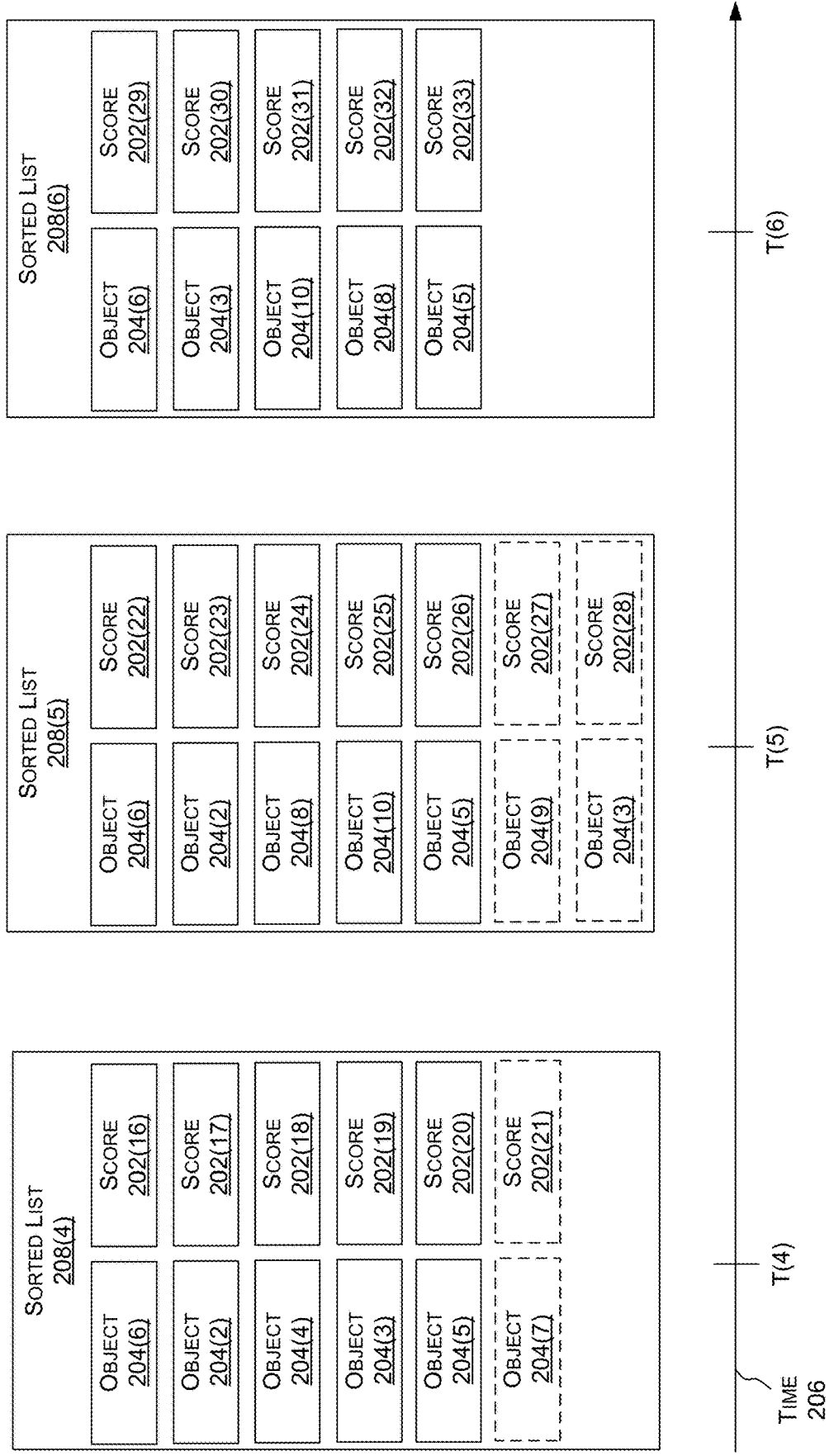

For instance, FIGS. 2A-2B illustrate an example of selecting detected objects for tracking, in accordance with some embodiments of the present disclosure. As shown, the scoring component 114 may determine scores 202(1)-(33) (also referred to singularly as "score 202" or in plural as "scores 202") for detected objects 204(1)-(10) (also referred to singularly as "object 204" or in plural as "objects 204") over a period of time 206. In the example of FIGS. 2A-2B, the threshold number of tracks that may be created is five tracks. However, in other examples, the threshold number of tracks may include any other number of tracks.

As shown, at a first time T(1), the sorting component 114 may generate a sorted list 208(1) that sorts the objects 204(1)-(4) detected by the tracking component 102 based on the scores 202(1)-(4) determined by the scoring component 112. For example, the object 204(1) may be associated with the highest score 202(1), the object 204(2) may be associated with the second highest score 202(2), the object 204(3) may be associated with the third highest score 202(3), and/or so forth. Since the total number of the objects 204(1)-(4) detected at the first time T(1) is less than the threshold number of tracks, the selection component 118 may select each of the objects 204(1)-(4) for tracking, which is represented by the solid lines.

Next, at a second time T(2), the sorting component 114 may generate a sorted list 208(2) that sorts the objects 204(1)-(5) detected by the tracking component 102 based on the scores 202(6)-(10) determined by the scoring component 112. For example, the object 204(1) may be associated with the highest score 202(5), the object 204(2) may be associated with the second highest score 202(6), the object 204(3) may be associated with the third highest score 202(7), and/or so forth. Since the total number of the objects 204(1)-(5) detected at the second time T(2) is equal to the threshold number of tracks, the selection component 118 may select each of the objects 204(1)-(5) for tracking, which is represented by the solid lines.

Next, at a third time T(3), the sorting component 114 may generate a sorted list 208(3) that sorts the objects 204(1)-(6) detected by the tracking component 102 based on the scores 202(10)-(15) determined by the scoring component 112. For example, the object 204(6) may be associated with the highest score 202(10), the object 204(2) may be associated with the second highest score 202(11), the object 204(4) may be associated with the third highest score 202(12), and/or so forth. Since the total number of the objects 204(1)-(6) detected at the third time T(3) is now greater than the threshold number of tracks, the selection component 118 may select each of the objects 204(2)-(6) for tracking, which is represented by the solid lines. Additionally, the selection component 118 may select the object 204(1) for not tracking, which is represented by the dashed lines.

Next, at a fourth time T(4), the sorting component 114 may generate a sorted list 208(4) that sorts the objects 204(2)-(7) detected by the tracking component 102 based on the scores 202(16)-(21) determined by the scoring component 112. For example, the object 204(6) may be associated with the highest score 202(16), the object 204(2) may be associated with the second highest score 202(17), the object 204(4) may be associated with the third highest score 202(18), and/or so forth. Since the total number of the objects 204(2)-(7) detected at the fourth time T(4) is again greater than the threshold number of tracks, the selection component 118 may select each of the objects 204(2)-(6) for tracking, which is represented by the solid lines. Additionally, the selection component 118 may select the object 204(7) for not tracking, or may not select the object 204(7) for tracking, which is represented by the dashed lines.

Next, at a fifth time T(5), the sorting component 114 may generate a sorted list 208(5) that sorts the objects 204(2)-(3), 204(5)-(6), and 204(8)-(10) detected by the tracking component 102 based on the scores 202(22)-(28) determined by the scoring component 112. For example, the object 204(6) may be associated with the highest score 202(22), the object 204(2) may be associated with the second highest score 202(23), the object 204(8) may be associated with the third highest score 202(24), and/or so forth. Since the total number of the objects 204(2)-(3), 204(5)-(6), and 204(8)-(10) detected at the fifth time T(5) is again greater than the threshold number of tracks, the selection component 118 may select each of the objects 204(2), 204(5)-(6), 204(8), and 204(10) for tracking, which is represented by the solid lines. Additionally, the selection component 118 may select each of the objects 204(3) and 204(9) for not tracking, which is represented by the dashed lines.

Next, at a sixth time T(6), the sorting component 114 may generate a sorted list 208(6) that sorts the objects 204(3), 204(5)-(6), 204(8), and 204(10) detected by the tracking component 102 based on the scores 202(29)-(33) determined by the scoring component 112. For example, the object 204(6) may be associated with the highest score 202(29), the object 204(3) may be associated with the second highest score 202(30), the object 204(10) may be associated with the third highest score 202(31), and/or so forth. Since the total number of the objects 204(3), 204(5)-(6), 204(8), and 204(10) detected at the sixth time T(6) is now equal to the threshold number of tracks, the selection component 118 may select each of the objects 204(3), 204(5)-(6), 204(8), and 204(10) for tracking, which is represented by the solid lines.

As shown by the example of FIGS. 2A-2B, the scoring component 112 may determine a new score 202 for objects 204 at each instance in time 206. For example, the scoring component 112 determined the score 202(1) for the object 204(1) at the first time T(1) and the score 202(5) for the object 204(1) at the second time T(2). In some examples, the scoring component 112 determines the scores 202 at each instance in time 206 since the priority changes based on the parameters associated with the object 204 changing over the period of time 206. For example, the object 204(1) may have posed a first safety risk to the vehicle at the first time T(1), which is represented by the score 202(1), and a second safety risk to the vehicle at the second time T(2), which is represented by the score 202(5). The first safety risk may be greater than the second safety risk, equal to the second safety risk, and/or less than the second safety risk.

As further illustrated in the example of FIGS. 2A-2B, objects 204 may be included in a sorted list 208(1)-(6) at a first instance in time 206, but then not included in a sorted list 208(1)-(6) at a second instance in time 206. For example, the object 204(4), which was selected for tracking at the fourth time T(4), is not included in the sorted list 208(5) at the fifth time T(5). This may be because the tracking component 102 did not detect the object 204(4) at the fifth time T(5). Additionally, an object 204 that is selected to not be tracked at a first instance in time 206 may still be included in a sorted list 208(1)-(6) at a second instance in time 206. For example, even though the object 204(3) was selected not be tracked at the fifth time T(5), the object 204(3) was again included in the sorted list 208(6) at the sixth time T(6). This is because the priority may have changed between the fifth time T(5) and the sixth time T(6). For instance, and in the example of FIG. 2A-2B, the object 204(3) is then selected for tracking at the sixth time T(6).

Referring back to the example of FIG. 1, the process 100 may include the selection component 118 generating and then outputting selection data 120. The selection data 120 may represent at least an identifier(s) of an object(s) that is selected for tracking, an identifier(s) of an object(s) that is not selected for tracking, an identifier(s) of an object(s) that needs a new track(s) created, an identifier(s) of an object(s) that needs a current track(s) terminated, and/or any other information associated with the objects. The selection component 118 may then send the selection data 120 to the tracking component 102.

The process 100 may include the tracking component 102 using the selection data 120 to perform one or more processes. For a first example, if the track-management component 108 selects a detected object that is new and is not associated with a current track, then the tracking component 102 may create a new track for the detected object. For a second example, if the track-management component 108 does not select a detected object that is already associated with a current track, then the tracking component 102 may terminate the current track associated with the detected object. Still, for a third example, if the track-management component 108 selects a detected object that is already associated with a current track, then the tracking component 102 may update the state information for the current track associated with the detected object.

Figure 3A:
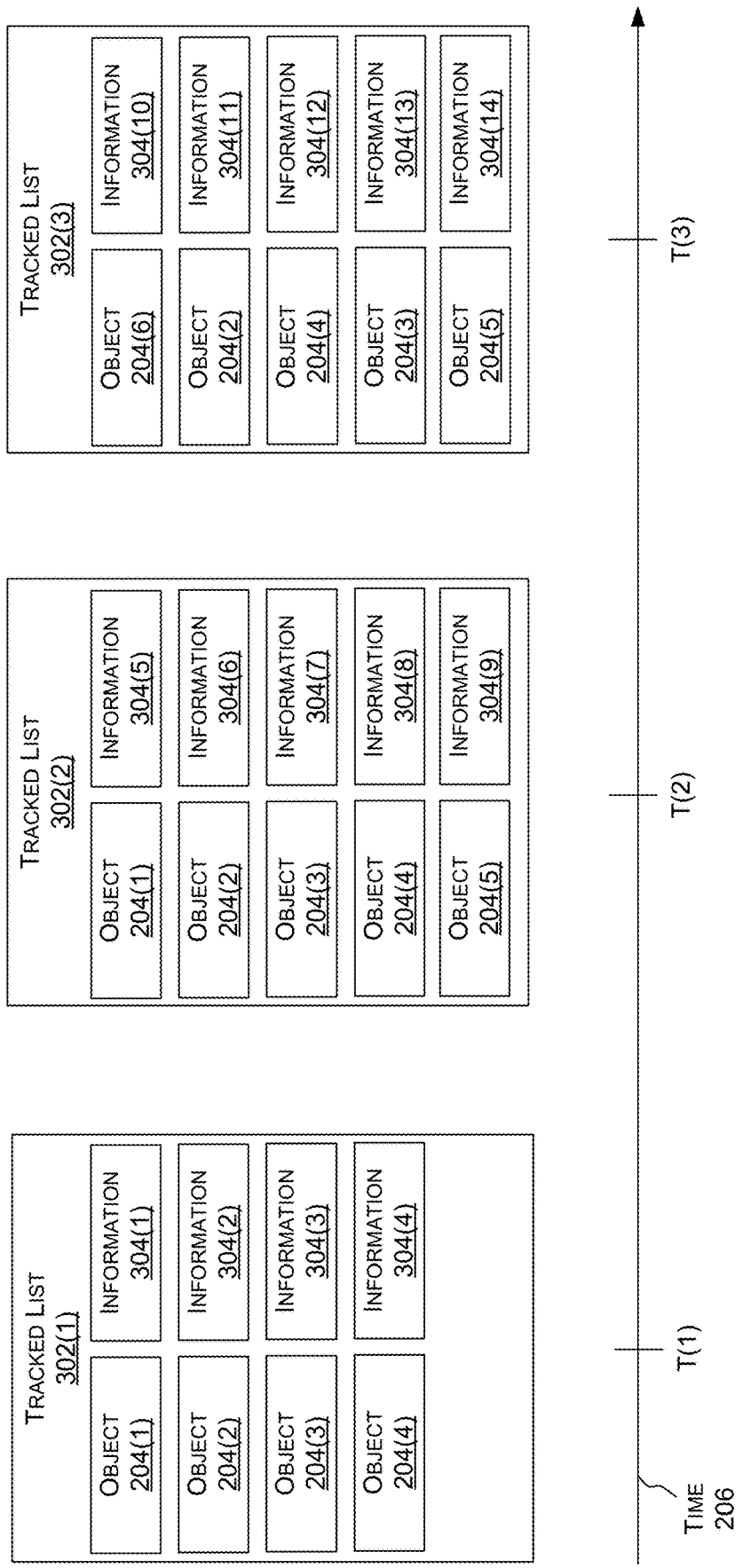
FIGS. 3A-3B illustrate an example of tracking objects, in accordance with some embodiments of the present disclosure.
Figure 3B:
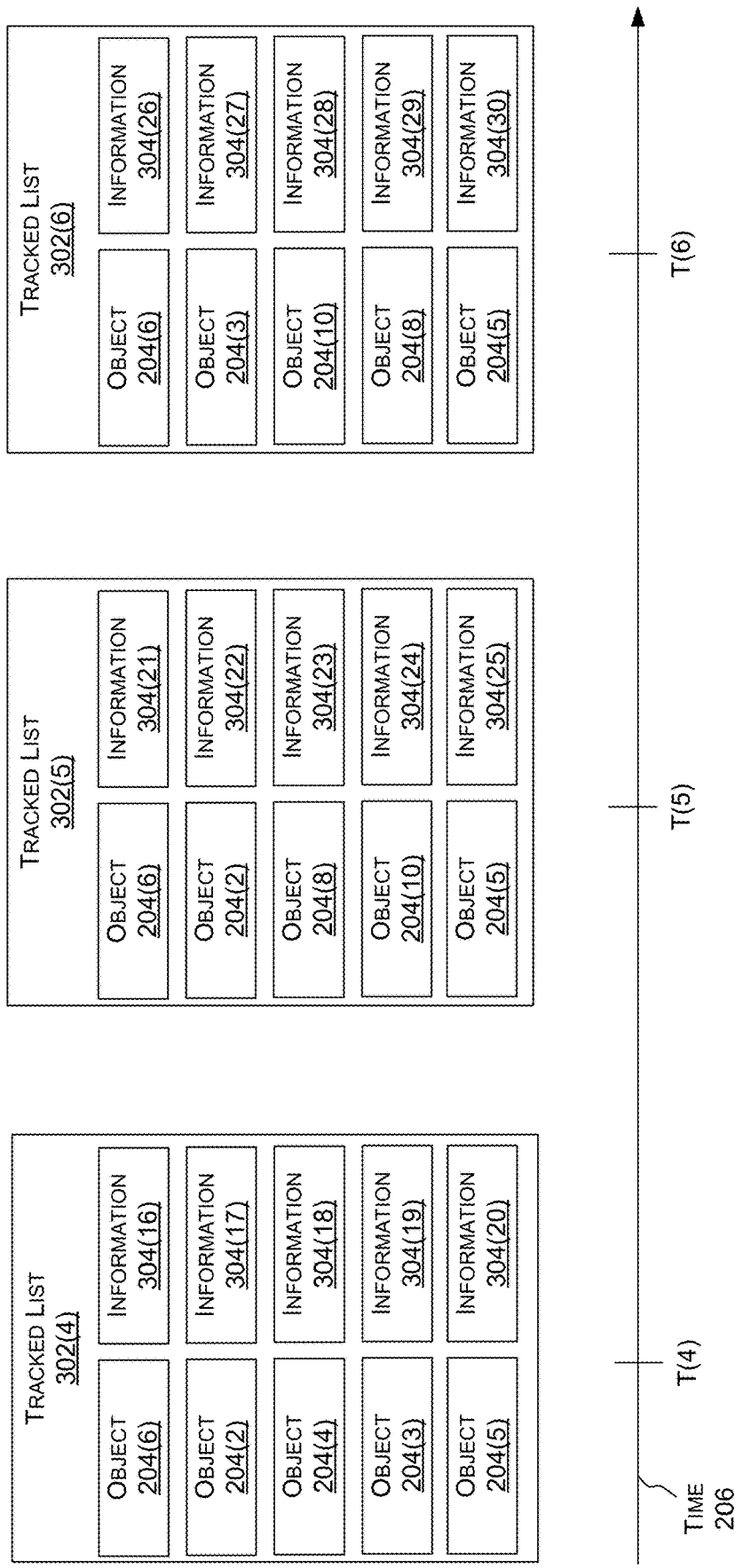

For instance, FIGS. 3A-3B illustrate an example of updating tracks for objects, in accordance with some embodiments of the present disclosure. As shown, at the first time T(1), the tracking component 102 may generate a tracked list 302(1) of objects that includes the objects 204(1)-(4) selected by the track-management component 108. The tracked list 302(1) further includes state information 304(1)-(4) for the objects 204(1)-(4). Next, at the second time T(2), the tracking component 102 may generate a tracked list 302(2) of objects that includes the objects 204(1)-(5) selected by the track-management component 108. The tracked list 302(2) further includes state information 304(5)-(9) for the objects 204(1)-(5).

Next, at the third time T(3), the tracking component 102 may generate a tracked list 302(3) of objects that includes the objects 204(2)-(6) selected by the track-management component 108. The tracked list 302(3) further includes state information 304(10)-(14) for the objects 204(2)-(6). Next, at the fourth time T(4), the tracking component 102 may generate a tracked list 302(4) of objects that includes the objects 204(2)-(6) selected by the track-management component 108. The tracked list 302(4) further includes state information 304(16)-(20) for the objects 204(2)-(6).

Next, at the fifth time T(5), the tracking component 102 may generate a tracked list 302(5) of objects that includes the objects 204(2), 204(5)-(6), 204(8), and 204(10) selected by the track-management component 108. The tracked list 302(5) further includes state information 304(21)-(25) for the objects 204(2), 204(5)-(6), 204(8), and 204(10). Next, at the sixth time T(6), the tracking component 102 may generate a tracked list 302(6) of objects that includes the objects 204(3), 204(5)-(6), 204(8), and 204(10) selected by the track-management component 108. The tracked list 302(6) further includes state information 304(26)-(30) for the objects 204(3), 204(5)-(6), 204(8), and 204(10).

As shown by the example of FIGS. 3A-3B, the tracking component 102 may continue to update the tracked list 302(1)-(6) using the identifiers of the objects 204 that are being tracked and the updated state information 304(1)-(30) for the objects 204.

Referring back to the example of FIG. 1, the tracking component 102 and/or the track-management component 108 may perform these processes of tracking the objects and/or updating the state information at various instances in time. For example, the tracking component 102 and/or the track-management component 108 may perform these processes one time per second, two times per second, ten times per second, thirty times per second, sixty times per second, and/or the like. In some examples, the frequency at which the tracking component 102 and/or the track-management component 108 performs these processes may be based on the sensor data, such as the frame rate associated with the sensor data. For a first example, the tracking component 102 and/or the track-management component 108 may perform these processes for each frame associated with each instance in time. For instance, if the frame rate associated with the sensor data is sixty frames per second, then the tracking component 102 and/or the track-management component 108 may perform these processes sixty times per second. For a second example, the tracking component 102 and/or the track-management component 108 may perform these processes for each other frame, each third frame, each fourth frame, and/or the like. For instance, and again if the frame rate associated with the sensor data is sixty frames per second, then the tracking component 102 and/or the track-management component 108 may perform these processes thirty times per second using every other frame.

Figure 4:
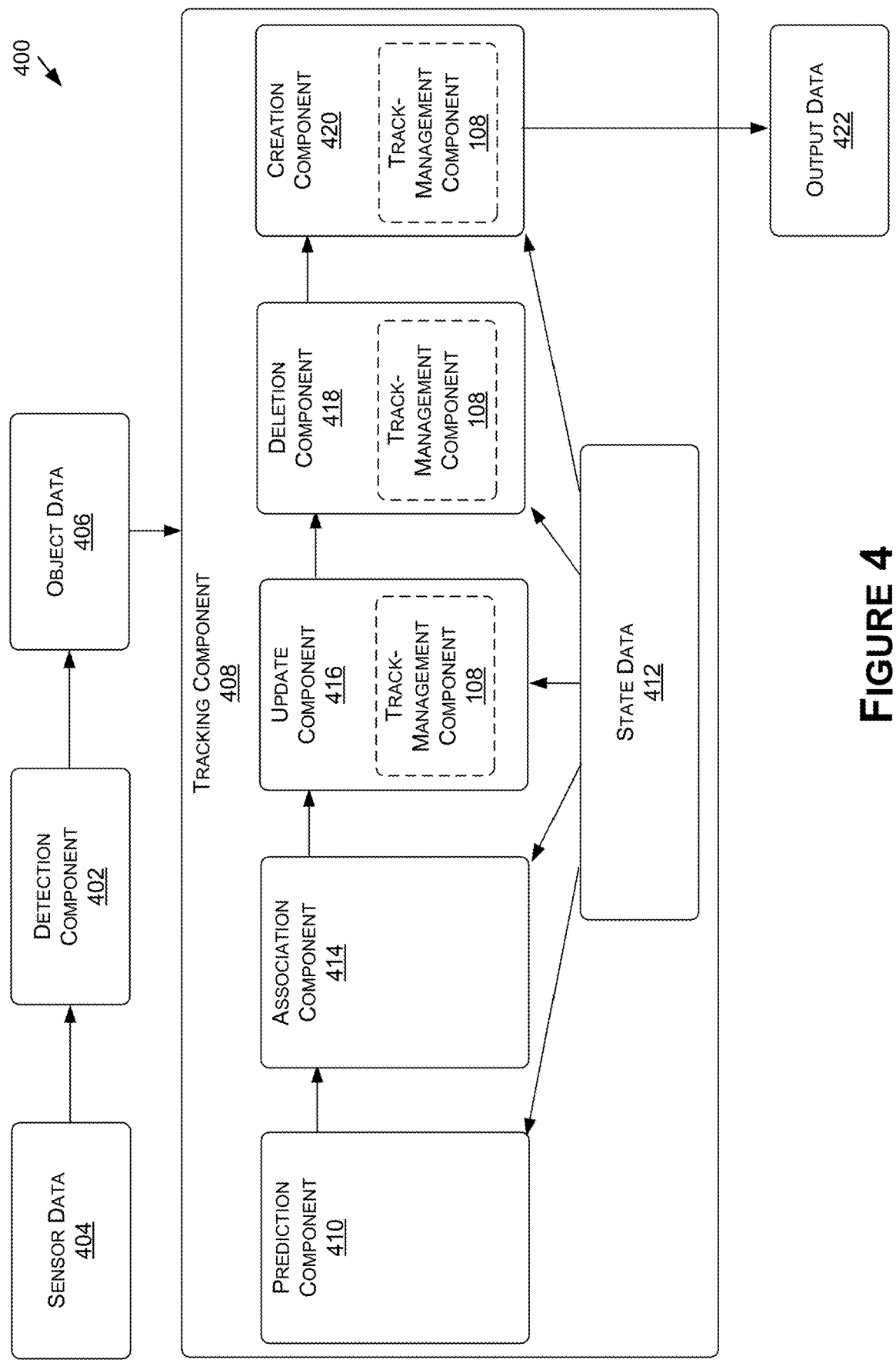
FIG. 4 illustrates an example data flow diagram for a process of jointly using two-dimensional (2D) and three-dimensional (3D) tracking for autonomous machines and applications, in accordance with some embodiments of the present disclosure.

As described herein, the tracking component 102 may include various components that perform various processes when tracking objects. For instance, FIG. 4 illustrates an example data flow diagram for a process of jointly using 2D and 3D tracking for autonomous (and semi-autonomous) systems and applications, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example autonomous vehicle 1900 of FIGS. 19A-19D, example computing device 2000 of FIG. 20, and/or example data center 2100 of FIG. 21.

The process 400 may include a detection component 402 that processes sensor data 404 in order to generate object data 406 (which may represent, and/or include, the object data 104). In some examples, the sensor data 404 may include image data representative of images depicting a field of view(s) of one or more cameras of a vehicle. In some examples, the image data may be captured in one format (e.g., RCCB, RCCC, RBGC, etc.), and then converted (e.g., during pre-processing of the image data) to another format. In some examples, the image data may be provided as input to a sensor data pre-processor (not shown) to generate pre-processed image data (discussed herein). Many types of images or formats may be used as inputs; for example, compressed images such as in Joint Photographic Experts Group (JPEG), Red Green Blue (RGB), or Luminance/Chrominance (YUV) formats, compressed images as frames stemming from a compressed video format such as H.264/Advanced Video Coding (AVC) or H.265/High Efficiency Video Coding (HEVC), raw images such as originating from Red Clear Blue (RCCB), Red Clear (RCCC) or other type of imaging sensor.

In some examples, before applying the sensor data 404, a sensor data pre-processor may use image data representative of one or more images (or other data representations) and load the sensor data 404 into memory in the form of a multi-dimensional array/matrix (alternatively referred to as tensor, or more specifically an input tensor, in some examples). The array size may be computed and/or represented as W×H×C, where W stands for the image width in pixels, H stands for the height in pixels, and C stands for the number of color channels. Without loss of generality, other types and orderings of input image components are also possible. Additionally, the batch size B may be used as a dimension (e.g., an additional fourth dimension) when batching is used. Batching may be used for training and/or for inference. Thus, the input tensor may represent an array of dimension W×H×C×B. Any ordering of the dimensions may be possible, which may depend on the particular hardware and software used to implement the sensor data pre-processor.

In some embodiments, a pre-processing image pipeline may be employed by the sensor data pre-processor to process a raw image(s) acquired by a sensor(s) (e.g., camera(s)) and included in the image data to produce pre-processed image data which may represent an input image(s) to the input layer(s) of the detection component 402. An example of a suitable pre-processing image pipeline may use a raw RCCB Bayer (e.g., 1-channel) type of image from the sensor and convert that image to a RCB (e.g., 3-channel) planar image stored in Fixed Precision (e.g., 16-bit-per-channel) format. The pre-processing image pipeline may include decompanding, noise reduction, demosaicing, white balancing, histogram computing, and/or adaptive global tone mapping (e.g., in that order, or in an alternative order).

Where noise reduction is employed by the sensor data pre-processor, it may include bilateral denoising in the Bayer domain. Where demosaicing is employed by the sensor data pre-processor, it may include bilinear interpolation. Where histogram computing is employed by the sensor data pre-processor, it may involve computing a histogram for the C channel, and may be merged with the decompanding or noise reduction in some examples. Where adaptive global tone mapping is employed by the sensor data pre-processor, it may include performing an adaptive gamma-log transform. This may include calculating a histogram, getting a mid-tone level, and/or estimating a maximum luminance with the mid-tone level.

Figure 5:
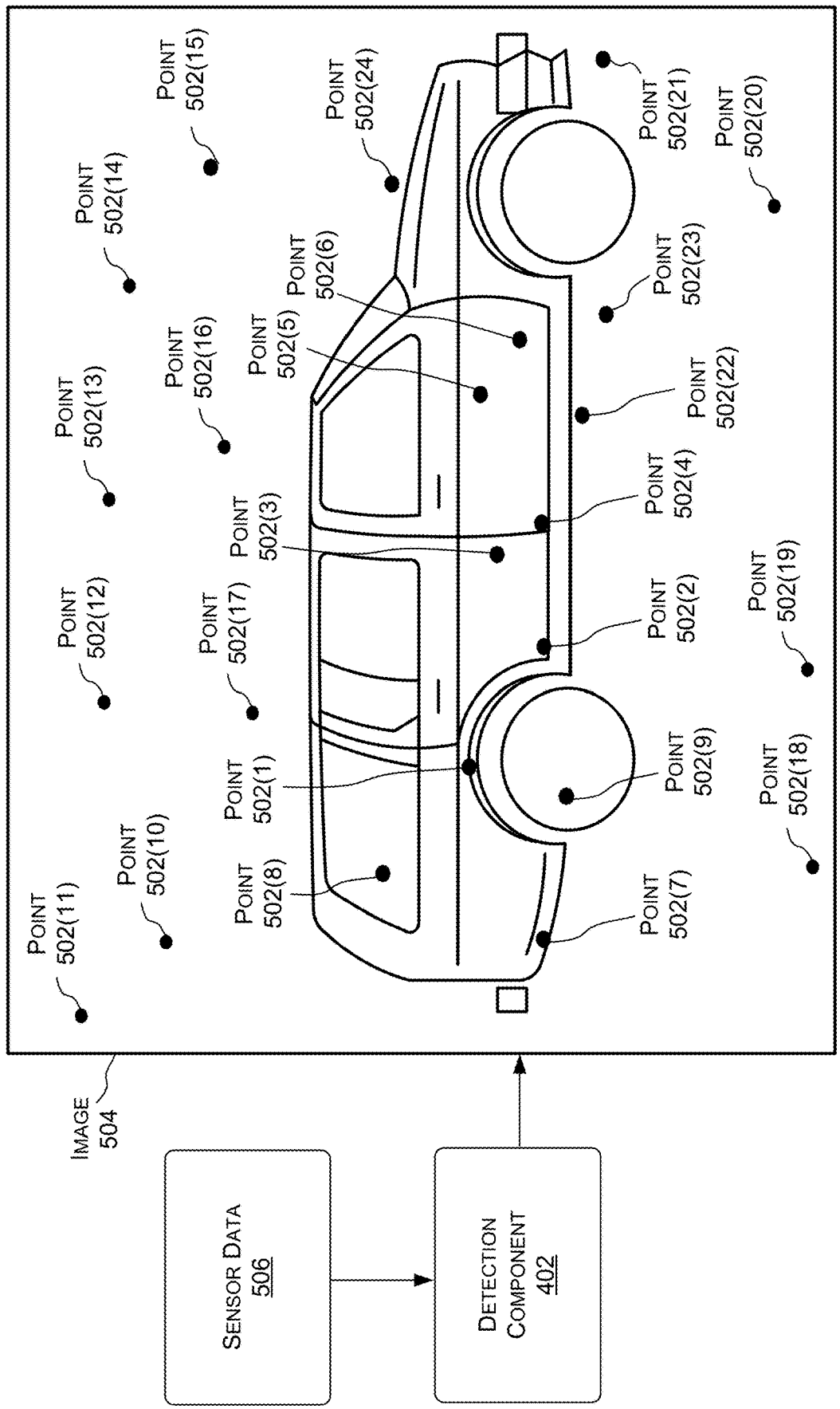
FIG. 5 illustrates an example of feature points associated with an object depicted in an image, in accordance with some embodiments of the present disclosure.

In some examples, the detection component 402 may process the sensor data 404 using a technique(s) in order to determine feature points. The technique(s) may include, but is not limited to, Harris Corner, Scale Invariant Feature Transform (SIFT), Speeded Up Robust Feature (SURF), Features from Accelerated Segment Test (FAST), Oriented FAST and Rotated BRIEF (ORB), and/or any other technique. For instance, FIG. 5 illustrates an example of feature points 502(1)-(24) (also referred to singularly as "feature point 502" or in plural as "feature points 502") associated an image 504 represented by the sensor data 506 (which may represent, and/or include, the sensor data 404), in accordance with some embodiments of the present disclosure. While the example of FIG. 5 illustrates twenty-four feature points 502 associated with the image 504, in other examples, images may be associated with any number of feature points (e.g., one feature point, five feature points, fifty feature points, one hundred feature points, one thousand feature points, etc.).

The detection component 402 may also include functionality to perform object detection, segmentation, and/or classification. For instance, the detection component 402 may output object data 406 indicating one or more states associated with a detected object(s) and/or the environment in which the detected object(s) is positioned. The state(s) associated with an object may include, but is not limited to, a bounding shape(s) indicating a location(s) of the object within an image(s) (e.g., each image that depicts the object), a shape (e.g., centroid, width, height, length) associated with the object, a position (e.g., coordinates, orientation, etc.) associated with the object, a velocity associated with the object, an acceleration associated with the object, fence/boundary points associated with the object, a classification associated with the object, a state (e.g., stopped, moving, etc.) associated with the object, visibility/occlusion information, and/or the like.

Additionally, in some examples, the output data 406 may indicate a probability associated with an object, such as a probability associated with a location (e.g., the bounding shape(s), the position, etc.) of the object, the classification associated with the object, and/or the like. In some examples, the detection component 402 may use a machine learning approach (e.g., scale-invariant feature transform (SIFT), histogram of oriented gradients (HOG), etc.) followed by a support vector machine (SVM) to classify objects depicted in images represented by the sensor data 404. Additionally, or alternatively, the detection component 402 may use a deep learning approach based on a convolutional neural network (CNN), a deep neural network (DNN), and/or any other type of neural network or deep learning model to classify objects depicted in images represented by the sensor data 506.

For instance, FIG. 6A illustrates an example of the detection component 402 determining bounding shapes 602(1)-(2) (also referred to singularly as "bounding shape 602" or in plural as "bounding shapes 602") that are associated with objects 604(1)-(2) (also referred to singularly as "object 604" or in plural as "objects 604") as depicted by the image 504, in accordance with some embodiments of the present disclosure. In some examples, the detection component 402 may determine the bounding shapes 602 using one or more object recognition and/or computer vision techniques. The object recognition and/or computer vision technique(s) may include, but are not limited to, SURF, FAST, FAST R-CNN, You Only Look Once (YOLO), Histogram of Oriented Gradients (HOG), Spatial Pyramid Pooling (SPP-net), and/or any other technique.

While the example of FIG. 6A illustrates the bounding shapes 602 as including rectangles, in other examples, one or more of the bounding shapes 602 may include any other shape (e.g., a circle, a triangle, a square, a hexagon, etc.). Additionally, while the example of FIG. 6A illustrates the detection component 402 determining the bounding shapes 602 associated with the objects 604 for a single image 504, in other examples, the detection component 402 may perform similar processes to determine respective bounding shapes 602 for more than one image that depicts the objects 604. For instance, if the sensor data 506 represents two images captured by two different cameras, where each image depicts the objects 604, then the detection component 402 may perform similar processes to determine the bounding shapes 602 associated with the objects 604 for each image.

FIG. 6B illustrates an example of the detection component 402 determining positions 606(1)-(2) (also referred to singularly as "position 606" or in plural as "positions 606") that are associated with the objects 604, in accordance with some embodiments of the present disclosure. As shown, the detection component 402 may determine the positions 606 of the objects 604 within a 3D environment 608, where the positions 606 are represented by the dashed rectangles. As described herein, the position 606(1) associated with the object 604(1) may indicate the coordinates, orientation, and/or the like of the object 604(1). Additionally, the position 606(2) associated with the object 604(2) may indicate the coordinates, orientation, and/or the like of the object 604(2).

Referring back to the example of FIG. 4, the process 400 may include a tracking component 408 (which may include, and/or represent, the tracking component 102) that tracks objects within an environment. As described herein, the tracking component 408 may be configured to track the objects using both 2D and 3D tracking. For instance, the tracking component 408 may include a prediction component 410 that processes state data 412 and/or object data 406 to predict new states of the objects. As described herein, the state data 412 may represent 2D fields, 3D fields, and/or additional fields associated with tracked objects. The 2D fields may include, but are not limited to, a list of bounding shapes, a list of vectors (e.g., transition vectors, where a transition vector represents a translation and/or a scale change associated with an object), a list of feature descriptors (e.g., a list of feature points), and/or the like. Additionally, the 3D fields include, but are not limited to, a list of object shapes (e.g., centroid, width, height, length), a list of object positions (e.g., coordinates, orientation, etc.), a list of velocities, a list of accelerations, a list of object fence/boundary points, and/or the like. Furthermore, the additional fields may include, but are not limited to, a list of identifiers associated with the tracked objects (e.g., where an identifier includes an alphabetic identifier, a numeric identifier, an alphanumeric identifier, and/or any other type of identifier that may identify a tracked object), a list of object classifications (e.g., vehicle, person, sign, structure, and/or any other type of classification), a list of object states (e.g., stopped, moving, etc.), visibility/occlusion information, a list of confidences (variances in the locations, the classification, the velocity, the acceleration, and/or the like described above), timestamps, and/or the like.

Figure 7A:
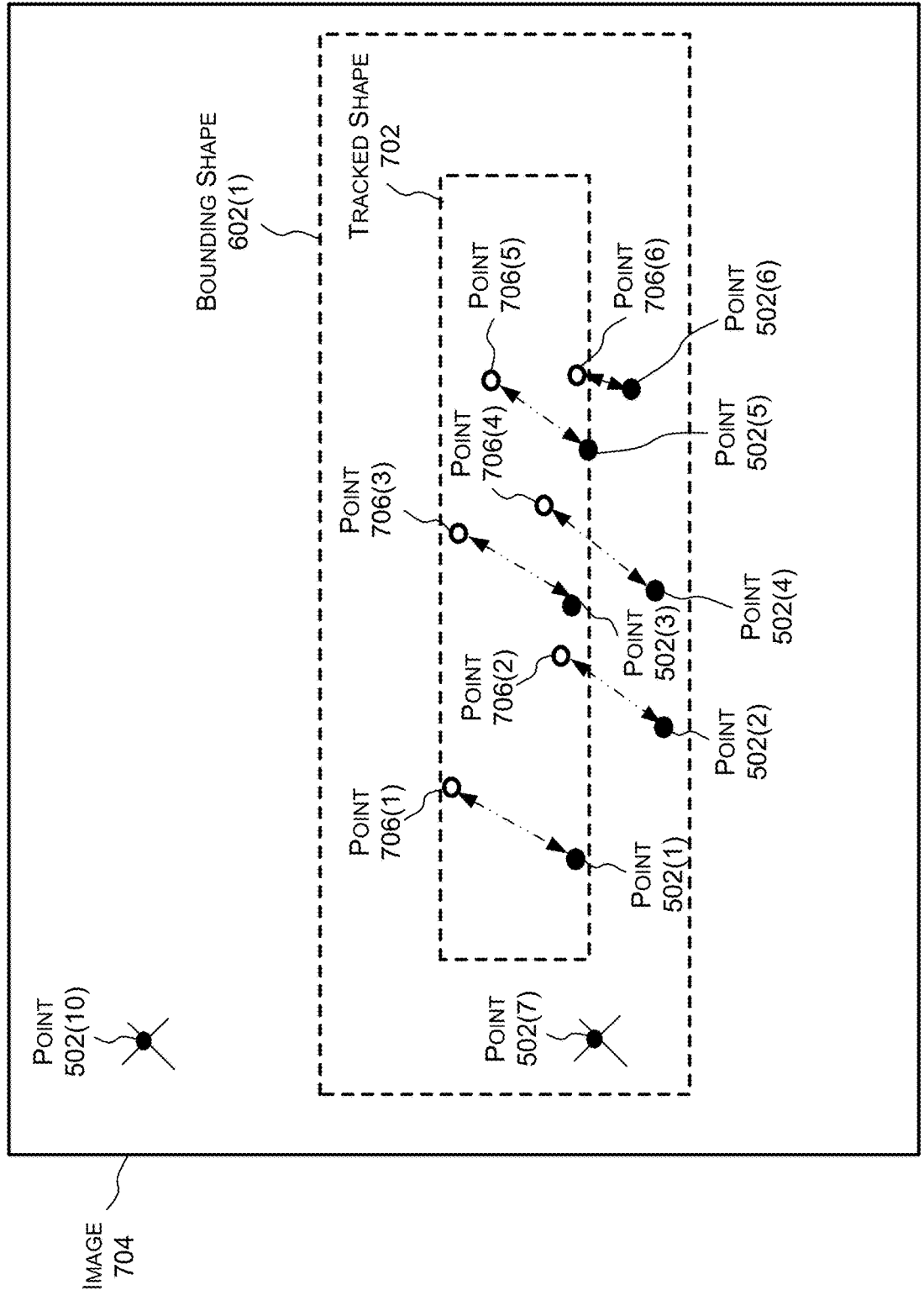
FIGS. 7A-7D illustrate an example of predicting 2D state information associated with a tracked object, in accordance with some embodiments of the present disclosure.
Figure 7B:
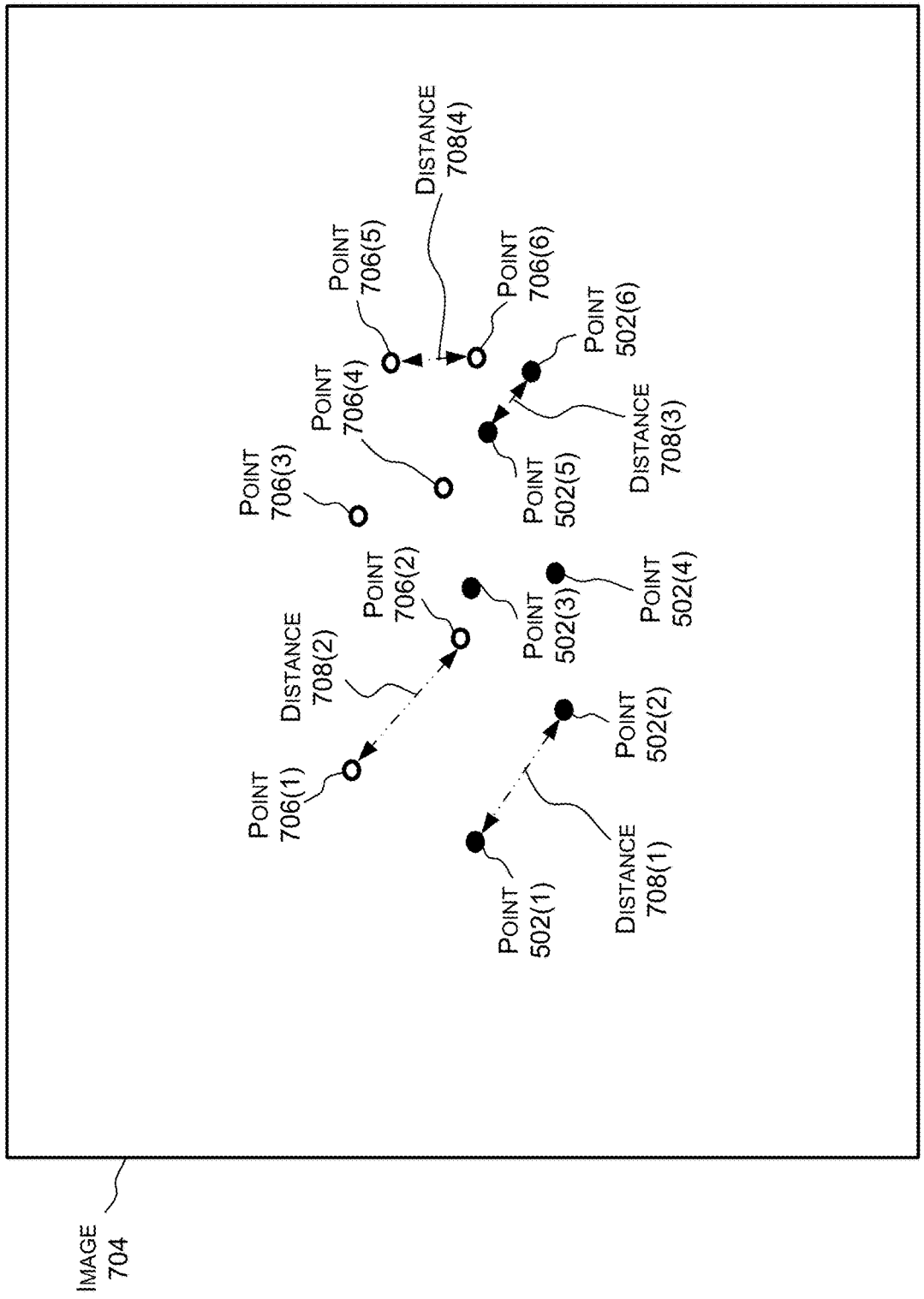

For instance, FIGS. 7A-7D illustrate an example of predicting 2D state information associated with the tracked object 604(1), in accordance with embodiments of the present disclosure. As shown by the example of FIG. 7A, the prediction component 410 may use the bounding shape 602(1) to determine a tracked shape 702 within a subsequent image 704 represented by sensor data (where the objects 604 are not illustrated in the subsequent image 704 in the examples of FIGS. 7A-7D for clarity reasons). In some examples, the prediction component 410 may determine the tracked shape 702 by shrinking the size of the bounding shape 602(1), such as by a scalar value. In some examples, the prediction component 410 may determine the tracked shape 702 (e.g., the scalar value) using one or more factors. As described herein, a factor may include, but is not limited to, a classification of the object, a distance to the object, a size of the object (e.g., as depicted by the image 504), and/or any other factors.

As shown, the tracked shape 702 includes feature points 706(1)-(6) (also referred to singularly as "feature point 706" or in plural as "feature points 706") that were determined for the image 704, such as by using a similar process as the feature points 502 (e.g., using the detection component 402). The prediction component 410 may then use the feature points 706 and the corresponding feature points 502 from the image 504 to predict the new state of the object 604(1). In some examples, the prediction component 410 may use at least a threshold number of feature points 706 to predict the new state of the object 604(1). The threshold number of feature points 706 may include, but is not limited to, two feature points 706, five feature points 706, ten feature points 706, fifty feature points 706, and/or any other number of feature points 706.

In the example of FIG. 7A, the prediction component 410 (and/or the detection component 402) may identify the feature points 502(1)-(6) that correspond to the feature points 706, using one or more of the processes described herein. For instance, and as shown, the prediction component 410 may determine that the feature point 706(1) corresponds to the feature point 502(1), the feature point 706(2) corresponds to the feature point 502(2), the feature point 706(3) corresponds to the feature point 502(3), the feature point 706(4) corresponds to the feature point 502(4), the feature point 706(5) corresponds to the feature point 502(5), and the feature point 706(6) corresponds to the feature point 502(6), which are indicated by the arrows in the example of FIG. 7A. In other words, the prediction component 410 may determine that the feature points 706(1)-(6) from the image 704 are respectively the same feature points as the feature points 502(1)-(6) from the image 504.

As also illustrated by the example of FIG. 7A, by using the tracked shape 702 to determine the feature points 706, the prediction component 410 may not consider feature points 502 that are associated with other objects and/or the background when predicting the new state of the object 604(1). For example, the prediction component 410 may not consider the feature point 502(10) (and/or similarly the feature points 502(11)-(24), which are not illustrated for clarity reasons), which is indicated by the "X", when predicting the new state of the object 604(1). Additionally, the prediction component 410 may not consider at least some of the feature points 502 that are associated with the object 604(1). For example, the prediction component 410 may not consider the feature point 502(7) (and/or similarly the feature points 502(8)-(9), which are not illustrated for clarity reasons), which is also indicated by an "X", when predicting the new state of the object 604(1). However, the prediction component 410 is still able to predict the new state of the object 604(1) with the remaining feature points 502(1)-(6) that are associated with the object 604(1).

The prediction component 410 may then determine scalar changes for pairs of the feature points 502, 706. For instance, and as illustrate by the example of FIG. 7B, and for a pair of feature points 502(1)-(2), 706(1)-(2), the prediction component 410 may determine a first distance 708(1) between the feature point 502(1) and the feature point 502(2) and a second distance 708(2) between the feature point 706(1) and the feature point 706(2). The prediction component 410 may then determine the scalar change associated the pair of feature points 502(1)-(2), 706(1)-(2) based on the first distance 708(1) and the second distance 708(2). For instance, in some examples, the prediction component 410 may determine the scalar change associated with the pair of feature points 502(1)-(2), 706(1)-(2) by taking the difference between the second distance 708(2) and the first distance 708(1). The prediction component 410 may then perform similar processes to determine a scalar change(s) associated with another pair(s) of the feature points 502, 706. For instance, and in some examples, the prediction component 410 may determine scalar changes for each pair of feature points 502, 706.

Figure 7C:
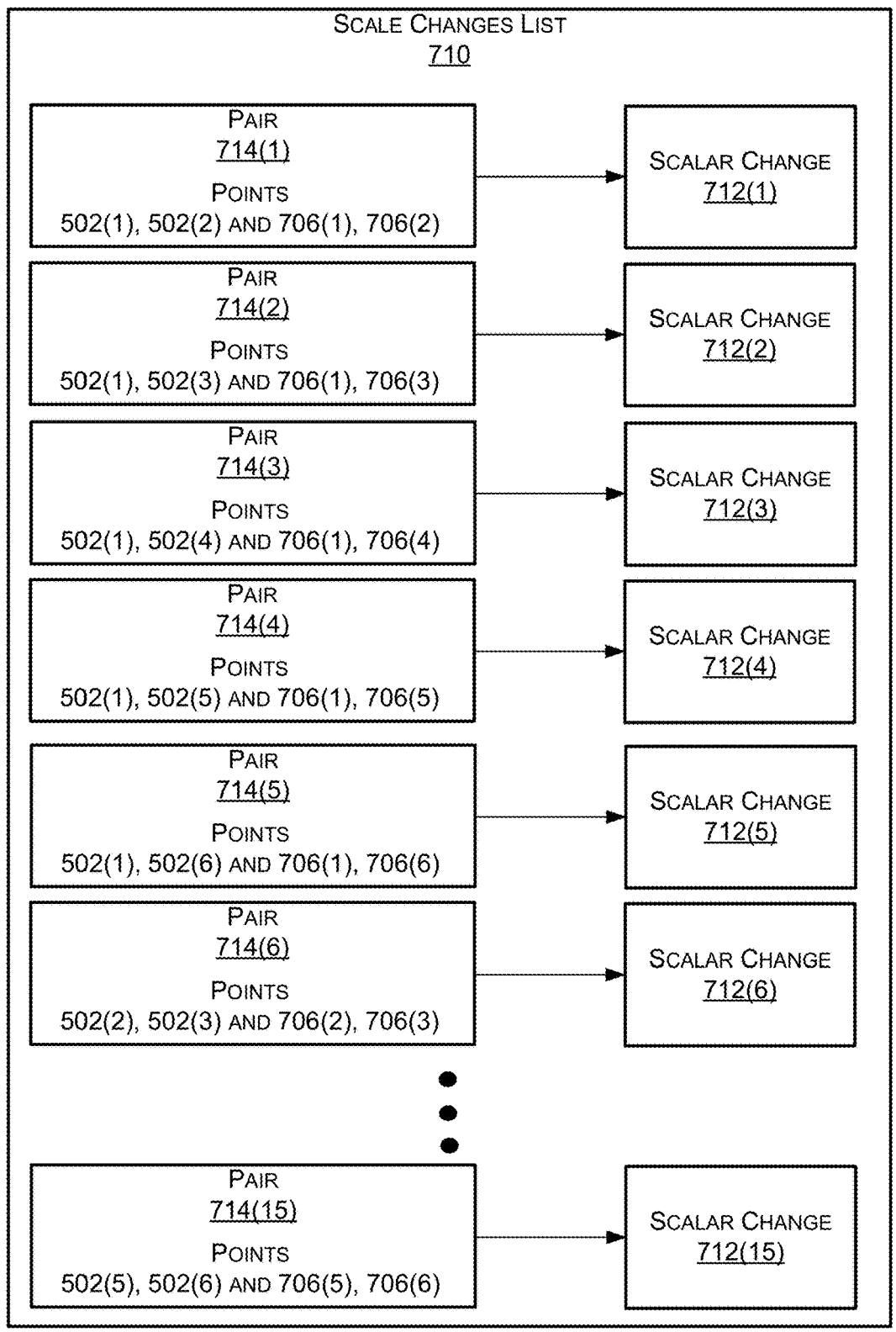

In some examples, and as shown by the example of FIG. 7C, the prediction component 410 may generate a list 710 of scalar changes 712(1)-(15) (also referred to singularly as "scalar change 712" or in plural as "scalar changes 712") associated with pairs 714(1)-(15) (also referred singularly as "pair 714" or in plural as "pairs 714") of the feature points 502, 706. In the example of FIG. 7C, the prediction component 410 determined fifteen scalar changes 712 since there are fifteen different combinations for the pairs 714 of the feature points 502, 706. However, in other examples, and as described herein, the prediction component 410 may determine a scalar change(s) 712 for less than all of the combinations of the pairs 714 of the feature points 502, 706. The prediction component 410 may then use the list 710 to determine a final scalar change associated with the object 604(1).

In some examples, before and/or while determining the final scalar change, the prediction component 410 may initially filter out a pair(s) 714 of the feature points 502, 706 that is associated with a distance(s) that does not satisfy (e.g., is less than) a threshold distance. For instance, and referring back to the example of FIG. 7B, the prediction component 410 may determine a third distance 708(3) between the feature point 502(5) and the feature point 502(6) and/or a fourth distance 708(4) between the feature point 706(5) and the feature point 706(6). The prediction component 410 may then determine that the third distance 708(3) and/or the fourth distance 708(4) is less than the threshold distance. As such, the prediction component 410 may not have initially determined the scalar change 712(15) associated with the pair 714(15) that includes the feature points 502(5)-(6), 706(5)-(6) and/or may filter out the scalar change 712(15) when determining the final scalar change.

The prediction component 410 may then determine the final scalar change using the scalar changes 712 (and/or the remaining scalar change(s) 712 after filtering). As described herein, the prediction component 410 may determine the final scalar change as the average of the scalar changes 712, the median of the scalar changes 712, the mode of the scalar changes 712, and/or using one or more additional and/or alternative techniques. The prediction component 410 may then determine a translation associated with the object 604(1) between the image 504 and the image 704 using the final scalar change.

For example, the prediction component 410 may determine one or more translations associated with one or more of the feature points 502(1)-(6). To determine a translation associated with a feature point 502, the prediction component 410 may multiply the feature point 502 by the final scalar change and then subtract that result by the location of the corresponding feature point 706. For instance, and for the feature point 502(1), the prediction component 410 may determine the translation by multiplying the feature point 502(1) by the final scalar change and then subtracting that result by the location of the feature point 706(1) that corresponds to the feature point 502(1). In some examples, the prediction component 410 may perform similar processes to determine a translation(s) for one or more (e.g., all) of the other feature points 502(2)-(6). The prediction component 410 may then use the translation(s) to determine a final translation associated with the object 604(1). As described herein, the prediction component 410 may determine the final translation as the average of the translation(s), the median of the translation(s), the mode of the translation(s), and/or using one or more additional and/or alternative technique.

Figure 7D:
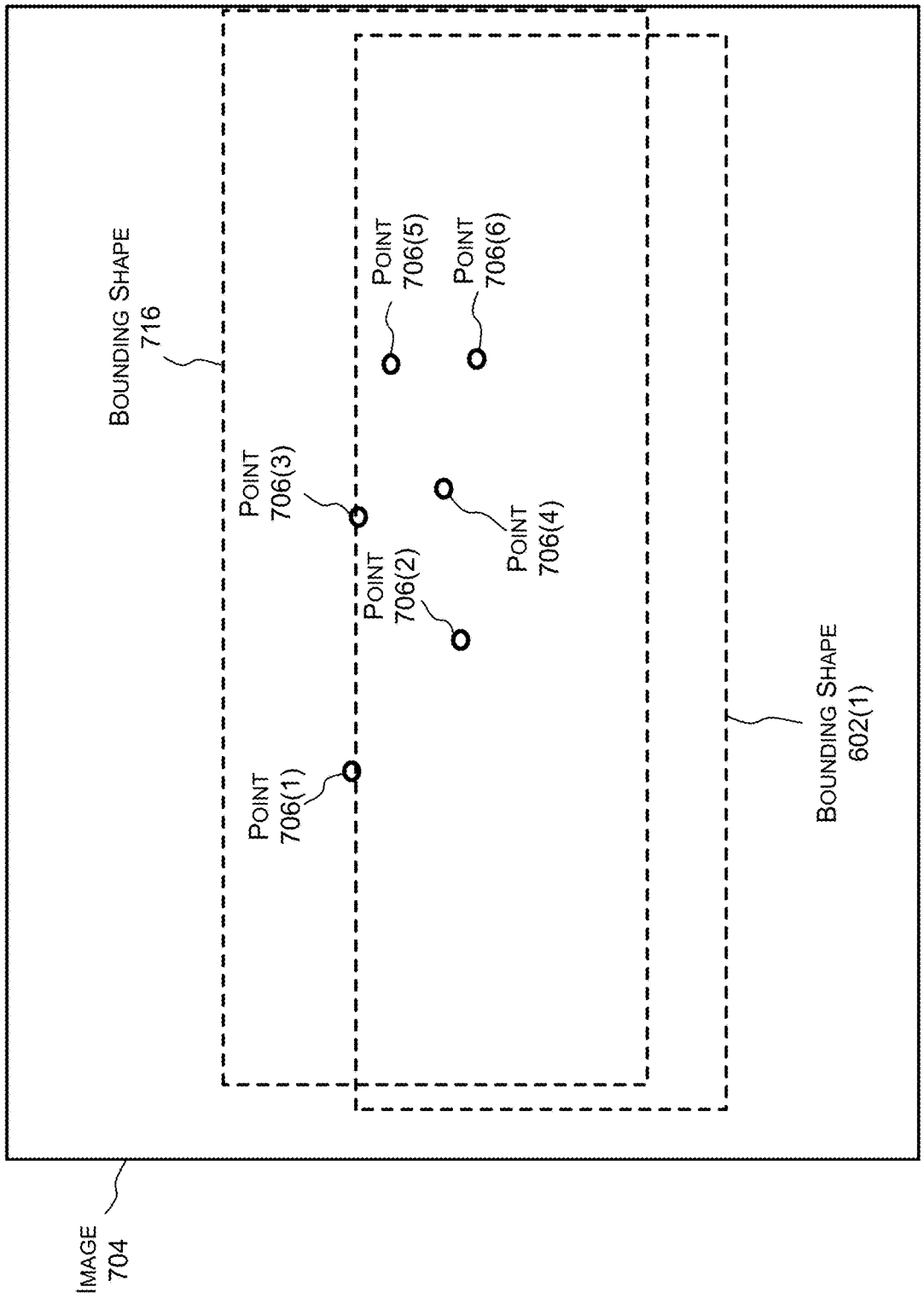

As illustrated by the example of FIG. 7D, the prediction component 410 may use the bounding shape 602(1) and a transition vector, where the transition vector includes at least the final scalar change and the final translation, to determine a new bounding shape 716 (e.g., a predicted and/or estimated location) for the object 604(1) depicted by the image 704. In some examples, the new bounding shape 716 may be determined by, at least in part, applying the state transition vector, scale_change and translation_xy, on the old position of the bounding shape 602(1) (at time t−1) using, e.g., equation (1) below:

$$Bbox(t) = Bbox(t - b) * \text{scale\_change} + \text{translation\_xy} \quad (2)$$

In equation (2), Bbox (t−b) may correspond to the bounding shape 602(1) and Bbox (t) may correspond to the bounding shape 716.

For an example of applying equation (1), the prediction component 410 may determine the predicted bounding shape 716 by multiplying the bounding shape 602(1) by the final scalar change and then adding the final translation. In other words, the prediction component 410 may determine the size of the predicted bounding shape 716 as the size of the bounding shape 602(1) multiplied by the final scalar change. The prediction component 410 may then determine the location for the predicted bounding shape 716 by moving the predicted bounding shape 716 in the x-direction and the y-direction that is associated with the final translation. In the example of FIGS. 7A-4D, the predicted bounding shape 716 may represent the predicted and/or estimated state of the object 604(1).

In some examples, the prediction component 410 may perform similar processes for one or more other tracked objects, such as the object 604(2). Additionally, in some examples, the prediction component 410 may perform similar processes for more than one image that depicts and/or potentially depicts the object 604(1). For instance, if the object 604(1) is within the respective field of view (FOV) of two different cameras, then the prediction component 410 may perform similar processes to determine a predicted location (e.g., a bounding shape) associated with the object 604(1) for a respective image captured by each camera.

Referring back to the example of FIG. 4, to predict 3D state information associated with tracked objects, the prediction component 410 may predict the 3D state information using a filter (e.g., a linear or nonlinear Kalman filter). In some examples, each such prediction may use a motion model. For example, the object centroid may be computed using a constant acceleration motion model or a constant turn-rate model—e.g., CTRA (for vehicles), or constant velocity (e.g., for pedestrians). The orientation of the objects in 3D space may be computed using either orientation as the state, or orientation and an orientation derivative. For orientation as a state, a constant orientation may be used for a motion model. For orientation and an orientation derivative, a constant orientation velocity model may be used. If a well-tuned CTRA (or other constant turn-rate model) is used for the bounding shape in 3D (e.g., a cuboid), the orientation filter may not be necessary. The width, height, and/or length may not require a prediction (as these values may not change). In some examples, covariances corresponding to these values may be increased to not become too confident after several updates. Alternatively, there may be a minimum allowed covariance for the extent. The fence/shape may be computed by assuming rigid body motion using centroid velocity and yaw rate.

Figure 8:
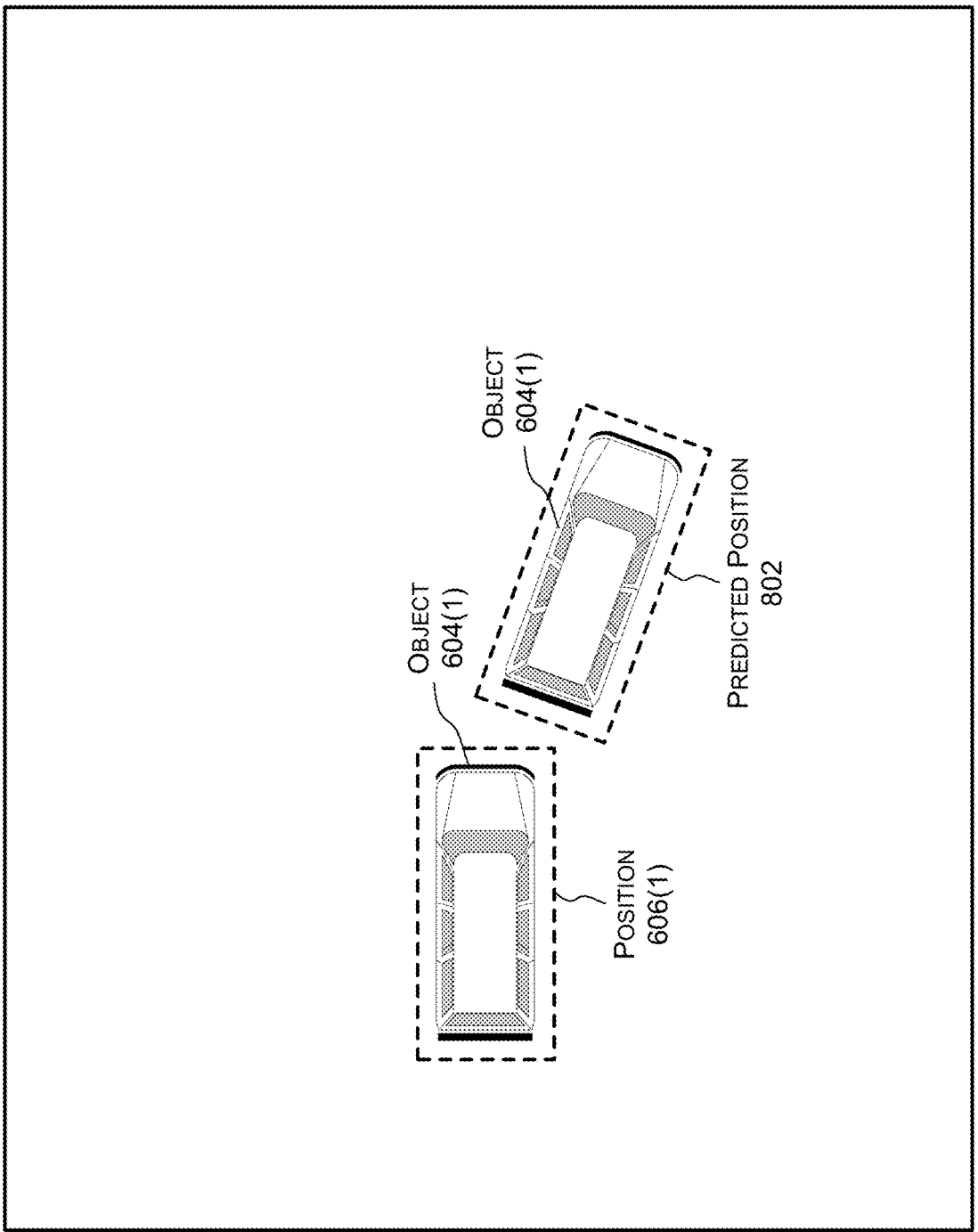
FIG. 8 illustrates an example of predicting 3D state information associated with a tracked object, in accordance with some embodiments of the present disclosure.

For instance, FIG. 8 illustrate an example of predicted 3D state information associated with the tracked object 604(1), in accordance with some embodiments of the present disclosure. As shown, the state data 412 may represent a shape (e.g., centroid, width, height, length) of the object 604(1), the position 606(1) (e.g., coordinates, orientation, etc.) of the object 604(1) within the environment 608, a velocity of the object 604(1), an acceleration of the object 604(1), fence/boundary points of the object 604(1), and/or the like. The prediction component 410 may then use the state data 412 to determine a predicted position 802 associated with the object 604(1) at an instance of time that the image 704 was generated. In some examples, the prediction component 410 may further use the state data 412 to determine additional state information, such as a predicted shape, velocity, acceleration, and/or the like of the object 604(1).

Referring back to the example of FIG. 4, the process 400 may include an association component 414 of the tracking component 408 determining associations between objects detected within images and tracked objects. In some examples, the association component 414 may use a cost function to determine costs associated with the tracked objects. The cost function may include two parts, where a first part (e.g., a 2D part) is associated with 2D tracking and a second part (e.g., a 3D part) is associated with 3D tracking. The 2D part of the cost function may consider all images where the object Is depicted. Additionally, the 2D part of the cost function may include different terms, such as a weighted average of IOU scores of bounding shapes (e.g., in all images), a weighted distance between the feature descriptors (e.g., in all images), and/or weighted IOU set scores using tracked feature points (e.g., in all images). For the weighted IOU set scores, the number of features in the bounding shape at time t−1 may be counted, and the number of tracked features from the first count that are in the bounding shape at time t may be counted. The score from the first count and the second count may then be normalized to determine the weighted IOU set scores.

The 3D part of the cost function may use one or more features. For example, a position (or range) difference may be used. To account for varying track and measurement uncertainties, scaling may be used. One option for scaling may be to use the uncertainty of the prediction and the measurement noise—e.g., by using a Mahalanobis distance. Another option for scaling is to use the method described herein with respect to gating. The azimuth difference (e.g., in rig coordinates) is another feature that may be used for the 3D part of the cost function. Scaling may be used for the Azimuth difference as well.

The multiple terms for the 2D and 3D parts may then be combined into a single value, first for 2D and 3D separately, and then jointly. One option is to perform a weighted summation of the costs. For 3D, the Mahalanobis distance can be formulated on the joint position and azimuth difference, to give one value. The final cost function may then use a (e.g., constant) weight term between 2D and 3D parts, such as in equation (3), below:

$$\text{Cost}(t, m) = \beta(2D\_\text{part}) + (1 - \beta)(3D\_\text{part}) \quad (3)$$

where t is a tracked object, m is a measurement, and β is a (potentially constant) weight. To improve the association results, the weight for the total cost can be varied as a function of factors that affect the accuracy of the 2D and 3D information. Such factors include the distance to the measurement/object, the azimuth angle of the measurement/object, and/or the occlusion status.

Figure 9:
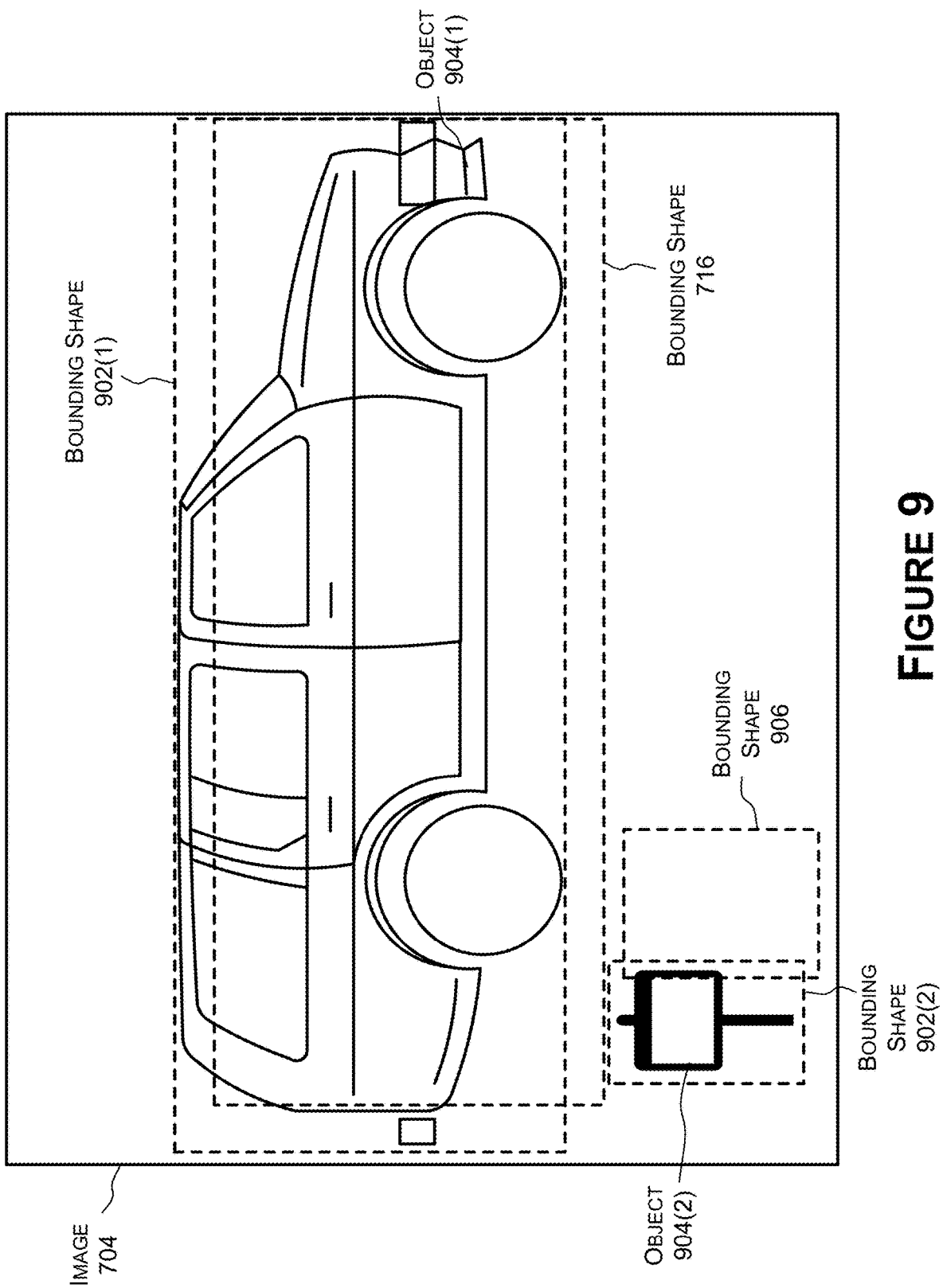
FIG. 9 illustrates an example of determining a 2D cost associated with a detected object, in accordance with some embodiments of the present disclosure.

For instance, FIG. 9 illustrates an example of determining 2D costs for detected objects, in accordance with some embodiments of the present disclosure. As shown by the example of FIG. 9, the association component 414 may use the predicted bounding shape 716 determined by the prediction component 410 and a determined bounding shape 902(1) for a detected object 904(1) to determine a first cost that the detected object 904(1) is the tracked object 604(1). In some examples, the bounding shape 902(1) is determined using one or more similar processes as the bounding shape 602(1) (e.g., using the detection component 402). As described herein, in some examples, the association component 414 may determine the first cost using at least IOU. For example, the greater the overlap between the bounding shape 902(1) and the predicted bounding shape 716, the lower the first cost. Additionally, the lesser the overlap between the bounding shape 902(1) and the predicted bounding shape 716, the higher the first cost. However, in other examples, the association component 414 may determine the first cost using one or more additional and/or alternative techniques (e.g., distances between feature descriptors, a weighted IOU set cost using tracked feature points, etc.).

In the example of FIG. 9, the association component 414 may further determine a second cost that the detected object 904(1) is associated with the tracked object 604(2) using a predicted bounding shape 906 for the tracked object 604(2) and the bounding shape 902(1). Additionally, the association component 414 may determine a third cost that a detected object 904(2) is the tracked object 604(1) using a bounding shape 902(2) associated with the detected object 904(2) and the predicted bounding shape 716. Finally, the association component 414 may determine a fourth cost that the detected object 904(2) is the tracked object 604(2) using the bounding shape 902(2) associated with the detected object 904(2) and the predicted bounding shape 906. As such, since there are two detected objects 604(1)-(2) and two tracked objects 604(1)-(2) associated with the predicted bounding shapes 716, 906, the association component 414 may determine four costs.

In some examples, such as when the detected objects 904(1)-(2) are depicted by more than one image captured by more than one camera, the association component 414 may perform one or more additional and/or alternative processes to determine the 2D costs associated with the detected objects 904(1)-(2). For example, and with regard to the detected object 904(1), the association component 414 may determine the 2D cost based at least on the IOU scores associated with the bounding shapes in one or more (e.g., multiple or all) images that depict the detected object 904(1), the distances between the feature descriptors in one or more (e.g., multiple or all) images that depict the detected object 904(1), the IOU set scores for the tracked feature points in one or more (e.g., multiple or all) images that depict the detected object 904(1), and/or the like. In some examples, the association component 414 may determine the 2D cost for the detected object 904(1) based on the average, mean, median, and/or the like of the IOU scores for the bounding shapes, the distances between the feature descriptors, and/or the IOU set scores for the tracked feature points.

Figure 10:
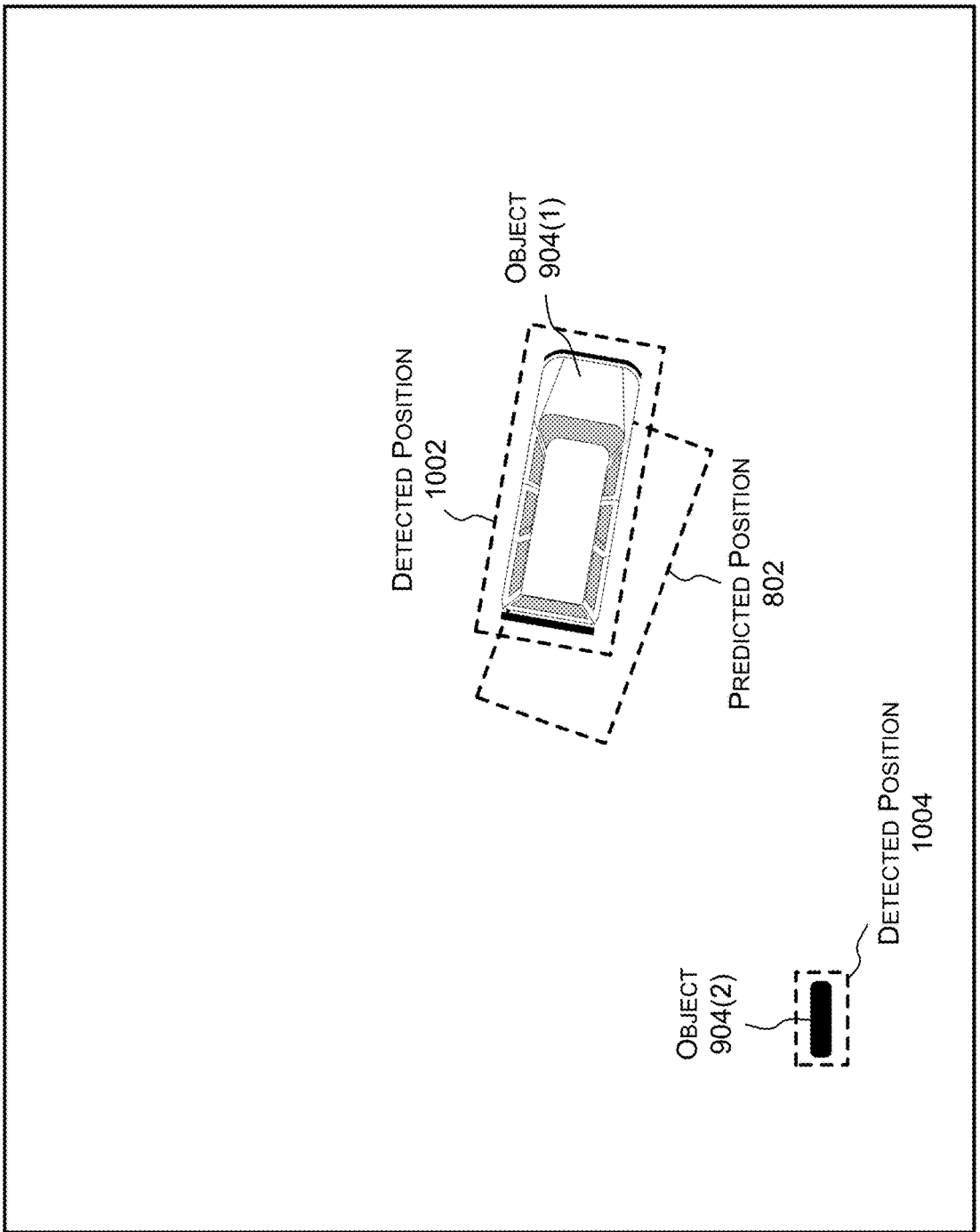
FIG. 10 illustrates an example of determining a 3D cost associated with a detected object, in accordance with some embodiments of the present disclosure.

FIG. 10 illustrates an example of determining 3D costs for detected objects, in accordance with some embodiments of the present disclosure. As shown, the association component 414 may use at least the predicted position 802 for the tracked object 604(1) and a detected position 1002 for the detected object 904(1) to determine a first cost that the detected object 904(1) is the tracked object 604(1). In some examples, the detected position 1002 is determined using one or more similar processes as the positions 606(1) (e.g., using the detection component 402). As described herein, in some examples, the association component 414 may determine the first cost using a position (or range) difference between the predicted position 802 and the detected position 1002. To account for varying track and measurement uncertainties, scaling may be used. One option for scaling may be to use the uncertainty of the prediction and the measurement noise—e.g., by using a Mahalanobis distance. Another option for scaling is to use the method described herein with respect to gating. The azimuth difference (e.g., in rig coordinates) is another feature that may be used for the 3D cost function. Scaling may be used for the Azimuth difference as well. While these are just a couple example techniques for determining the first cost associated with the tracked object 604(1) corresponding to the detected object 904(1), in other examples, the association component 414 may use one or more additional and/or alternative techniques.

In the example of FIG. 10, the association component 414 may further perform similar processes to determine a second cost that the detected object 904(2) is the tracked object 604(1). For instance, the association component 414 may use at least the predicted position 802 of the tracked object 604(1) and a detected position 1004 of the detected object 904(2) to determine the second cost. As described herein, in some examples, the association component 414 may determine the second cost using a position (or range) difference between the predicted position 802 and the detected position 1004.

The association component 414 may then determine a final cost that the detected object 604(1) is the tracked object 604(1) based on the 2D cost, determined using at least the processes described with respect to the example of FIG. 9, and the 3D cost, determined using at least the processes described with respect to FIG. 10. For instance, in some examples, the association component 414 may determine the final cost by multiplying the 2D cost by a first weight, multiplying the 3D cost by a second weight, and then adding the weighted 2D cost and the weighted 3D cost together. The association component 414 may then perform similar processes to determine a final cost that the detected object 904(2) is the tracked object 604(1) using the 2D cost, determined using at least the processes described with respect to the example of FIG. 9, and the 3D cost, determined using at least the processes described with respect to FIG. 10. Additionally, the association component 414 may perform similar processes to determine a final cost that the detected object 904(1) is the tracked object 604(2) and/or a final cost that the detected object 904(2) is the tracked object 604(2).

Referring back to the example of FIG. 4, in some examples, the association component 414 may perform one or more processes to filter out one or more of the costs. For a first example, the association component 414 may use a gating function(s) that filters out costs for objects that do not include the same classification. For instance, if a tracked object includes a first classification, such as a vehicle, and a detected object includes a second classification, such as a person, then the gating function(s) may filter out a cost associated with the detected object corresponding to the tracked object. For a second example, the gating function(s) may partially filter out costs for objects that do not include the same classification. For instance, if a tracked object includes a first classification, such as a vehicle, and a first detected object includes a second classification, such as a person, then the gating function(s) may still filter out a first cost associated with the first detected object corresponding to the tracked object. However, if a second detected object includes a third classification, such as a motorcycle, then the gating function(s) may refrain from filtering out a second cost associated with the second detected object corresponding to the tracked object.

In some examples, the gating function(s) may use both the 2D and 3D parts when filtering costs. For the 2D part of the gating function(s), similar to the cost function, one or more (e.g., all) images may be considered in the gating function(s). The gating function(s) may include a weighted IOU score of the bounding shapes (e.g., in all images) and/or a weighted distance between the feature descriptors (e.g., in all images). The 3D part may use multiple features, such as a position difference (e.g., weighted by the tracked object position which means a tighter gate is used for closer objects), an azimuth difference (e.g., inversely weighted by the tracked object position, where close objects have wider gate than far objects), and/or a fence to consider. One or more terms (e.g., each term) for the gating function(s) may be checked independently with respect to a gating threshold for one or more pairs (e.g., each pair) of measurement and track.

The association component 414 may then determine final associations between tracked objects and detected objects, such as by using the costs. In some examples, the associations may be one to one from track to measurement and/or many to one from track to measurement. For instance, in some examples, the association component 414 may use a greedy method which performs one to N associations where N is the detection count. In some examples, the association component 414 may sort the costs in a list, such as in ascending order. The association component 414 may then use the list to determine the associations between the tracked objects and the detected objects.

Figure 11:
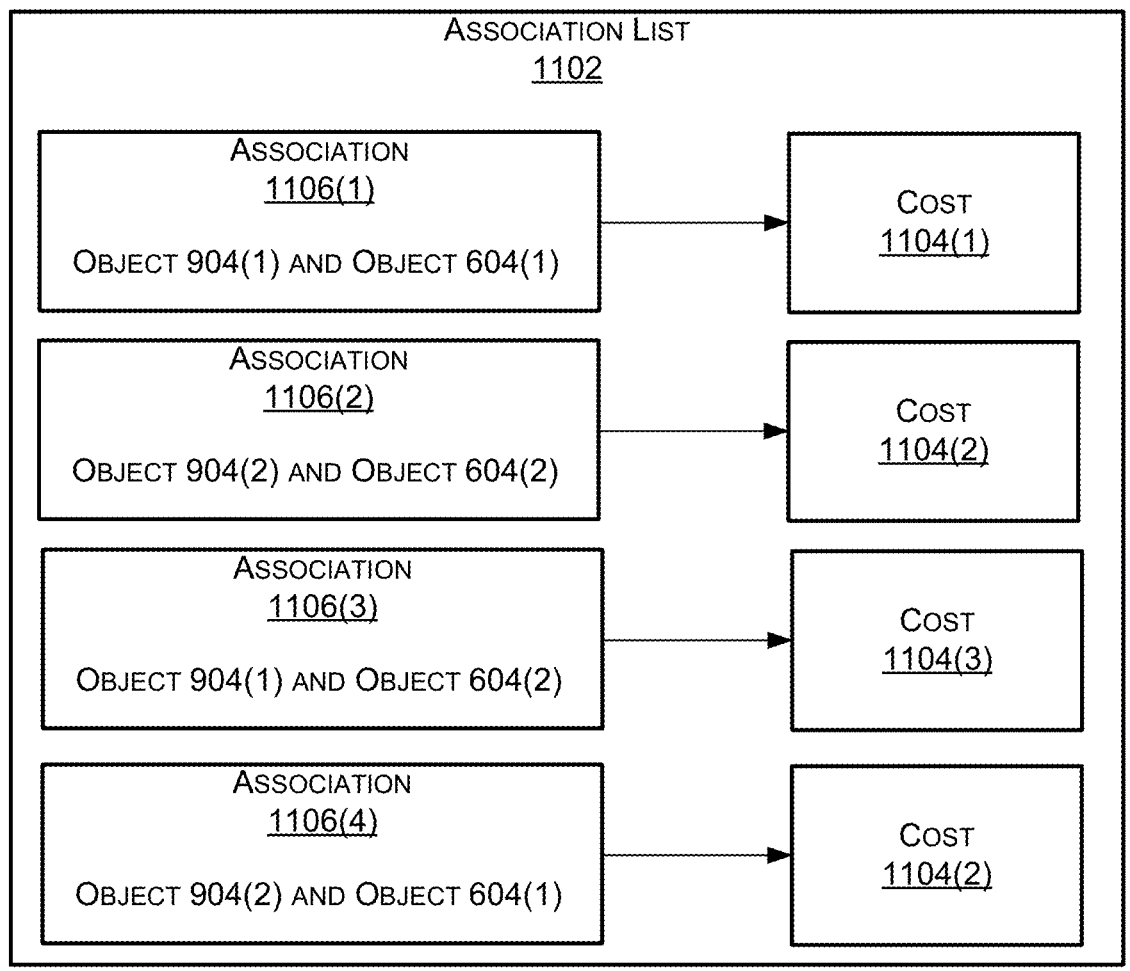
FIG. 11 illustrates an example of using an association list to determine an association(s) between a tracked object(s) and a detected object(s), in accordance with some embodiments of the present disclosure.

For instance, FIG. 11 illustrates an example of using an association list 1102 to determine associations between the tracked objects 604 and the detected objects 904(1)-(2), in accordance with some embodiments of the present disclosure. As shown, the association list 1102 includes a first cost 1104(1) for a first association 1106(1) that the detected object 904(1) corresponds to the tracked object 604(1), a second cost 1104(2) for a second association 1106(2) that the detected object 904(2) corresponds to the tracked object 604(2), a third cost 1104(3) for a third association 1106(3) that the detected object 904(1) corresponds to the detected object 604(2), and a fourth cost 1104(4) that the detected object 904(2) corresponds to the tracked object 604(1). In some examples, the association component 414 may generate the association list 1102 such that the costs 1104(1)-(4) are in ascending order.

The association component 414 may then use the association list 1102 to determine the final associations between the detected objects 904(1)-(2) and the tracked objects 604. For instance, the association component 414 may start at the top of the association list 1102 and determine that the cost 1104(1) is the lowest cost. Additionally, the association component 414 may determine that the tracked object 604(1) and/or the predicted bounding shape 716 have not been associated with a detected object 904(1)-(2) and/or that the detected object 904(1) has not been associated with a tracked object 604. As such, the association component 414 may determine that the association 1106(1) is a correct result (e.g., the detected object 904(1) corresponds to the tracked object 604(1)). The association component 414 may then move down the association list 1102 and determine that the cost 1104(2) is the second lowest cost. Additionally, the association component 414 may determine that the tracked object 604(2) and/or the predicted bounding shape 906 have not been associated with a detected object 904(1)-(2) and/or that the detected object 904(2) has not been associated with a tracked object 604. As such, the association component 414 may determine that the association 1106(2) is a correct result (e.g., the detected object 904(2) corresponds to the tracked object 604(2)).

Next, the association component 414 may move down the association list 1102 and determine that the cost 1104(3) is the third lowest cost. Additionally, the association component 414 may determine that the tracked object 604(2) and/or the predicted bounding shape 906 have already been associated with the detected object 904(2) and/or that the detected object 904(1) has already been associated with the tracked object 604(1). As such, the association component 414 may determine that the association 1106(3) is an incorrect result (e.g., the detected object 904(1) does not correspond to the tracked object 604(2)). The association component 414 may finally move down the association list 1102 and determine that the cost 1104(4) is the fourth lowest cost. Additionally, the association component 414 may determine that the tracked object 604(1) and/or the predicted bounding shape 716 have already been associated with the detected object 904(1) and/or that the detected object 904(2) has already been associated with the tracked object 604(2). As such, the association component 414 may determine that the association 1106(4) is an incorrect result (e.g., the detected object 904(2) does not correspond to the tracked object 604(1)).

Although the example of FIG. 11 illustrates the association component 414 as using each of the costs 1104(1)-(4) when determining the associations, in other examples, the association component 414 may use less than all of the costs 1104(1)-(4). For a first example, and as described herein, the association component 414 may have filtered out the third cost 1104(3) for the association 1106(3) based on the detected object 904(1) including a first classification, such as a vehicle, and the tracked object 604(2) including a second classification, such as a sign. Additionally, the association component 414 may have filtered out the fourth cost 1104(4) for the association 1106(4) based on the detected object 904(2) including a first classification, such as a sign, and the tracked object 604(1) including a second classification, such as a vehicle.

For a second example, and as described herein, the association component 414 may have filtered out the third cost 1104(3) for the association 1106(3) based on the third cost 1104(3), the 2D part of the third cost 1104(3), and/or the 3D part of the third cost 1104(3) being equal to or greater than a threshold. Additionally, the association component 414 may have filtered out the fourth cost 1104(4) for the association 1106(4) based on the fourth cost 1104(4), the 2D part of the fourth cost 1104(4), and/or the 3D part of the fourth cost 1104(4) being equal to or greater than the threshold. While these are just a couple example techniques of association component 414 filtering out one or more of the costs 1104(1)-(4) and/or the associations 1106(1)-(4), in other examples, the association component 414 may use one or more additional and/or alternative techniques.

Referring back to the example of FIG. 4, the tracking component 408 may include an update component 416 that is configured to update the states (e.g., the state data 412) associated with the tracked objects. For instance, the update component 416 may update one or more of the 2D fields associated with a tracked object such as, but not limited to, the bounding shape(s), the vector(s), the feature descriptors, and/or the like. Additionally, the update component 416 may update one or more of the 3D fields associated with the tracked object such as, but not limited to, the object shape (e.g., centroid, width, height, length), the object position (e.g., coordinates, orientation, etc.), the velocity, the acceleration, the fence/boundary points, and/or the like. Furthermore, the update component 416 may update one or more of the additional fields associated with the tracked object such as, but not limited to, the object classification (with associated probabilities, in some examples), the object state (e.g., stopped, moving, etc.), the visibility/occlusion information, the confidences (variances in the locations, the velocity, the acceleration, and/or the like described above), the timestamp(s), and/or the like.

Figure 12:
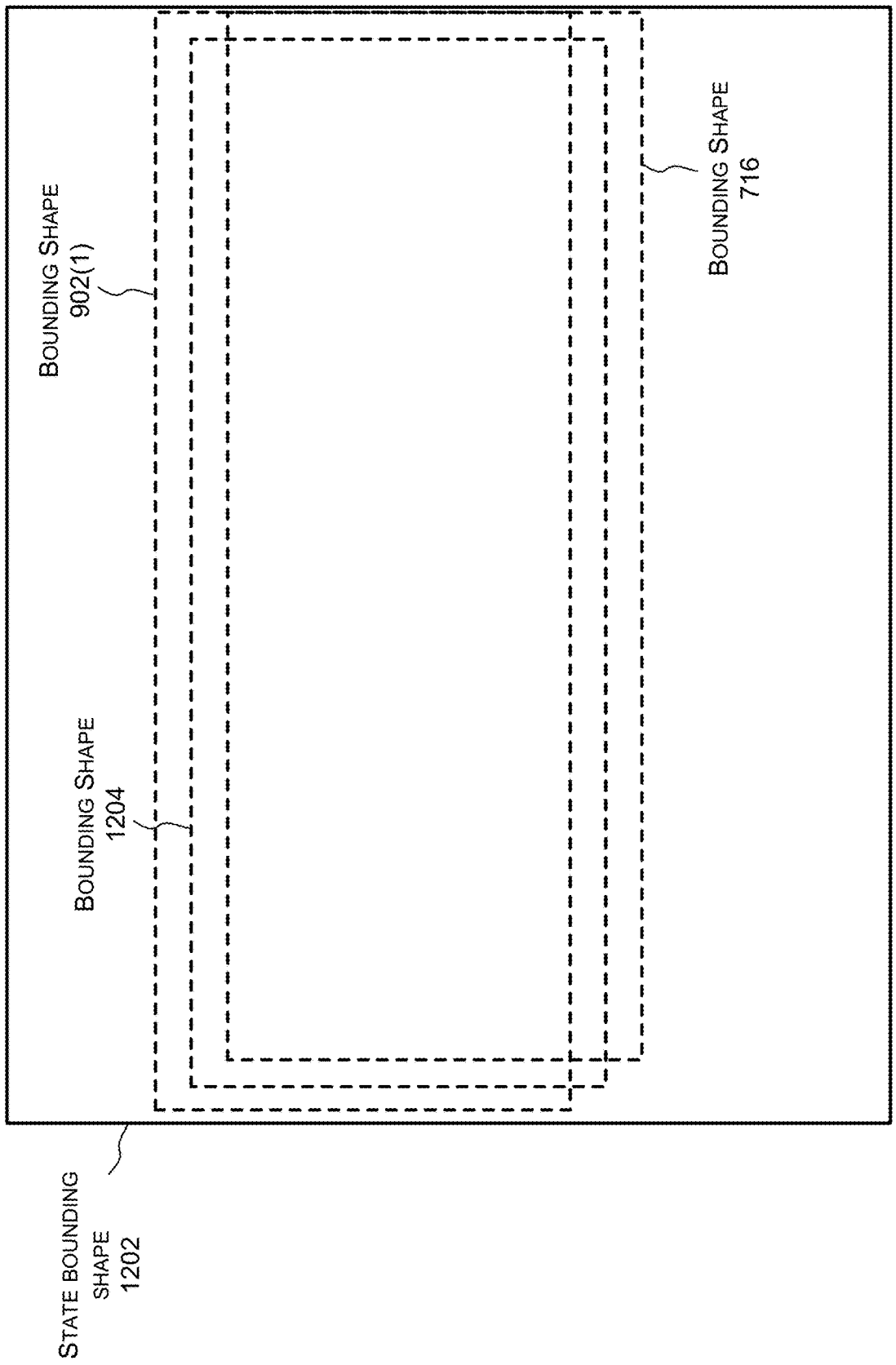
FIG. 12 illustrates an example of updating a state associated with a tracked object, in accordance with some embodiment of the present disclosure.

In some examples, when updating the 2D fields, the update component 416 may update the 2D fields to include the detected states and/or determine new states using the previous states and the detected states. For instance, FIG. 12 illustrates an example of updating a bounding shape associated with the tracked object 604(1), in accordance with some embodiments of the present disclosure. As shown, the update component 416 may update a state 1202 of the bounding shape using the precited bounding shape 716 for the tracked object 604(1) and/or the detected bounding shape 902(1) for the detected object 904(1) that corresponds to the tracked object 604(1). In some examples, the update component 416 may update the state 1202 to include the detected bounding shape 902(1). In some examples, the update component 416 may update the state 1202 to include a new bounding shape 1204 that is based on the predicted bounding shape 716 and the detected bounding shape 902(1). For instance, the update component 416 may determine the bounding shape 1204 as the average (which may be weighted) of the predicted bounding shape 716 and the detected bounding shape 902(1).

For the 3D fields, the update component 416 may use one or more approaches to update one or more of the 3D fields, such as the object shape, the velocity, the acceleration, and/or the orientation. For instance, in some examples, the update component 416 may use a weighted update for each measurement, such as to avoid a too small posterior covariance. In some examples, the update component 416 may use the best measurement and discard other measurements (e.g., based on confidence values determined by the detection component 402). In some examples, the update component 416 may perform the update by means of a (potentially nonlinear) Kalman filter. In such examples, the update component 416 may not let the covariance matrix to become too small.

In some examples, to perform the update, the update component 416 may initially update the 3D cuboid followed by updating the fence associated with the object. For instance, the fence update may include moving the predicted object fence by applying a rigid body transform, placing the associated fence to the centroid of the 3D cuboid or fence, performing global alignment using iterative closest point (ICP) or another method, and updating the fence points using a final list of the closest points provided by the ICP or picking a reference point inside two shapes and setting x-degrees.

Referring back to the example of FIG. 4, the tracking component 408 (e.g., the update component 416) may determine a 2D confidence for an output signal(s) (e.g., each output signal) that is computed. For instance, the tracking component 408 (e.g., the update component 416) may determine an object existence confidence (OEC) associated with an object, such as by using one or more techniques. For a first example, the detection component 402 may determine one or more confidences that one or more images depict an object, such as a respective confidence for each image or individual images. The tracking component 408 (e.g., the update component 416) may then use the confidence(s) for the image(s) to determine the OEC for the object. For instance, the tracking component 408 (e.g., the update component 416) may determine the OEC as the average of the confidences associated with the image. In some examples, the tracking component 408 (e.g., the update component 416) may determine the OEC using specific images, such as the most recent threshold number of images (e.g., one image, two images, five images, ten images, etc.). In some examples, the tracking component 408 (e.g., the update component 416) may use a weighted average, such as by providing more weight to the most recent images(s).

For a second example, the tracking component 408 (e.g., the update component 416) may use the association(s) between a tracked object and one or more detected objects to determine the OEC for the tracked object. For instance, when the association component 414 associates the tracked object with a detected object (e.g., at a subsequent instance in time), using one or more of the processes described herein, the tracking component 408 (e.g., the update component 416) may increment the OEC associated with the tracked object. However, if the association component 414 is unable to associate the tracked object with a detected object (e.g., at a subsequent instance in time), using one or more of the processes described herein, the tracking component 408 (e.g., the update component 416) may decrement the OEC associated with the tracked object. In some examples, the tracking component 408 (e.g., the update component 416) may increment and/or decrement the OEC by a constant value. In some examples, the tracking component 408 (e.g., the update component 416) may use an OEC that is within a range, such as, but not limited to, 0 to 1, 0 to 10, 0 to 100, and/or the like. Still, in some examples, the tracking component 408 (e.g., the update component 416) may use the visibility/occlusion information when performing such a technique, such as by not decrementing the OEC when the object is occluded or outside of the field of view (FOV) or sensory field of the vehicle.

For a third example, the tracking component 408 (e.g., the update component 416) may again use the association(s) between the tracked object and the one or more detected objects to determine the OEC for the tracked object. However, in this example, the tracking component 408 (e.g., the update component 416) may determine a first value (e.g., 1) when the association component 414 associates the tracked object with a detected object and a second value (e.g., 0) when the association component 414 does not associate the tracked object with a detected object. The tracking component 408 (e.g., the update component 416) may then determine the OEC using the values. For instance, the tracking component 408 (e.g., the update component 416) may determine the OEC as the average, the median, the mode, and/or the like of the values. In some examples, the tracking component 408 (e.g., the update component 416) may again use the visibility/occlusion information when performing such a technique, such as by not determining a value and/or determining the first value when the object is occluded or outside of the FOV or sensory field of the vehicle.

For a fourth example, the tracking component 408 (e.g., the update component 416) may use one or more additional and/or alternative states associated with the object to determine the OEC associated with the object. For instance, the tracking component 408 (e.g., the update component 416) may use the inlier count associated with the tracked feature points, the translation, the scale change, and/or the like. In some examples, the tracking component 408 (e.g., the update component 416) may multiply the inlier count associated with the tracked feature points, the translation, the scale change, and/or the like to a constant term and add it to the OEC.

In some examples, the tracking component 408 (e.g., the update component 416) may further determine a 3D confidence, such as another OEC. For instance, the tracking component 408 (e.g., the update component 416) may use the Kalman filter state covariance matrices, the associated measurement history, the measurement noise, the calibration, and/or one or more additional and/or alternative factors to determine the OEC. As such, in some examples, the tracking component 408 (e.g., the update component 416) may determine both a 2D OEC and a 3D OEC for an object. In some examples, the tracking component 408 (e.g., the update component 416) may use the 2D OEC and the 3D OEC to determine a final OEC for the object. For instance, the tracking component 408 (e.g., the update component 416) may determine the final OEC as the average of the 2D OEC and the 3D OEC.

The process 400 may further include the tracking component 408 using a deletion component 418 to terminate a track(s) associated with a tracked object(s) and a creation component 420 to create a track(s) associated with a newly tracked object(s). For instance, the creation component 420 may create a new track for a newly detected object. The creation component 420 may then confirm the track for the newly detected object using one or more processes. For example, the creation component 420 may confirm the track based on the association component 414 associating the newly detected object with one or more detected objects at one or more subsequent instances in time. In some examples, the creation component 420 uses a threshold number of associations to confirm the track. For instance, and as described herein, the association component 414 may determine whether the object is associated with a detected object(s) depicted by one or more images at each subsequent instance in time. As such, the creation component 420 may confirm the track for the object based on the association component 414 associating the object with a detected object(s) for a threshold number of subsequent images (e.g., M-out-of-N images). For instance, if the threshold number of subsequent images is three-out-of-five images, then the creation component 420 may confirm the track based on the object being associated with a detected object(s) that is depicted in at least three-out-of-five images generated at subsequent instances in time.

In some examples, the deletion component 418 may use a similar technique to terminate a track associated with a tracked object. For instance, the deletion component 418 may determine to terminate the track based on the association component 414 not associating the tracked object with one or more detected objects at one or more subsequent instances in time. In some examples, the deletion component 418 uses a threshold number of associations to terminate the track. For instance, and as described herein, the association component 414 may determine whether the object is associated with a detected object(s) depicted by one or more images at each subsequent instance in time. As such, the deletion component 418 may terminate the track for the tracked object based on the association component 414 not associating the tracked object with a detected object(s) for a threshold number of subsequent images (e.g., P-out-of-Q images). For instance, if the threshold number of subsequent images is again three-out-of-five images, then the deletion component 418 may terminate the track based on the tracked object not being associated with a detected object(s) in at least three-out-of-five images generated at subsequent instances in time.

In some examples, the deletion component 418 and/or the creation component 420 may use the OEC to respectively delete a track for a tracked object and/or confirm a track for a newly detected object. In such examples, the creation component 420 may confirm a track for the newly detected object based on the OEC satisfying (e.g., being equal to or greater than) a first threshold value. Additionally, the deletion component 418 may terminate a track for a tracked object based on the OEC not satisfying (e.g., being less than) a second threshold value. In some examples, the second threshold value is less than the first threshold value. In some examples, the second threshold value is equal to or greater than the first threshold value.

Figure 13:
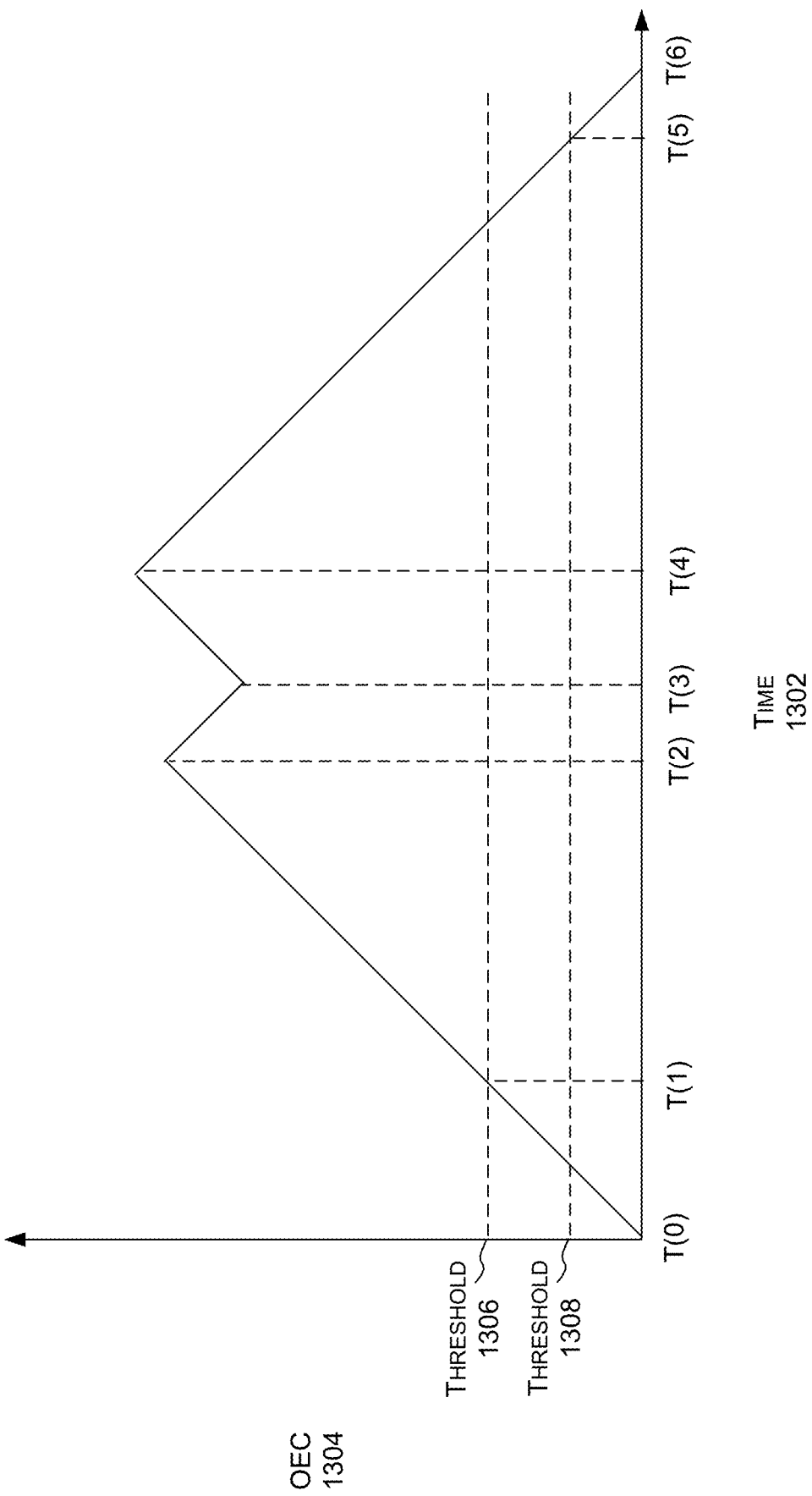
FIG. 13 illustrates an example of performing track management for an object over a period of time, in accordance with some embodiments of the present disclosure.

For instance, FIG. 13 illustrates an example of performing track management for an object over a period of time 1302 using an OEC 1304 associated with the object, in accordance with some examples of the present disclosure. As shown by the example of FIG. 13, the OEC 1304 is initially zero at time T(0) since the tracking component 408 has yet to detect the tracked object associated with the OEC 1304. The tracking component 408 may then continue to associate the tracked object with one or more detected objects between time T(0) and time T(2). As such, and as shown, the tracking component 408 may begin to increase the OEC 1304 associated with the tracked object between time T(0) and time T(2), using one or more of the processes described herein.

Next, the tracking component 408 may no longer associate the tracked object with one or more detected objects between time T(2) and time T(3). As such, and as shown, the tracking component 408 may begin to decrease the OEC 1304 associated with the tracked object between time T(2) and time T(3), using one or more of the processes described herein. Next, the tracking component 408 may again associate the tracked object with one or more detected objects between time T(3) and time T(4). As such, and as shown, the tracking component 408 may again increase the OEC 1304 associated with the tracked object between time T(3) and time T(4), using one or more of the processes described herein. Finally, the tracking component 408 may again no longer associate the tracked object with one or more detected objects between time T(4) and time T(6). As such, and as shown, the tracking component 408 may begin decreasing the OEC 1304 associated with the tracked object between time T(4) and time T(6), using one or more of the processes described herein.

As further illustrated by the example of FIG. 13, the OEC 1304 may satisfy (e.g., be equal to or greater than) a first threshold 1306 at time T(1). As such, the tracking component 408 (e.g., the creation component 420) may confirm the track associated with the object at time T(1). Additionally, the OEC 1304 may no longer satisfy (e.g., be less than) a second threshold 1308 at time T(5). As such, the tracking component 408 (e.g., the deletion component 418) may terminate the track associated with the object at time T(5). Although the example of FIG. 13 illustrates the first threshold 1306 as being greater than the second threshold 1308, in other examples, the first threshold 1306 may be equal to or less than the second threshold 1308.

Referring back to the example of FIG. 4, the process 400 may include the tracking component 408 (e.g., the creation component 420) outputting data 422 associated with an object(s). For instance, the output data 422 for the object(s) may include and/or be similar to at least a portion of the state data 412. For example, the output data 422 may represent 2D fields, 3D fields, and/or additional fields associated with tracked objects. The 2D fields may include, but are not limited to, a list of bounding shapes, a list of vectors (e.g., a transition vector, such as a transition vector representing a translation and/or a scale change associated with an object), a list of feature descriptors (e.g., a list of feature points), and/or the like. Additionally, the 3D fields include, but are not limited to, a list of object shapes (e.g., centroid, width, height, length), a list of object positions (e.g., coordinates, orientation, etc.), a list of velocities, a list of accelerations, a list of object fence/boundary points, and/or the like. Furthermore, the additional fields may include, but are not limited to, a list of identifiers associated with the tracked objects, a list of object classifications (with associated probabilities, in some examples), a list of object states (e.g., stopped, moving, etc.), visibility/occlusion information, a list of confidences (variances in the locations, the velocity, the acceleration, and/or the like described above), a timestamp(s), and/or the like.

In some examples, the output data 422 may include state information associated with a track(s) of an object(s) that has been confirmed. For instance, the output data 422 may not include state information for an object(s) that has been detected, but has not yet been confirmed by the creation component 420 (e.g., the OEC(s) is less than the first threshold 1306). Additionally, in some examples, the output data 422 may cease state information for an object(s) that is associated with a terminated track(s). For instance, the output data 422 may not include state information for an object(s) that is associated with a track(s) terminated by the deletion component 418 (e.g., the OEC(s) is less than the second threshold 1308). In some examples, the output data 422 may be provided to or more additional components and/or systems of the vehicle, such as the planning system, that uses the output data 422 for navigating.

In some examples, the tracking component 408 generates and/or outputs the output data 422 at instances in time when the tracking component 408 performs the processes described herein to associate tracked objects with detected objects. For instance, one or more times (e.g., each) time the tracking component 408 performs the processes described herein to associate tracked objects with detected objects, the tracking component 408 may generate and/or output the output data 422 representing the updated state information associated with the tracked objects. Additionally, the tracking component 408 may update the state data 412 associated with the tracked objects.

In some examples, the track-management component 108 may be included as part of the tracking component 408. For example, the track-management component 108 may be included as part of the update component 416, the deletion component 418, and/or the creation component 420, which is illustrated by the dashed lines in the example of FIG. 4. This way, the track-management component 108 is able to identify which tracks to terminate, which tracks to create, and/or which tracks to update during the processes described with respect to the example of FIG. 4.

For example, the creation component 420 may use the data output by the track-management component 108 (e.g., the selection data 120) to determine an object(s) for creating a new track(s). In some examples, the creation component 420 uses the data in addition to, or alternatively from, each of the processes described herein with respect to the creation component 420. Additionally, the deletion component 418 may use the data output by the track-management component 108 (e.g., the selection data 120) to determine a tracked object(s) for terminating a current track(s). In some examples, the deletion component 418 uses the data in addition to, or alternatively from, each of the processes described herein with respect to deletion component 418. Furthermore, the update component 416 may use the data output by the track-management component 108 (e.g., the selection data 120) to determine a tracked object(s) for updating the state information. In some examples, the update component 416 uses the data in addition to, or alternatively from, each of the processes described herein with respect to the update component 416.

Now referring to FIGS. 14-18, each block of the methods 1400, 1500, 1600, 1700, and 1800, described herein, comprises a computing process that may be performed using any combination of hardware, firmware, and/or software. For instance, various functions may be carried out by a processor executing instructions stored in memory. The methods 1400, 1500, 1600, 1700, and 1800 may also be embodied as computer-usable instructions stored on computer storage media. The methods 1400, 1500, 1600, 1700, and 1800 may be provided by a standalone application, a service or hosted service (standalone or in combination with another hosted service), or a plug-in to another product, to name a few. In addition, the methods 1400, 1500, 1600, 1700, and 1800 are described, by way of example, with respect to FIG. 1. However, these methods 1400, 1500, 1600, 1700, and 1800 may additionally or alternatively be executed by any one system, or any combination of systems, including, but not limited to, those described herein.

Figure 14:
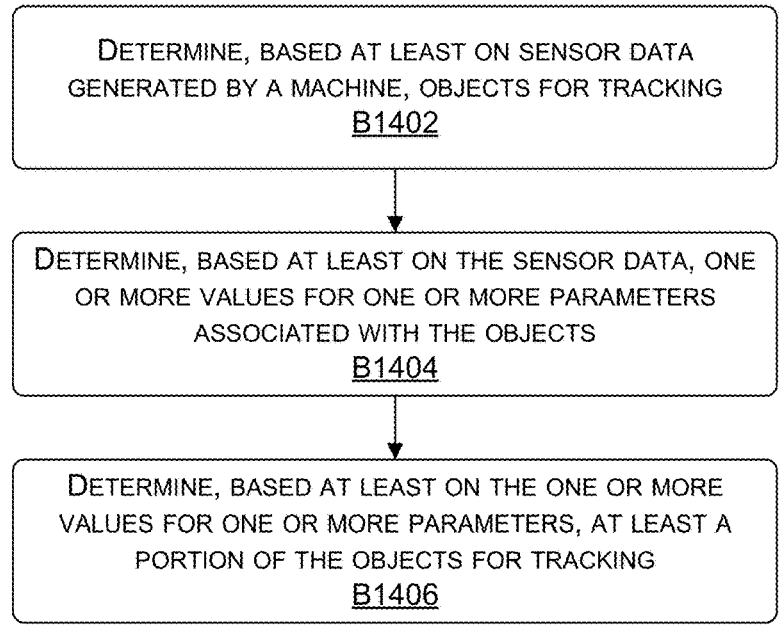
FIGS. 14-15 are flow diagrams showing methods for managing tracks associated with objects, in accordance with some embodiments of the present disclosure.

FIG. 14 is a flow diagram showing a method 1400 for managing tracks associated with objects, in accordance with some embodiments of the present disclosure. The method 1400, at block B1402, may include determining, based at least on sensor data generated by a machine, objects for tracking. For instance, the track-management component 108 may determine the objects for tracking. In some examples, the track-management component 108 may determine the objects based on receiving detection data 106 representing identifiers of the objects detected by the tracking component 102. In some examples, the objects include both one or more objects that are currently being tracked by the tracking component 102 and one or more objects that are newly detected by the tracking component 102.

The method 1400, at block B1404, may include determining, based at least on the sensor data, one or more values of one or more parameters associated with the objects. For instance, the track-management component 108 may determine values for the parameters associated with the objects. In some examples, the track-management component 108 may determine the values of the parameters based on receiving the detection data 106 that further represents information corresponding to the parameters. As described herein, the parameters associated with an object may include, but are not limited to, a classification of the object, a distance to the object from the vehicle, a direction to the object from the vehicle (e.g., whether the object is located along the path of the vehicle), a TTC associated with the object, a confidence associated with the object (e.g., a confidence indicating whether the object is an actual object), a velocity of the object, an acceleration of the object, a direction of travel of the object, a lane that the object is navigating, and/or any other parameter.

The method 1400, at block B1406, may include determining, based at least on the one or more values of the one or more parameters, at least a portion of the objects for tracking. For instance, the track-management component 108 may use the values of the parameters to determine the portion of the objects for tracking. In some examples, the track-management component 108 makes the determination based on initially determining that a number of the objects is greater than a threshold number of objects. The track-management component 108 may then determine scores for the objects based on the values of the parameters. Additionally, the track-management component 108 may determine the portion of the objects based on the scores. For example, the track-management component 108 may determine that the portion of the objects includes the threshold number of the objects that are associated with the highest scores.

Figure 15:
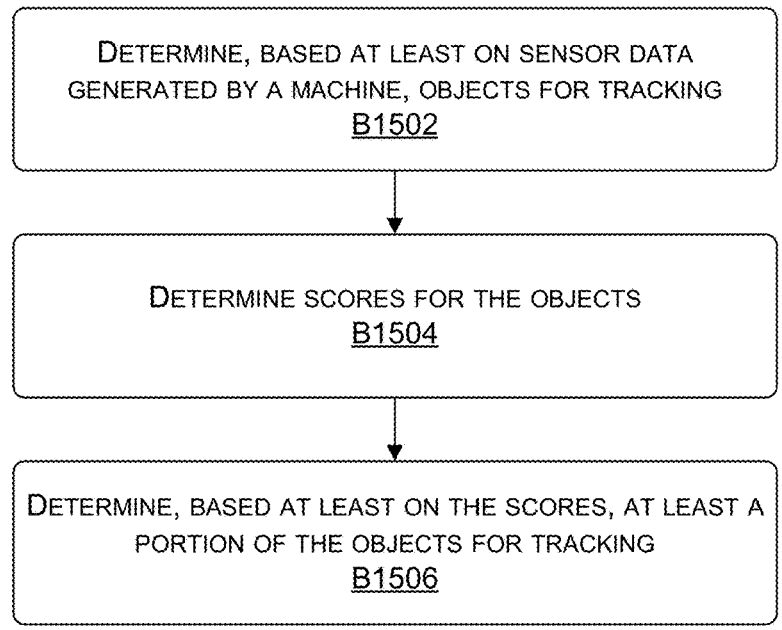

Now referring to FIG. 15, FIG. 15 is a flow diagram showing another method 1500 for managing tracks associated with objects, in accordance with some embodiments of the present disclosure. The method 1500, at block B1502, may include determining, based at least on sensor data generated by a machine, objects for tracking. For instance, the track-management component 108 may determine the objects for tracking. In some examples, the track-management component 108 may determine the objects based on receiving detection data 106 representing identifiers of the objects detected by the tracking component 102. In some examples, the objects include both one or more objects that are currently being tracked by the tracking component 102 and one or more objects that are newly detected by the tracking component 102.

The method 1500, at block B1504, may include determining scores for the objects. For instance, the track-management component 108 may determine the scores for the objects. In some examples, the track-management component 108 determines the scores based at least on a number of the objects being greater than a threshold number of objects. In some examples, the track-management component 108 determines the scores using parameters associated with the objects. As described herein, the scores may represent priorities associated with the objects, such as priorities associated with safety risks that the objects pose to the machine.

The method 1500, at block B1506, may include determining, based at least on the scores, at least a portion of the objects for tracking. For instance, the track-management component 108 may use the scores to determine the portion of the objects for tracking. In some examples, the track-management component 108 makes the determination by determining that the portion of the objects includes the threshold number of the objects that are associated with the highest scores.

Figure 16:
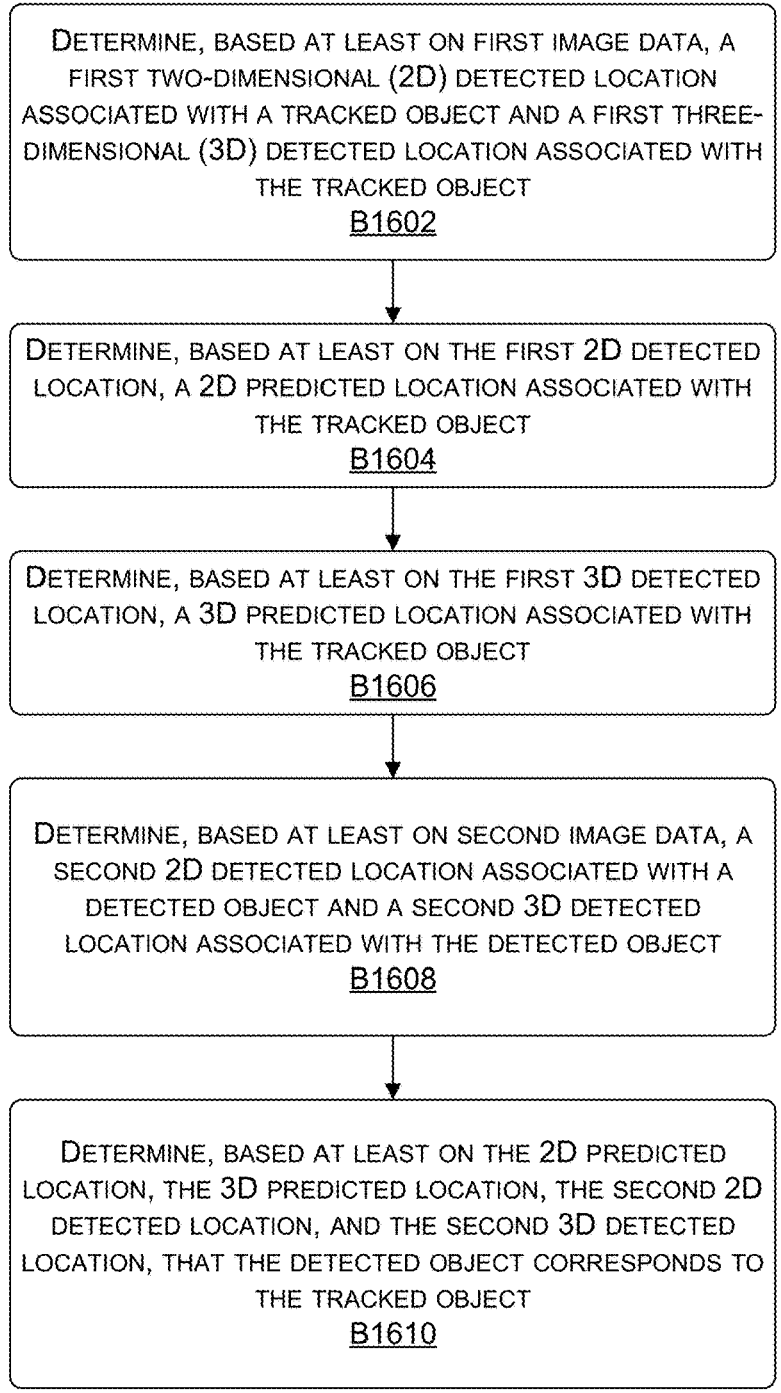
FIG. 16 is a flow diagram showing a method for tracking an object using joint 2D and 3D tracking, in accordance with some embodiments of the present disclosure.

FIG. 16 is a flow diagram showing a method 1600 for tracking an object using joint 2D and 3D tracking, in accordance with some embodiments of the present disclosure. The method 1600, at block B1602, may include determining, based at least on first image data, a first two-dimensional (2D) detected location associated with a tracked object and a first three-dimensional (3D) detected location associated with the tracked object. For instance, in some examples, the tracking component 102 may receive object data representing the first 2D detected location and the first 3D detected location associated with the tracked object. As described herein, in some examples, the detection component may process the first image data generated at a first instance in time in order to determine the first 2D detected location and the first 3D detected location. The detection component may then generate the output data and send the output data to the tracking component 102. Additionally, or alternatively, in other examples, the tracking component 102 may determine the first 2D detected location and the first 3D detected location using state data.

The method 1600, at block B1604, may include determining, based at least on the first 2D detected location, a 2D predicted location associated with the tracked object. For instance, the tracking component 102 may determine the 2D predicted location associated with the tracked object at a second instance in time. In some examples, to determine the 2D predicted location, the tracking component 102 may determine a transition vector that includes at least a translation and a scale change associated with the tracked object. The tracking component 102 may then determine the 2D predicted location using the first 2D detected location and the transition vector.

The method 1600, at block B1606, may include determining, based at least on the first 3D detected location, a 3D predicted location associated with the tracked object. For instance, the tracking component 102 may determine the 3D predicted location associated with the tracked object at the second instance in time. In some examples, to determine the 3D predicted location, the tracking component 102 may use the first 3D detected location along with one or more states associated with the tracked object, such as the velocity, the acceleration, the orientation, and/or the like. For instance, the tracking component 102 may determine the 3D predicted location by moving the first 3D detected location based on the one or more states.

The method 1600, at block B1608, may include determining, based at least on second image data, a second 2D detected location associated with a detected object and a second 3D detected location associated with the detected object. For instance, in some examples, the tracking component 102 may receive object data representing the second 2D detected location and the second 3D detected location associated with the detected object. As described herein, in some examples, the detection component may process the second image data generated at the second instance in time in order to determine the second 2D detected location and the second 3D detected location associated with the detected object. The detection component may then generate the output data and send the output data to the tracking component 102. In some examples, the first image data represents a first image(s) and the second image data represents a second image(s) generated after the first image.

The method 1600, at block B1610, may include determining, based at least on the 2D predicted location, the 3D predicted location, the second 2D detected location, and the second 3D detected location, that the detected object corresponds to the tracked object. For instance, the tracking component 102 may use the 2D predicted location, the 3D predicted location, the second 2D detected location, and the second 3D detected location to determine that the detected object corresponds to the tracked object. In some examples, to make the determination, the tracking component 102 determines a cost using the 2D predicted location, the 3D predicted location, the second 2D detected location, and the second 3D detected location. The tracking component 102 then determines that the detected object is the tracked object using the cost.

Figure 17:
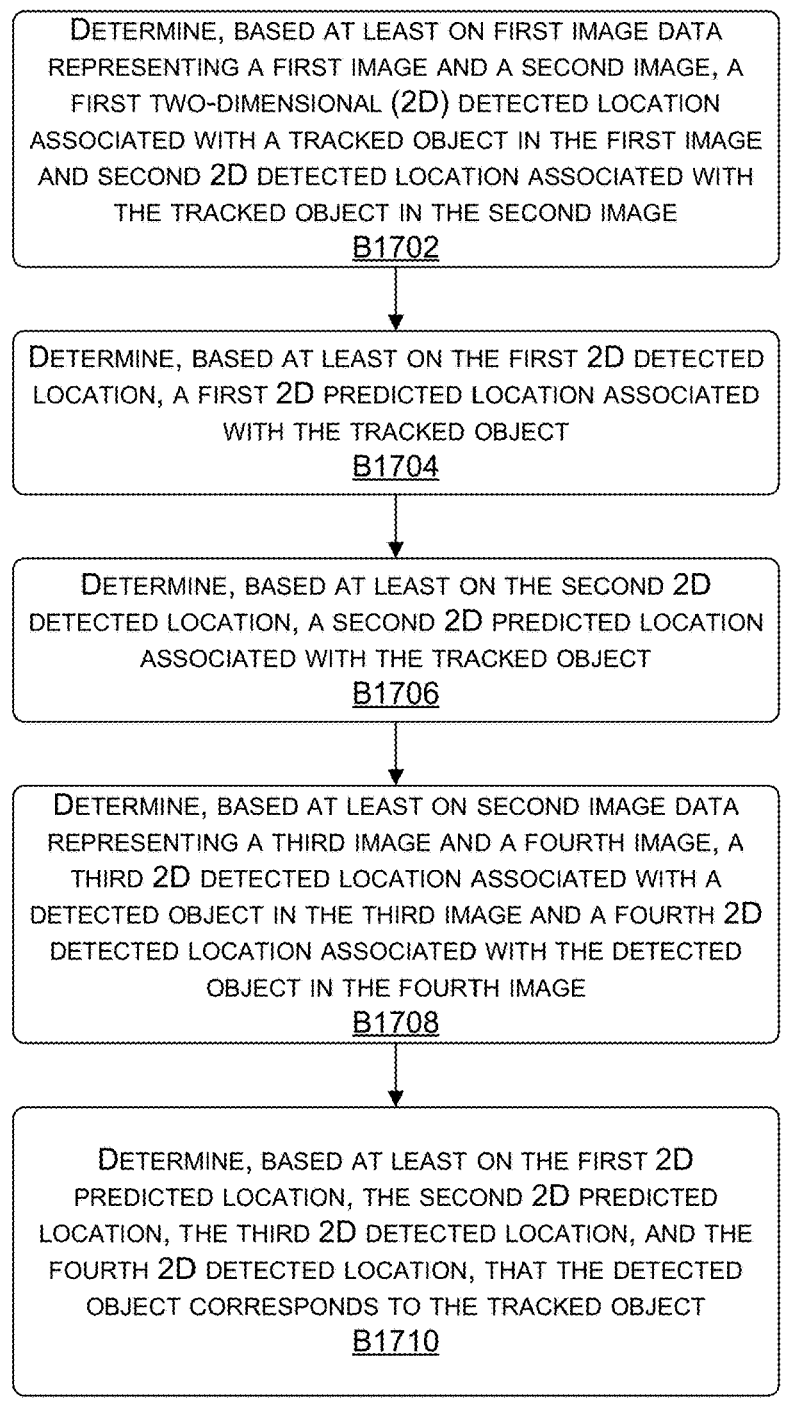
FIG. 17 is a flow diagram showing a method for tracking an object using multiple images that depict the object at different instances in time, in accordance with some embodiments of the present disclosure.

Now referring to FIG. 17, FIG. 17 is a flow diagram showing a method 1700 for tracking an object using multiple images that depict the object at different instances in time, in accordance with some embodiments of the present disclosure. The method 1700, at block B1702, may include determining, based at least on first image data representing a first image and a second image, a first two-dimensional (2D) detected location associated with a tracked object in the first image and a second 2D detected location associated with the tracked object in the second. For instance, in some examples, the tracking component 102 may receive object data representing the first 2D detected location and the second 2D detected location associated with the tracked object at a first instance in time. As described herein, in some examples, a detection component may process the first image data generated at the first instance in time in order to determine the first 2D detected location and the second 2D detected location. The detection component may then generate the output data and send the output data to the tracking component 102. Additionally, or alternatively, in other examples, the tracking component 102 may determine the first 2D detected location and the second 2D detected location using state data.

The method 1700, at block B1704, may include determining, based at least on the first 2D detected location, a first 2D predicted location associated with the tracked object. For instance, the tracking component 102 may determine the first 2D predicted location associated with the tracked object at a second instance in time. In some examples, to determine the first 2D predicted location, the tracking component 102 may determine a first transition vector that includes at least a first translation and a first scale change associated with the tracked object. The tracking component 102 may then determine the first 2D predicted location using the first 2D detected location and the first transition vector.

The method 1700, at block B1706, may include determining, based at least on the second 2D detected location, a second 2D predicted location associated with the tracked object. For instance, the tracking component 102 may determine the second 2D predicted location associated with the tracked object at the second instance in time. In some examples, to determine the second 2D predicted location, the tracking component 102 may determine a second transition vector that includes at least a second translation and a second scale change associated with the tracked object. The tracking component 102 may then determine the second 2D predicted location using the second 2D detected location and the second transition vector.

The method 1700, at block B1708, may include determining, based at least on second image data representing a third image and a fourth image, a third 2D detected location associated with a detected object in the third image and a fourth 2D detected location associated with the detected object in the fourth image. For instance, in some examples, the tracking component 102 may receive object data representing the third 2D detected location and the fourth 2D detected location associated with the detected object at a second instance in time. As described herein, in some examples, the detection component may process the second image data generated at the second instance in time in order to determine the third 2D detected location and the fourth 2D detected location. The detection component may then generate the output data and send the output data to the tracking component 102.

The method 1700, at block B1710, may include determining, based at least on the first 2D predicted location, the second 2D predicted location, the third 2D detected location, and the fourth 2D detected location, that the detected object corresponds to the tracked object. For instance, the tracking component 102 may use the first 2D predicted location, the second 2D predicted location, the third 2D detected location, and the fourth 2D detected location to determine that the detected object corresponds to the tracked object. In some examples, to make the determination, the tracking component 102 determines a cost using the first 2D predicted location, the second 2D predicted location, the third 2D detected location, and the fourth 2D detected location. The tracking component 102 then determines that the detected object is the tracked object using the cost.

Figure 18:
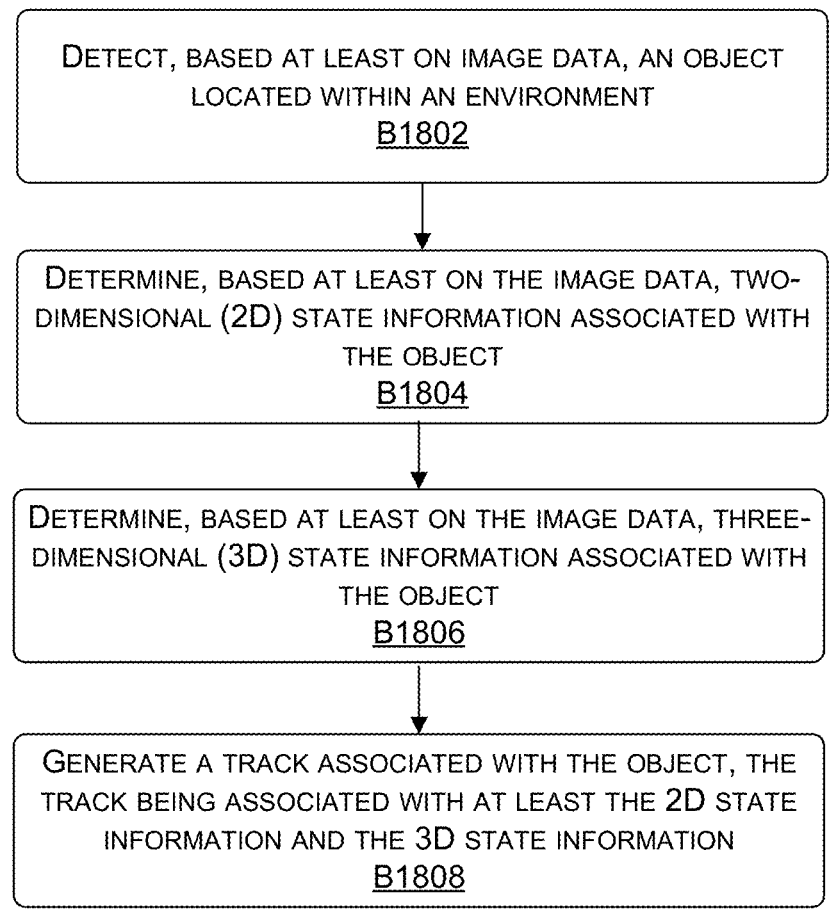
FIG. 18 is a flow diagram showing a method for performing track management for an object, in accordance with some embodiments of the present disclosure.

With reference to FIG. 18, FIG. 18 is a flow diagram showing a method 1800 for performing track management for an object, in accordance with some embodiments of the present disclosure. The method 1800, at block B1802, may include detecting, based at least on image data, an object located within an environment. For instance, the tracking component 102 may detect the object located within the environment. In some examples, the detecting of the object may include an initial detection. For instance, the tracking component 102 may receive object data indicating the detection of the object. In some examples, the detecting of the object may include determining that a tracked object is associated with a detected object, where the object includes the tracked object. For instance, the tracking component 102 may perform one or more of the processes described herein to track the object.

The method 1800, at block B1804, may include determining, based at least on the image data, two-dimensional (2D) state information associated with the object. For instance, the tracking component 102 may determine the 2D state information associated with the object. As described herein, the 2D state information may include, but is not limited to, a bounding shape(s) (e.g., a respective bounding shape for each image that depicts the object), a vector(s) (e.g., a respective transition vector associated with each image that depicts the object), feature descriptors (e.g., a list of feature points for each image that depicts the object), and/or the like. In some examples, if the detection is an initial detection of the object, then the tracking component 102 may determine the 2D state information using the object data. In some examples, if the detection is associated with tracking the object, then the tracking component 102 may determine the 2D state information using the object data, state data, and/or one or more state predictions.

The method 1800, at block B1806, may include determining, based at least on the image data, three-dimensional (3D) state information associated with the object. For instance, the tracking component 102 may determine the 3D state information associated with the object. As described herein, the 3D state information may include, but is not limited to, an object shape, a velocity, an acceleration, object fence/boundary points, and/or the like. In some examples, if the detection is an initial detection of the object, then the tracking component 102 may determine the 3D state information using the object data. In some examples, if the detection is associated with tracking the object, then the tracking component 102 may determine the 3D state information using the object data, state data, and/or one or more state predictions.

The method 1800, at block B1808, may include generating a track associated with the object, the track being associated with the 2D state information and the 3D state information. For instance, the tracking component 102 may generate the track associated with the object. The tracking component 102 may then associate the track with the 2D state information and the 3D state information.

Example Autonomous Vehicle

Figure 19A:
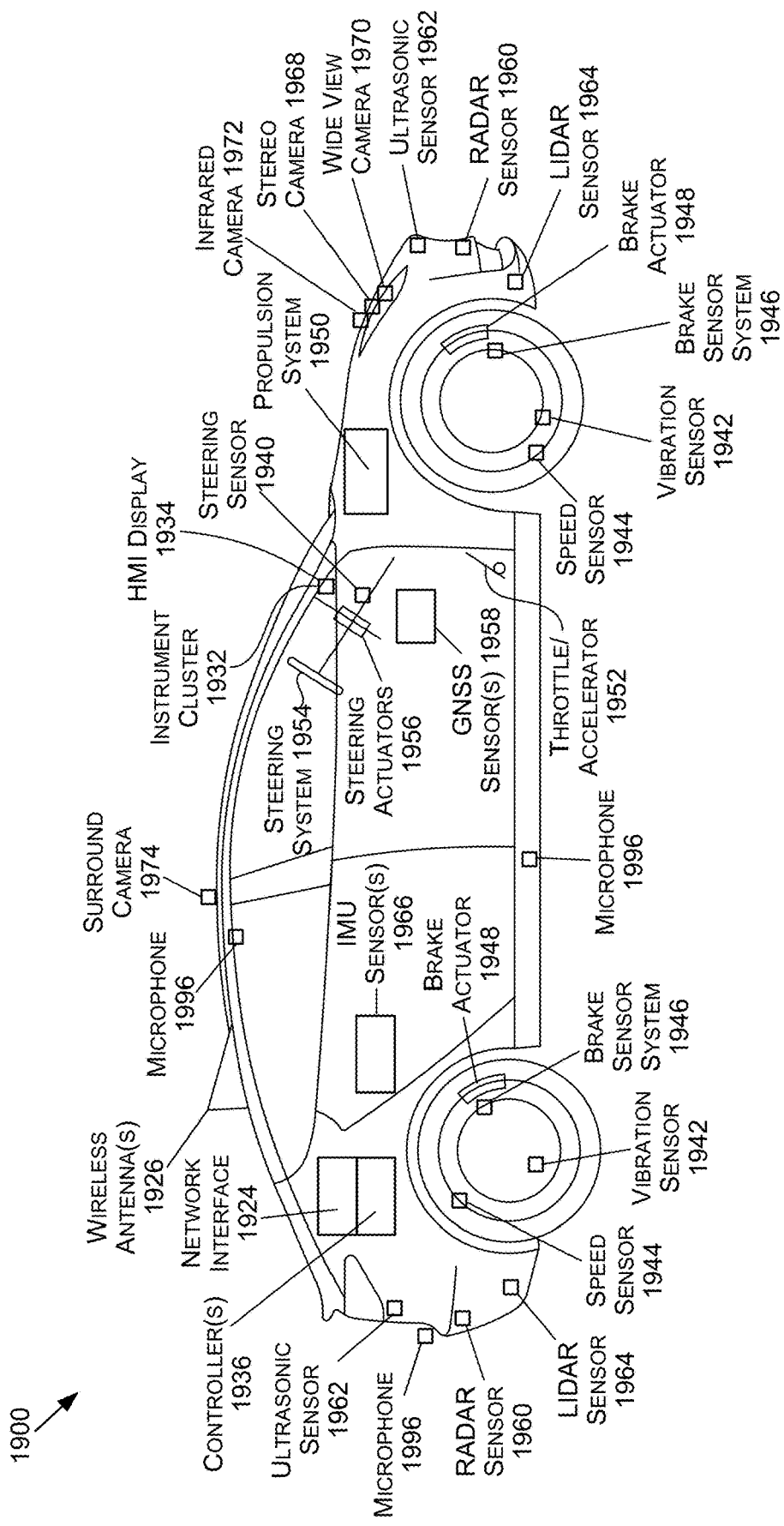
FIG. 19A is an illustration of an example autonomous vehicle, in accordance with some embodiments of the present disclosure.

FIG. 19A is an illustration of an example autonomous vehicle 1900, in accordance with some embodiments of the present disclosure. The autonomous vehicle 1900 (alternatively referred to herein as the "vehicle 1900") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a robotic vehicle, a drone, an airplane, a vehicle coupled to a trailer (e.g., a semi-tractor-trailer truck used for hauling cargo), and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 1900 may be capable of functionality in accordance with one or more of Level 3-Level 5 of the autonomous driving levels. The vehicle 1900 may be capable of functionality in accordance with one or more of Level 1-Level 5 of the autonomous driving levels. For example, the vehicle 1900 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 1900 or other machine, such as being fully autonomous, being highly autonomous, being conditionally autonomous, being partially autonomous, providing assistive autonomy, being semi-autonomous, being primarily autonomous, or other designation.

The vehicle 1900 may include components such as a chassis, a vehicle body, wheels (e.g., 2, 4, 6, 8, 18, etc.), tires, axles, and other components of a vehicle. The vehicle 1900 may include a propulsion system 1950, such as an internal combustion engine, hybrid electric power plant, an all-electric engine, and/or another propulsion system type. The propulsion system 1950 may be connected to a drive train of the vehicle 1900, which may include a transmission, to enable the propulsion of the vehicle 1900. The propulsion system 1950 may be controlled in response to receiving signals from the throttle/accelerator 1952.

A steering system 1954, which may include a steering wheel, may be used to steer the vehicle 1900 (e.g., along a desired path or route) when the propulsion system 1950 is operating (e.g., when the vehicle is in motion). The steering system 1954 may receive signals from a steering actuator 1956. The steering wheel may be optional for full automation (Level 5) functionality.

The brake sensor system 1946 may be used to operate the vehicle brakes in response to receiving signals from the brake actuators 1948 and/or brake sensors.

Controller(s) 1936, which may include one or more system on chips (SoCs) 1904 (FIG. 19C) and/or GPU(s), may provide signals (e.g., representative of commands) to one or more components and/or systems of the vehicle 1900. For example, the controller(s) may send signals to operate the vehicle brakes via one or more brake actuators 1948, to operate the steering system 1954 via one or more steering actuators 1956, to operate the propulsion system 1950 via one or more throttle/accelerators 1952. The controller(s) 1936 may include one or more onboard (e.g., integrated) computing devices (e.g., supercomputers) that process sensor signals, and output operation commands (e.g., signals representing commands) to enable autonomous driving and/or to assist a human driver in driving the vehicle 1900. The controller(s) 1936 may include a first controller 1936 for autonomous driving functions, a second controller 1936 for functional safety functions, a third controller 1936 for artificial intelligence functionality (e.g., computer vision), a fourth controller 1936 for infotainment functionality, a fifth controller 1936 for redundancy in emergency conditions, and/or other controllers. In some examples, a single controller 1936 may handle two or more of the above functionalities, two or more controllers 1936 may handle a single functionality, and/or any combination thereof.

The controller(s) 1936 may provide the signals for controlling one or more components and/or systems of the vehicle 1900 in response to sensor data received from one or more sensors (e.g., sensor inputs). The sensor data may be received from, for example and without limitation, global navigation satellite systems ("GNSS") sensor(s) 1958 (e.g., Global Positioning System sensor(s)), RADAR sensor(s) 1960, ultrasonic sensor(s) 1962, LIDAR sensor(s) 1964, inertial measurement unit (IMU) sensor(s) 1966 (e.g., accelerometer(s), gyroscope(s), magnetic compass(es), magnetometer(s), etc.), microphone(s) 1996, stereo camera(s) 1968, wide-view camera(s) 1970 (e.g., fisheye cameras), infrared camera(s) 1972, surround camera(s) 1974 (e.g., 360 degree cameras), long-range and/or mid-range camera(s) 1998, speed sensor(s) 1944 (e.g., for measuring the speed of the vehicle 1900), vibration sensor(s) 1942, steering sensor(s) 1940, brake sensor(s) (e.g., as part of the brake sensor system 1946), and/or other sensor types.

One or more of the controller(s) 1936 may receive inputs (e.g., represented by input data) from an instrument cluster 1932 of the vehicle 1900 and provide outputs (e.g., represented by output data, display data, etc.) via a human-machine interface (HMI) display 1934, an audible annunciator, a loudspeaker, and/or via other components of the vehicle 1900. The outputs may include information such as vehicle velocity, speed, time, map data (e.g., the High Definition ("HD") map 1922 of FIG. 19C), location data (e.g., the vehicle's 1900 location, such as on a map), direction, location of other vehicles (e.g., an occupancy grid), information about objects and status of objects as perceived by the controller(s) 1936, etc. For example, the HMI display 1934 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 1900 further includes a network interface 1924 which may use one or more wireless antenna(s) 1926 and/or modem(s) to communicate over one or more networks. For example, the network interface 1924 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. The wireless antenna(s) 1926 may also enable communication between objects in the environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Figure 19B:
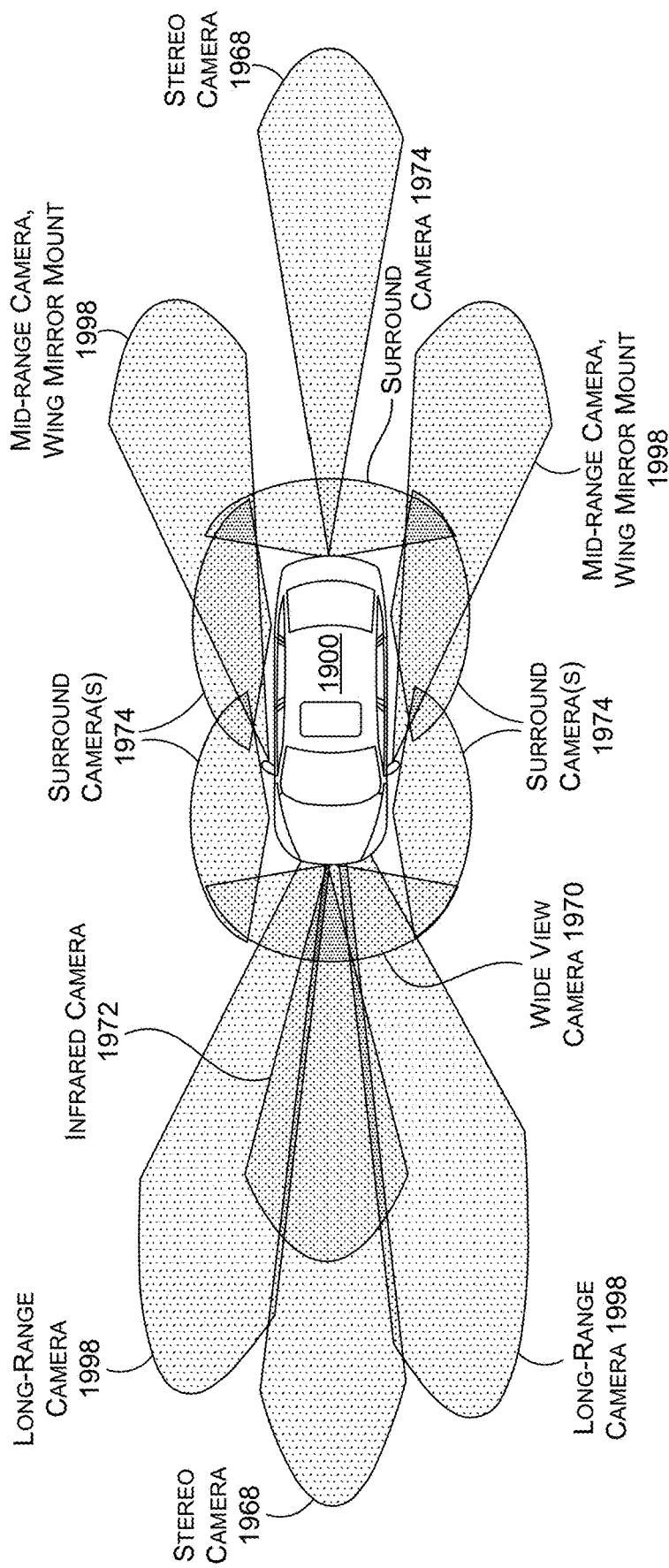
FIG. 19B is an example of camera locations and fields of view for the example autonomous vehicle of FIG. 19A, in accordance with some embodiments of the present disclosure.

FIG. 19B is an example of camera locations and fields of view for the example autonomous vehicle 1900 of FIG. 19A, in accordance with some embodiments of the present disclosure. The cameras and respective fields of view are one example embodiment and are not intended to be limiting. For example, additional and/or alternative cameras may be included and/or the cameras may be located at different locations on the vehicle 1900.

The camera types for the cameras may include, but are not limited to, digital cameras that may be adapted for use with the components and/or systems of the vehicle 1900. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (three dimensional ("3D") printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 1900 (e.g., front-facing cameras) may be used for surround view, to help identify forward facing paths and obstacles, as well aid in, with the help of one or more controllers 1936 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a complementary metal oxide semiconductor ("CMOS") color imager. Another example may be a wide-view camera(s) 1970 that may be used to perceive objects coming into view from the periphery (e.g., pedestrians, crossing traffic or bicycles). Although only one wide-view camera is illustrated in FIG. 19B, there may be any number (including zero) of wide-view cameras 1970 on the vehicle 1900. In addition, any number of long-range camera(s) 1998 (e.g., a long-view stereo camera pair) may be used for depth-based object detection, especially for objects for which a neural network has not yet been trained. The long-range camera(s) 1998 may also be used for object detection and classification, as well as basic object tracking.

Any number of stereo cameras 1968 may also be included in a front-facing configuration. In at least one embodiment, one or more of stereo camera(s) 1968 may include an integrated control unit comprising a scalable processing unit, which may provide a programmable logic ("FPGA") and a multi-core micro-processor with an integrated Controller Area Network ("CAN") or Ethernet interface on a single chip. Such a unit may be used to generate a 3D map of the vehicle's environment, including a distance estimate for all the points in the image. An alternative stereo camera(s) 1968 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 1968 may be used in addition to, or alternatively from, those described herein.

Cameras with a field of view that include portions of the environment to the side of the vehicle 1900 (e.g., side-view cameras) may be used for surround view, providing information used to create and update the occupancy grid, as well as to generate side impact collision warnings. For example, surround camera(s) 1974 (e.g., four surround cameras 1974 as illustrated in FIG. 19B) may be positioned to on the vehicle 1900. The surround camera(s) 1974 may include wide-view camera(s) 1970, fisheye camera(s), 360 degree camera(s), and/or the like. Four example, four fisheye cameras may be positioned on the vehicle's front, rear, and sides. In an alternative arrangement, the vehicle may use three surround camera(s) 1974 (e.g., left, right, and rear), and may leverage one or more other camera(s) (e.g., a forward-facing camera) as a fourth surround view camera.

Cameras with a field of view that include portions of the environment to the rear of the vehicle 1900 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 1998, stereo camera(s) 1968), infrared camera(s) 1972, etc.), as described herein.

Figure 19C:
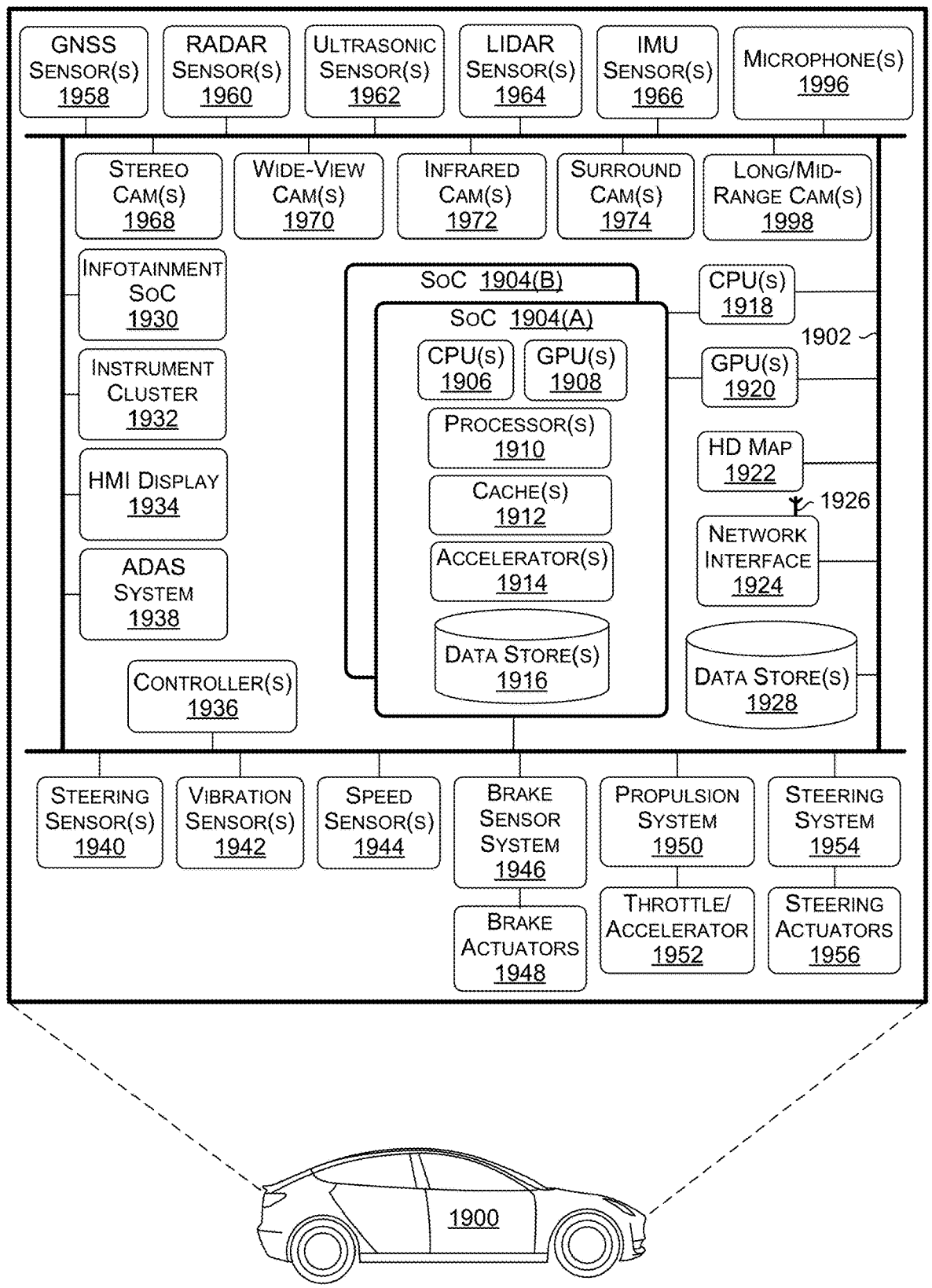
FIG. 19C is a block diagram of an example system architecture for the example autonomous vehicle of FIG. 19A, in accordance with some embodiments of the present disclosure.

FIG. 19C is a block diagram of an example system architecture for the example autonomous vehicle 1900 of FIG. 19A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 1900 in FIG. 19C are illustrated as being connected via bus 1902. The bus 1902 may include a Controller Area Network (CAN) data interface (alternatively referred to herein as a "CAN bus"). A CAN may be a network inside the vehicle 1900 used to aid in control of various features and functionality of the vehicle 1900, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 1902 is described herein as being a CAN bus, this is not intended to be limiting. For example, in addition to, or alternatively from, the CAN bus, FlexRay and/or Ethernet may be used. Additionally, although a single line is used to represent the bus 1902, this is not intended to be limiting. For example, there may be any number of busses 1902, which may include one or more CAN busses, one or more FlexRay busses, one or more Ethernet busses, and/or one or more other types of busses using a different protocol. In some examples, two or more busses 1902 may be used to perform different functions, and/or may be used for redundancy. For example, a first bus 1902 may be used for collision avoidance functionality and a second bus 1902 may be used for actuation control. In any example, each bus 1902 may communicate with any of the components of the vehicle 1900, and two or more busses 1902 may communicate with the same components. In some examples, each SoC 1904, each controller 1936, and/or each computer within the vehicle may have access to the same input data (e.g., inputs from sensors of the vehicle 1900), and may be connected to a common bus, such the CAN bus.

The vehicle 1900 may include one or more controller(s) 1936, such as those described herein with respect to FIG. 19A. The controller(s) 1936 may be used for a variety of functions. The controller(s) 1936 may be coupled to any of the various other components and systems of the vehicle 1900, and may be used for control of the vehicle 1900, artificial intelligence of the vehicle 1900, infotainment for the vehicle 1900, and/or the like.

The vehicle 1900 may include a system(s) on a chip (SoC) 1904. The SoC 1904 may include CPU(s) 1906, GPU(s) 1908, processor(s) 1910, cache(s) 1912, accelerator(s) 1914, data store(s) 1916, and/or other components and features not illustrated. The SoC(s) 1904 may be used to control the vehicle 1900 in a variety of platforms and systems. For example, the SoC(s) 1904 may be combined in a system (e.g., the system of the vehicle 1900) with an HD map 1922 which may obtain map refreshes and/or updates via a network interface 1924 from one or more servers (e.g., server(s) 1978 of FIG. 19D).

The CPU(s) 1906 may include a CPU cluster or CPU complex (alternatively referred to herein as a "CCPLEX"). The CPU(s) 1906 may include multiple cores and/or L2 caches. For example, in some embodiments, the CPU(s) 1906 may include eight cores in a coherent multi-processor configuration. In some embodiments, the CPU(s) 1906 may include four dual-core clusters where each cluster has a dedicated L2 cache (e.g., a 2 MB L2 cache). The CPU(s) 1906 (e.g., the CCPLEX) may be configured to support simultaneous cluster operation enabling any combination of the clusters of the CPU(s) 1906 to be active at any given time.

The CPU(s) 1906 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 1906 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 1908 may include an integrated GPU (alternatively referred to herein as an "iGPU"). The GPU(s) 1908 may be programmable and may be efficient for parallel workloads. The GPU(s) 1908, in some examples, may use an enhanced tensor instruction set. The GPU(s) 1908 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 1908 may include at least eight streaming microprocessors. The GPU(s) 1908 may use compute application programming interface(s) (API(s)). In addition, the GPU(s) 1908 may use one or more parallel computing platforms and/or programming models (e.g., NVIDIA's CUDA).

The GPU(s) 1908 may be power-optimized for best performance in automotive and embedded use cases. For example, the GPU(s) 1908 may be fabricated on a Fin field-effect transistor (FinFET). However, this is not intended to be limiting and the GPU(s) 1908 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 1908 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 1908 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 1908 to access the CPU(s) 1906 page tables directly. In such examples, when the GPU(s) 1908 memory management unit (MMU) experiences a miss, an address translation request may be transmitted to the CPU(s) 1906. In response, the CPU(s) 1906 may look in its page tables for the virtual-to-physical mapping for the address and transmits the translation back to the GPU(s) 1908. As such, unified memory technology may allow a single unified virtual address space for memory of both the CPU(s) 1906 and the GPU(s) 1908, thereby simplifying the GPU(s) 1908 programming and porting of applications to the GPU(s) 1908.

In addition, the GPU(s) 1908 may include an access counter that may keep track of the frequency of access of the GPU(s) 1908 to memory of other processors. The access counter may help ensure that memory pages are moved to the physical memory of the processor that is accessing the pages most frequently.

The SoC(s) 1904 may include any number of cache(s) 1912, including those described herein. For example, the cache(s) 1912 may include an L3 cache that is available to both the CPU(s) 1906 and the GPU(s) 1908 (e.g., that is connected both the CPU(s) 1906 and the GPU(s) 1908). The cache(s) 1912 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 1904 may include an arithmetic logic unit(s) (ALU(s)) which may be leveraged in performing processing with respect to any of the variety of tasks or operations of the vehicle 1900—such as processing DNNs. In addition, the SoC(s) 1904 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 1906 and/or GPU(s) 1908.

The SoC(s) 1904 may include one or more accelerators 1914 (e.g., hardware accelerators, software accelerators, or a combination thereof). For example, the SoC(s) 1904 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 1908 and to off-load some of the tasks of the GPU(s) 1908 (e.g., to free up more cycles of the GPU(s) 1908 for performing other tasks). As an example, the accelerator(s) 1914 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 1914 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 1908, and by using an inference accelerator, for example, a designer may target either the DLA(s) or the GPU(s) 1908 for any function. For example, the designer may focus processing of CNNs and floating point operations on the DLA(s) and leave other functions to the GPU(s) 1908 and/or other accelerator(s) 1914.

The accelerator(s) 1914 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 1906. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 1914 (e.g., the hardware acceleration cluster) may include a computer vision network on-chip and SRAM, for providing a high-bandwidth, low latency SRAM for the accelerator(s) 1914. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 1904 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 1914 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 1966 output that correlates with the vehicle 1900 orientation, distance, 3D location estimates of the object obtained from the neural network and/or other sensors (e.g., LIDAR sensor(s) 1964 or RADAR sensor(s) 1960), among others.

The SoC(s) 1904 may include data store(s) 1916 (e.g., memory). The data store(s) 1916 may be on-chip memory of the SoC(s) 1904, which may store neural networks to be executed on the GPU and/or the DLA. In some examples, the data store(s) 1916 may be large enough in capacity to store multiple instances of neural networks for redundancy and safety. The data store(s) 1912 may comprise L2 or L3 cache(s) 1912. Reference to the data store(s) 1916 may include reference to the memory associated with the PVA, DLA, and/or other accelerator(s) 1914, as described herein.

The SoC(s) 1904 may include one or more processor(s) 1910 (e.g., embedded processors). The processor(s) 1910 may include a boot and power management processor that may be a dedicated processor and subsystem to handle boot power and management functions and related security enforcement. The boot and power management processor may be a part of the SoC(s) 1904 boot sequence and may provide runtime power management services. The boot power and management processor may provide clock and voltage programming, assistance in system low power state transitions, management of SoC(s) 1904 thermals and temperature sensors, and/or management of the SoC(s) 1904 power states. Each temperature sensor may be implemented as a ring-oscillator whose output frequency is proportional to temperature, and the SoC(s) 1904 may use the ring-oscillators to detect temperatures of the CPU(s) 1906, GPU(s) 1908, and/or accelerator(s) 1914. If temperatures are determined to exceed a threshold, the boot and power management processor may enter a temperature fault routine and put the SoC(s) 1904 into a lower power state and/or put the vehicle 1900 into a chauffeur to safe stop mode (e.g., bring the vehicle 1900 to a safe stop).

The processor(s) 1910 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 1910 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 1910 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 1910 may further include a real-time camera engine that may include a dedicated processor subsystem for handling real-time camera management.

The processor(s) 1910 may further include a high-dynamic range signal processor that may include an image signal processor that is a hardware engine that is part of the camera processing pipeline.

The processor(s) 1910 may include a video image compositor that may be a processing block (e.g., implemented on a microprocessor) that implements video post-processing functions needed by a video playback application to produce the final image for the player window. The video image compositor may perform lens distortion correction on wide-view camera(s) 1970, surround camera(s) 1974, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 1908 is not required to continuously render new surfaces. Even when the GPU(s) 1908 is powered on and active doing 3D rendering, the video image compositor may be used to offload the GPU(s) 1908 to improve performance and responsiveness.

The SoC(s) 1904 may further include a mobile industry processor interface (MIPI) camera serial interface for receiving video and input from cameras, a high-speed interface, and/or a video input block that may be used for camera and related pixel input functions. The SoC(s) 1904 may further include an input/output controller(s) that may be controlled by software and may be used for receiving I/O signals that are uncommitted to a specific role.

The SoC(s) 1904 may further include a broad range of peripheral interfaces to enable communication with peripherals, audio codecs, power management, and/or other devices. The SoC(s) 1904 may be used to process data from cameras (e.g., connected over Gigabit Multimedia Serial Link and Ethernet), sensors (e.g., LIDAR sensor(s) 1964, RADAR sensor(s) 1960, etc. that may be connected over Ethernet), data from bus 1902 (e.g., speed of vehicle 1900, steering wheel position, etc.), data from GNSS sensor(s) 1958 (e.g., connected over Ethernet or CAN bus). The SoC(s) 1904 may further include dedicated high-performance mass storage controllers that may include their own DMA engines, and that may be used to free the CPU(s) 1906 from routine data management tasks.

The SoC(s) 1904 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 1904 may be faster, more reliable, and even more energy-efficient and space-efficient than conventional systems. For example, the accelerator(s) 1914, when combined with the CPU(s) 1906, the GPU(s) 1908, and the data store(s) 1916, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 1920) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 1908.

In some examples, a CNN for facial recognition and vehicle owner identification may use data from camera sensors to identify the presence of an authorized driver and/or owner of the vehicle 1900. The always on sensor processing engine may be used to unlock the vehicle when the owner approaches the driver door and turn on the lights, and, in security mode, to disable the vehicle when the owner leaves the vehicle. In this way, the SoC(s) 1904 provide for security against theft and/or carjacking.

In another example, a CNN for emergency vehicle detection and identification may use data from microphones 1996 to detect and identify emergency vehicle sirens. In contrast to conventional systems, that use general classifiers to detect sirens and manually extract features, the SoC(s) 1904 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 1958. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 1962, until the emergency vehicle(s) passes.

The vehicle may include a CPU(s) 1918 (e.g., discrete CPU(s), or dCPU(s)), that may be coupled to the SoC(s) 1904 via a high-speed interconnect (e.g., PCIe). The CPU(s) 1918 may include an X86 processor, for example. The CPU(s) 1918 may be used to perform any of a variety of functions, including arbitrating potentially inconsistent results between ADAS sensors and the SoC(s) 1904, and/or monitoring the status and health of the controller(s) 1936 and/or infotainment SoC 1930, for example.

The vehicle 1900 may include a GPU(s) 1920 (e.g., discrete GPU(s), or dGPU(s)), that may be coupled to the SoC(s) 1904 via a high-speed interconnect (e.g., NVIDIA's NVLINK). The GPU(s) 1920 may provide additional artificial intelligence functionality, such as by executing redundant and/or different neural networks, and may be used to train and/or update neural networks based on input (e.g., sensor data) from sensors of the vehicle 1900.

The vehicle 1900 may further include the network interface 1924 which may include one or more wireless antennas 1926 (e.g., one or more wireless antennas for different communication protocols, such as a cellular antenna, a Bluetooth antenna, etc.). The network interface 1924 may be used to enable wireless connectivity over the Internet with the cloud (e.g., with the server(s) 1978 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 1900 information about vehicles in proximity to the vehicle 1900 (e.g., vehicles in front of, on the side of, and/or behind the vehicle 1900). This functionality may be part of a cooperative adaptive cruise control functionality of the vehicle 1900.

The network interface 1924 may include a SoC that provides modulation and demodulation functionality and enables the controller(s) 1936 to communicate over wireless networks. The network interface 1924 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 1900 may further include data store(s) 1928 which may include off-chip (e.g., off the SoC(s) 1904) storage. The data store(s) 1928 may include one or more storage elements including RAM, SRAM, DRAM, VRAM, Flash, hard disks, and/or other components and/or devices that may store at least one bit of data.

The vehicle 1900 may further include GNSS sensor(s) 1958. The GNSS sensor(s) 1958 (e.g., GPS, assisted GPS sensors, differential GPS (DGPS) sensors, etc.), to assist in mapping, perception, occupancy grid generation, and/or path planning functions. Any number of GNSS sensor(s) 1958 may be used, including, for example and without limitation, a GPS using a USB connector with an Ethernet to Serial (RS-232) bridge.

The vehicle 1900 may further include RADAR sensor(s) 1960. The RADAR sensor(s) 1960 may be used by the vehicle 1900 for long-range vehicle detection, even in darkness and/or severe weather conditions. RADAR functional safety levels may be ASIL B. The RADAR sensor(s) 1960 may use the CAN and/or the bus 1902 (e.g., to transmit data generated by the RADAR sensor(s) 1960) for control and to access object tracking data, with access to Ethernet to access raw data in some examples. A wide variety of RADAR sensor types may be used. For example, and without limitation, the RADAR sensor(s) 1960 may be suitable for front, rear, and side RADAR use. In some example, Pulse Doppler RADAR sensor(s) are used.

The RADAR sensor(s) 1960 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 1960 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 1900 surroundings at higher speeds with minimal interference from traffic in adjacent lanes. The other two antennae may expand the field of view, making it possible to quickly detect vehicles entering or leaving the vehicle's 1900 lane.

Mid-range RADAR systems may include, as an example, a range of up to 1960 m (front) or 80 m (rear), and a field of view of up to 42 degrees (front) or 1950 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 1900 may further include ultrasonic sensor(s) 1962. The ultrasonic sensor(s) 1962, which may be positioned at the front, back, and/or the sides of the vehicle 1900, may be used for park assist and/or to create and update an occupancy grid. A wide variety of ultrasonic sensor(s) 1962 may be used, and different ultrasonic sensor(s) 1962 may be used for different ranges of detection (e.g., 2.5 m, 4 m). The ultrasonic sensor(s) 1962 may operate at functional safety levels of ASIL B.

The vehicle 1900 may include LIDAR sensor(s) 1964. The LIDAR sensor(s) 1964 may be used for object and pedestrian detection, emergency braking, collision avoidance, and/or other functions. The LIDAR sensor(s) 1964 may be functional safety level ASIL B. In some examples, the vehicle 1900 may include multiple LIDAR sensors 1964 (e.g., two, four, six, etc.) that may use Ethernet (e.g., to provide data to a Gigabit Ethernet switch).

In some examples, the LIDAR sensor(s) 1964 may be capable of providing a list of objects and their distances for a 360-degree field of view. Commercially available LIDAR sensor(s) 1964 may have an advertised range of approximately 1900 m, with an accuracy of 2 cm-3 cm, and with support for a 1900 Mbps Ethernet connection, for example.

In some examples, one or more non-protruding LIDAR sensors 1964 may be used. In such examples, the LIDAR sensor(s) 1964 may be implemented as a small device that may be embedded into the front, rear, sides, and/or corners of the vehicle 1900. The LIDAR sensor(s) 1964, in such examples, may provide up to a 120-degree horizontal and 35-degree vertical field-of-view, with a 200 m range even for low-reflectivity objects. Front-mounted LIDAR sensor(s) 1964 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 1900. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 1964 may be less susceptible to motion blur, vibration, and/or shock.

The vehicle may further include IMU sensor(s) 1966. The IMU sensor(s) 1966 may be located at a center of the rear axle of the vehicle 1900, in some examples. The IMU sensor(s) 1966 may include, for example and without limitation, an accelerometer(s), a magnetometer(s), a gyroscope(s), a magnetic compass(es), and/or other sensor types. In some examples, such as in six-axis applications, the IMU sensor(s) 1966 may include accelerometers and gyroscopes, while in nine-axis applications, the IMU sensor(s) 1966 may include accelerometers, gyroscopes, and magnetometers.

In some embodiments, the IMU sensor(s) 1966 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 1966 may enable the vehicle 1900 to estimate heading without requiring input from a magnetic sensor by directly observing and correlating the changes in velocity from GPS to the IMU sensor(s) 1966. In some examples, the IMU sensor(s) 1966 and the GNSS sensor(s) 1958 may be combined in a single integrated unit.

The vehicle may include microphone(s) 1996 placed in and/or around the vehicle 1900. The microphone(s) 1996 may be used for emergency vehicle detection and identification, among other things.

The vehicle may further include any number of camera types, including stereo camera(s) 1968, wide-view camera(s) 1970, infrared camera(s) 1972, surround camera(s) 1974, long-range and/or mid-range camera(s) 1998, and/or other camera types. The cameras may be used to capture image data around an entire periphery of the vehicle 1900. The types of cameras used depends on the embodiments and requirements for the vehicle 1900, and any combination of camera types may be used to provide the necessary coverage around the vehicle 1900. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 19A and FIG. 19B.

The vehicle 1900 may further include vibration sensor(s) 1942. The vibration sensor(s) 1942 may measure vibrations of components of the vehicle, such as the axle(s). For example, changes in vibrations may indicate a change in road surfaces. In another example, when two or more vibration sensors 1942 are used, the differences between the vibrations may be used to determine friction or slippage of the road surface (e.g., when the difference in vibration is between a power-driven axle and a freely rotating axle).

The vehicle 1900 may include an ADAS system 1938. The ADAS system 1938 may include a SoC, in some examples. The ADAS system 1938 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 1960, LIDAR sensor(s) 1964, and/or a camera(s). The ACC systems may include longitudinal ACC and/or lateral ACC. Longitudinal ACC monitors and controls the distance to the vehicle immediately ahead of the vehicle 1900 and automatically adjust the vehicle speed to maintain a safe distance from vehicles ahead. Lateral ACC performs distance keeping, and advises the vehicle 1900 to change lanes when necessary. Lateral ACC is related to other ADAS applications such as LCA and CWS.

CACC uses information from other vehicles that may be received via the network interface 1924 and/or the wireless antenna(s) 1926 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 1900), while the I2V communication concept provides information about traffic further ahead. CACC systems may include either or both I2V and V2V information sources. Given the information of the vehicles ahead of the vehicle 1900, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 1960, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 1960, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 1900 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 1900 if the vehicle 1900 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 1960, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 1900 is backing up. Some RCTW systems include AEB to ensure that the vehicle brakes are applied to avoid a crash. RCTW systems may use one or more rear-facing RADAR sensor(s) 1960, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 1900, the vehicle 1900 itself must, in the case of conflicting results, decide whether to heed the result from a primary computer or a secondary computer (e.g., a first controller 1936 or a second controller 1936). For example, in some embodiments, the ADAS system 1938 may be a backup and/or secondary computer for providing perception information to a backup computer rationality module. The backup computer rationality monitor may run a redundant diverse software on hardware components to detect faults in perception and dynamic driving tasks. Outputs from the ADAS system 1938 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 1904.

In other examples, ADAS system 1938 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 1938 may be fed into the primary computer's perception block and/or the primary computer's dynamic driving task block. For example, if the ADAS system 1938 indicates a forward crash warning due to an object immediately ahead, the perception block may use this information when identifying objects. In other examples, the secondary computer may have its own neural network which is trained and thus reduces the risk of false positives, as described herein.

The vehicle 1900 may further include the infotainment SoC 1930 (e.g., an in-vehicle infotainment system (IVI)). Although illustrated and described as a SoC, the infotainment system may not be a SoC, and may include two or more discrete components. The infotainment SoC 1930 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 1900. For example, the infotainment SoC 1930 may radios, disk players, navigation systems, video players, USB and Bluetooth connectivity, carputers, in-car entertainment, Wi-Fi, steering wheel audio controls, hands free voice control, a heads-up display (HUD), an HMI display 1934, a telematics device, a control panel (e.g., for controlling and/or interacting with various components, features, and/or systems), and/or other components. The infotainment SoC 1930 may further be used to provide information (e.g., visual and/or audible) to a user(s) of the vehicle, such as information from the ADAS system 1938, autonomous driving information such as planned vehicle maneuvers, trajectories, surrounding environment information (e.g., intersection information, vehicle information, road information, etc.), and/or other information.

The infotainment SoC 1930 may include GPU functionality. The infotainment SoC 1930 may communicate over the bus 1902 (e.g., CAN bus, Ethernet, etc.) with other devices, systems, and/or components of the vehicle 1900. In some examples, the infotainment SoC 1930 may be coupled to a supervisory MCU such that the GPU of the infotainment system may perform some self-driving functions in the event that the primary controller(s) 1936 (e.g., the primary and/or backup computers of the vehicle 1900) fail. In such an example, the infotainment SoC 1930 may put the vehicle 1900 into a chauffeur to safe stop mode, as described herein.

The vehicle 1900 may further include an instrument cluster 1932 (e.g., a digital dash, an electronic instrument cluster, a digital instrument panel, etc.). The instrument cluster 1932 may include a controller and/or supercomputer (e.g., a discrete controller or supercomputer). The instrument cluster 1932 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 1930 and the instrument cluster 1932. In other words, the instrument cluster 1932 may be included as part of the infotainment SoC 1930, or vice versa.

Figure 19D:
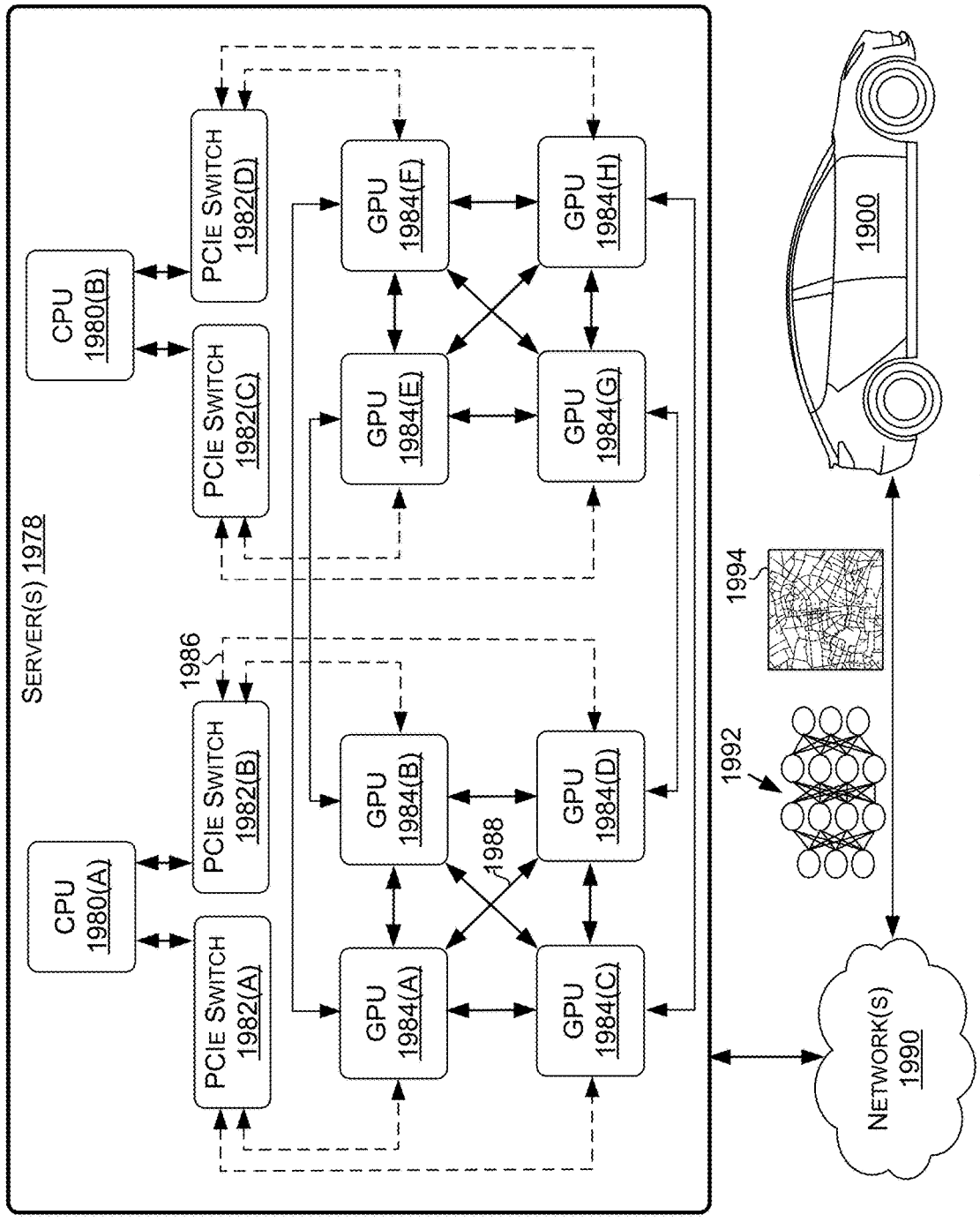
FIG. 19D is a system diagram for communication between cloud-based server(s) and the example autonomous vehicle of FIG. 19A, in accordance with some embodiments of the present disclosure.

FIG. 19D is a system diagram for communication between cloud-based server(s) and the example autonomous vehicle 1900 of FIG. 19A, in accordance with some embodiments of the present disclosure. The system 1976 may include server(s) 1978, network(s) 1990, and vehicles, including the vehicle 1900. The server(s) 1978 may include a plurality of GPUs 1984(A)-1984(H) (collectively referred to herein as GPUs 1984), PCIe switches 1982(A)-1982(H) (collectively referred to herein as PCIe switches 1982), and/or CPUs 1980(A)-1980(B) (collectively referred to herein as CPUs 1980). The GPUs 1984, the CPUs 1980, and the PCIe switches may be interconnected with high-speed interconnects such as, for example and without limitation, NVLink interfaces 1988 developed by NVIDIA and/or PCIe connections 1986. In some examples, the GPUs 1984 are connected via NVLink and/or NVSwitch SoC and the GPUs 1984 and the PCIe switches 1982 are connected via PCIe interconnects. Although eight GPUs 1984, two CPUs 1980, and two PCIe switches are illustrated, this is not intended to be limiting. Depending on the embodiment, each of the server(s) 1978 may include any number of GPUs 1984, CPUs 1980, and/or PCIe switches. For example, the server(s) 1978 may each include eight, sixteen, thirty-two, and/or more GPUs 1984.

The server(s) 1978 may receive, over the network(s) 1990 and from the vehicles, image data representative of images showing unexpected or changed road conditions, such as recently commenced road-work. The server(s) 1978 may transmit, over the network(s) 1990 and to the vehicles, neural networks 1992, updated neural networks 1992, and/or map information 1994, including information regarding traffic and road conditions. The updates to the map information 1994 may include updates for the HD map 1922, such as information regarding construction sites, potholes, detours, flooding, and/or other obstructions. In some examples, the neural networks 1992, the updated neural networks 1992, and/or the map information 1994 may have resulted from new training and/or experiences represented in data received from any number of vehicles in the environment, and/or based on training performed at a datacenter (e.g., using the server(s) 1978 and/or other servers).

The server(s) 1978 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 1990, and/or the machine learning models may be used by the server(s) 1978 to remotely monitor the vehicles.

In some examples, the server(s) 1978 may receive data from the vehicles and apply the data to up-to-date real-time neural networks for real-time intelligent inferencing. The server(s) 1978 may include deep-learning supercomputers and/or dedicated AI computers powered by GPU(s) 1984, such as a DGX and DGX Station machines developed by NVIDIA. However, in some examples, the server(s) 1978 may include deep learning infrastructure that use only CPU-powered datacenters.

The deep-learning infrastructure of the server(s) 1978 may be capable of fast, real-time inferencing, and may use that capability to evaluate and verify the health of the processors, software, and/or associated hardware in the vehicle 1900. For example, the deep-learning infrastructure may receive periodic updates from the vehicle 1900, such as a sequence of images and/or objects that the vehicle 1900 has located in that sequence of images (e.g., via computer vision and/or other machine learning object classification techniques). The deep-learning infrastructure may run its own neural network to identify the objects and compare them with the objects identified by the vehicle 1900 and, if the results do not match and the infrastructure concludes that the AI in the vehicle 1900 is malfunctioning, the server(s) 1978 may transmit a signal to the vehicle 1900 instructing a fail-safe computer of the vehicle 1900 to assume control, notify the passengers, and complete a safe parking maneuver.

For inferencing, the server(s) 1978 may include the GPU(s) 1984 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 20:
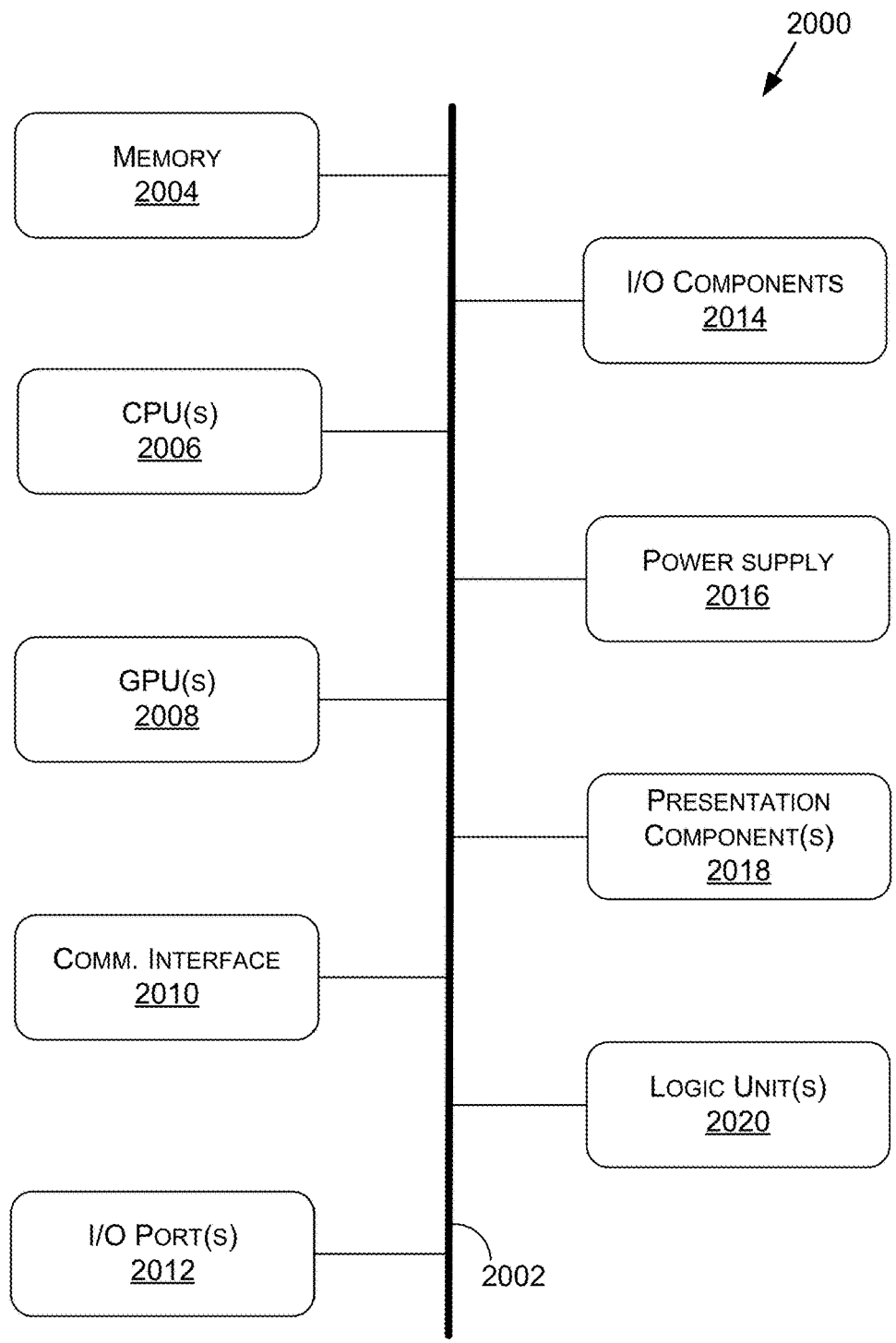
FIG. 20 is a block diagram of an example computing device suitable for use in implementing some embodiments of the present disclosure.

FIG. 20 is a block diagram of an example computing device(s) 2000 suitable for use in implementing some embodiments of the present disclosure. Computing device 2000 may include an interconnect system 2002 that directly or indirectly couples the following devices: memory 2004, one or more central processing units (CPUs) 2006, one or more graphics processing units (GPUs) 2008, a communication interface 2010, input/output (I/O) ports 2012, input/output components 2014, a power supply 2016, one or more presentation components 2018 (e.g., display(s)), and one or more logic units 2020. In at least one embodiment, the computing device(s) 2000 may comprise one or more virtual machines (VMs), and/or any of the components thereof may comprise virtual components (e.g., virtual hardware components). For non-limiting examples, one or more of the GPUs 2008 may comprise one or more vGPUs, one or more of the CPUs 2006 may comprise one or more vCPUs, and/or one or more of the logic units 2020 may comprise one or more virtual logic units. As such, a computing device(s) 2000 may include discrete components (e.g., a full GPU dedicated to the computing device 2000), virtual components (e.g., a portion of a GPU dedicated to the computing device 2000), or a combination thereof.

Although the various blocks of FIG. 20 are shown as connected via the interconnect system 2002 with lines, this is not intended to be limiting and is for clarity only. For example, in some embodiments, a presentation component 2018, such as a display device, may be considered an I/O component 2014 (e.g., if the display is a touch screen). As another example, the CPUs 2006 and/or GPUs 2008 may include memory (e.g., the memory 2004 may be representative of a storage device in addition to the memory of the GPUs 2008, the CPUs 2006, and/or other components). In other words, the computing device of FIG. 20 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 20.

The interconnect system 2002 may represent one or more links or busses, such as an address bus, a data bus, a control bus, or a combination thereof. The interconnect system 2002 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 2006 may be directly connected to the memory 2004. Further, the CPU 2006 may be directly connected to the GPU 2008. Where there is direct, or point-to-point connection between components, the interconnect system 2002 may include a PCIe link to carry out the connection. In these examples, a PCI bus need not be included in the computing device 2000.

The memory 2004 may include any of a variety of computer-readable media. The computer-readable media may be any available media that may be accessed by the computing device 2000. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 2004 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 2000. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its parameters set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 2006 may be configured to execute at least some of the computer-readable instructions to control one or more components of the computing device 2000 to perform one or more of the methods and/or processes described herein. The CPU(s) 2006 may each include one or more cores (e.g., one, two, four, eight, twenty-eight, seventy-two, etc.) that are capable of handling a multitude of software threads simultaneously. The CPU(s) 2006 may include any type of processor, and may include different types of processors depending on the type of computing device 2000 implemented (e.g., processors with fewer cores for mobile devices and processors with more cores for servers). For example, depending on the type of computing device 2000, the processor may be an Advanced RISC Machines (ARM) processor implemented using Reduced Instruction Set Computing (RISC) or an x86 processor implemented using Complex Instruction Set Computing (CISC). The computing device 2000 may include one or more CPUs 2006 in addition to one or more microprocessors or supplementary co-processors, such as math co-processors.

In addition to or alternatively from the CPU(s) 2006, the GPU(s) 2008 may be configured to execute at least some of the computer-readable instructions to control one or more components of the computing device 2000 to perform one or more of the methods and/or processes described herein. One or more of the GPU(s) 2008 may be an integrated GPU (e.g., with one or more of the CPU(s) 2006 and/or one or more of the GPU(s) 2008 may be a discrete GPU. In embodiments, one or more of the GPU(s) 2008 may be a coprocessor of one or more of the CPU(s) 2006. The GPU(s) 2008 may be used by the computing device 2000 to render graphics (e.g., 3D graphics) or perform general purpose computations. For example, the GPU(s) 2008 may be used for General-Purpose computing on GPUs (GPGPU). The GPU(s) 2008 may include hundreds or thousands of cores that are capable of handling hundreds or thousands of software threads simultaneously. The GPU(s) 2008 may generate pixel data for output images in response to rendering commands (e.g., rendering commands from the CPU(s) 2006 received via a host interface). The GPU(s) 2008 may include graphics memory, such as display memory, for storing pixel data or any other suitable data, such as GPGPU data. The display memory may be included as part of the memory 2004. The GPU(s) 2008 may include two or more GPUs operating in parallel (e.g., via a link). The link may directly connect the GPUs (e.g., using NVLINK) or may connect the GPUs through a switch (e.g., using NVSwitch). When combined together, each GPU 2008 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 2006 and/or the GPU(s) 2008, the logic unit(s) 2020 may be configured to execute at least some of the computer-readable instructions to control one or more components of the computing device 2000 to perform one or more of the methods and/or processes described herein. In embodiments, the CPU(s) 2006, the GPU(s) 2008, and/or the logic unit(s) 2020 may discretely or jointly perform any combination of the methods, processes and/or portions thereof. One or more of the logic units 2020 may be part of and/or integrated in one or more of the CPU(s) 2006 and/or the GPU(s) 2008 and/or one or more of the logic units 2020 may be discrete components or otherwise external to the CPU(s) 2006 and/or the GPU(s) 2008. In embodiments, one or more of the logic units 2020 may be a coprocessor of one or more of the CPU(s) 2006 and/or one or more of the GPU(s) 2008.

Examples of the logic unit(s) 2020 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 2010 may include one or more receivers, transmitters, and/or transceivers that enable the computing device 2000 to communicate with other computing devices via an electronic communication network, included wired and/or wireless communications. The communication interface 2010 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 2020 and/or communication interface 2010 may include one or more data processing units (DPUs) to transmit data received over a network and/or through interconnect system 2002 directly to (e.g., a memory of) one or more GPU(s) 2008.

The I/O ports 2012 may enable the computing device 2000 to be logically coupled to other devices including the I/O components 2014, the presentation component(s) 2018, and/or other components, some of which may be built in to (e.g., integrated in) the computing device 2000. Illustrative I/O components 2014 include a microphone, mouse, keyboard, joystick, game pad, game controller, satellite dish, scanner, printer, wireless device, etc. The I/O components 2014 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 2000. The computing device 2000 may be include depth cameras, such as stereoscopic camera systems, infrared camera systems, RGB camera systems, touchscreen technology, and combinations of these, for gesture detection and recognition. Additionally, the computing device 2000 may include accelerometers or gyroscopes (e.g., as part of an inertia measurement unit (IMU)) that enable detection of motion. In some examples, the output of the accelerometers or gyroscopes may be used by the computing device 2000 to render immersive augmented reality or virtual reality.

The power supply 2016 may include a hard-wired power supply, a battery power supply, or a combination thereof. The power supply 2016 may provide power to the computing device 2000 to enable the components of the computing device 2000 to operate.

The presentation component(s) 2018 may include a display (e.g., a monitor, a touch screen, a television screen, a heads-up-display (HUD), other display types, or a combination thereof), speakers, and/or other presentation components. The presentation component(s) 2018 may receive data from other components (e.g., the GPU(s) 2008, the CPU(s) 2006, DPUs, etc.), and output the data (e.g., as an image, video, sound, etc.).

Example Data Center

Figure 21:
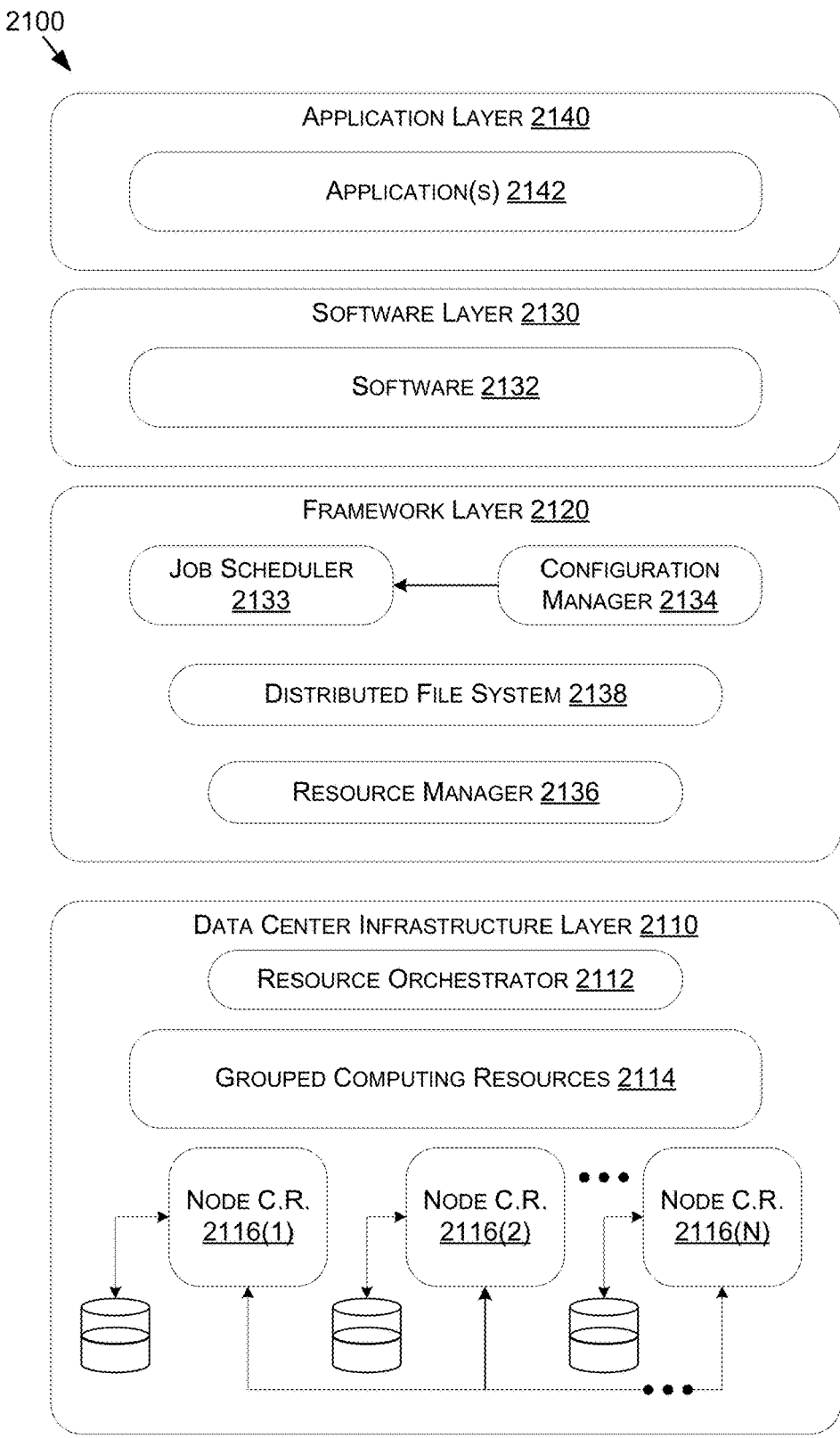
FIG. 21 is a block diagram of an example data center suitable for use in implementing some embodiments of the present disclosure.

FIG. 21 illustrates an example data center 2100 that may be used in at least one embodiments of the present disclosure. The data center 2100 may include a data center infrastructure layer 2110, a framework layer 2120, a software layer 2130, and/or an application layer 2140.

As shown in FIG. 21, the data center infrastructure layer 2110 may include a resource orchestrator 2112, grouped computing resources 2114, and node computing resources ("node C.R.s") 2116(1)-2116(N), where "N" represents any whole, positive integer. In at least one embodiment, node C.R.s 2116(1)-2116(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 2116(1)-2116(N) may correspond to a server having one or more of the above-mentioned computing resources. In addition, in some embodiments, the node C.R.s 2116(1)-21161(N) may include one or more virtual components, such as vGPUs, vCPUs, and/or the like, and/or one or more of the node C.R.s 2116(1)-2116(N) may correspond to a virtual machine (VM).

In at least one embodiment, grouped computing resources 2114 may include separate groupings of node C.R.s 2116 housed within one or more racks (not shown), or many racks housed in data centers at various geographical locations (also not shown). Separate groupings of node C.R.s 2116 within grouped computing resources 2114 may include grouped compute, network, memory or storage resources that may be configured or allocated to support one or more workloads. In at least one embodiment, several node C.R.s 2116 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 2112 may configure or otherwise control one or more node C.R.s 2116(1)-2116(N) and/or grouped computing resources 2114. In at least one embodiment, resource orchestrator 2112 may include a software design infrastructure (SDI) management entity for the data center 2100. The resource orchestrator 2112 may include hardware, software, or some combination thereof.

In at least one embodiment, as shown in FIG. 21, framework layer 2120 may include a job scheduler 2133, a configuration manager 2134, a resource manager 2136, and/or a distributed file system 2138. The framework layer 2120 may include a framework to support software 2132 of software layer 2130 and/or one or more application(s) 2142 of application layer 2140. The software 2132 or application(s) 2142 may respectively include web-based service software or applications, such as those provided by Amazon Web Services, Google Cloud and Microsoft Azure. The framework layer 2120 may be, but is not limited to, a type of free and open-source software web application framework such as Apache Spark™ (hereinafter "Spark") that may utilize distributed file system 2138 for large-scale data processing (e.g., "big data"). In at least one embodiment, job scheduler 2133 may include a Spark driver to facilitate scheduling of workloads supported by various layers of data center 2100. The configuration manager 2134 may be capable of configuring different layers such as software layer 2130 and framework layer 2120 including Spark and distributed file system 2138 for supporting large-scale data processing. The resource manager 2136 may be capable of managing clustered or grouped computing resources mapped to or allocated for support of distributed file system 2138 and job scheduler 2133. In at least one embodiment, clustered or grouped computing resources may include grouped computing resource 2114 at data center infrastructure layer 2110. The resource manager 2136 may coordinate with resource orchestrator 2112 to manage these mapped or allocated computing resources.

In at least one embodiment, software 2132 included in software layer 2130 may include software used by at least portions of node C.R.s 2116(1)-2116(N), grouped computing resources 2114, and/or distributed file system 2138 of framework layer 2120. One or more types of software may include, but are not limited to, Internet web page search software, e-mail virus scan software, database software, and streaming video content software.

In at least one embodiment, application(s) 2142 included in application layer 2140 may include one or more types of applications used by at least portions of node C.R.s 2116(1)-2116(N), grouped computing resources 2114, and/or distributed file system 2138 of framework layer 2120. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 2134, resource manager 2136, and resource orchestrator 2112 may implement any number and type of self-modifying actions based on any amount and type of data acquired in any technically feasible fashion. Self-modifying actions may relieve a data center operator of data center 2100 from making possibly bad configuration decisions and possibly avoiding underutilized and/or poor performing portions of a data center.

The data center 2100 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 2100. In at least one embodiment, trained or deployed machine learning models corresponding to one or more neural networks may be used to infer or predict information using resources described above with respect to the data center 2100 by using weight parameters calculated through one or more training techniques, such as but not limited to those described herein.

In at least one embodiment, the data center 2100 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 2000 of FIG. 20—e.g., each device may include similar components, features, and/or functionality of the computing device(s) 2000. In addition, where backend devices (e.g., servers, NAS, etc.) are implemented, the backend devices may be included as part of a data center 2100, an example of which is described in more detail herein with respect to FIG. 21.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 2000 described herein with respect to FIG. 20. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
   determining, based at least on sensor data obtained using a machine, a plurality of objects for tracking;
   determining whether a number of objects included in the plurality of objects is equal to or greater than a threshold number of objects;
   one of:
      based at least on the number of objects being less than the threshold number of objects, performing tracking with respect to the plurality of objects; or
      based at least on the number of objects being equal to or greater than the threshold number of objects, determining one or more values of one or more parameters associated with the plurality of objects and performing the tracking with respect to a portion of the plurality of objects based at least on the one or more values; and
   causing the machine to navigate based at least on the tracking.

2. The method of claim 1, wherein the performing the tracking with respect to the portion of the plurality of values comprises:
   determining, based at least on the one or more values, one or more scores for the plurality of objects;
   determining, based at least on the one or more scores, the portion of the plurality of objects; and
   performing the tracking with respect to the portion of the plurality of objects.

3. The method of claim 2, wherein the determining the portion of the plurality of objects comprises:
   determining the threshold number of objects from the plurality of objects that are associated with highest scores from the one or more scores; and
   determining that the portion of the plurality of objects includes the threshold number of objects from the plurality of objects.

4. The method of claim 1, wherein the one or more parameters associated with the plurality of objects comprise one or more of:
   classifications associated with the plurality of objects;
   distances to the plurality of objects;
   directions of travel of the plurality of objects;
   confidences corresponding to the plurality of objects; or
   times-to-collision estimates associated with the plurality of objects.

5. The method of claim 1, further comprising:
   determining that an object, from a second portion of the plurality of objects, is associated with a track; and
   based at least on the portion of the plurality of objects not including the object, determining to terminate the track associated with the object.

6. The method of claim 1, further comprising:
   determining that an object, from the portion of the plurality of objects, is not associated with a track; and
   based at least on the portion of the plurality of objects including the object, determining to create the track associated with the object.

7. The method of claim 1, further comprising:
   determining that an object, from the portion of the plurality of objects, is associated with a track; and
   based at least on the portion of the plurality of objects including the object, updating state information for the track associated with the object.

8. The method of claim 1, further comprising, based at least on the number of objects being less than the threshold number of objects, refraining from determining the one or more values of the one or more parameters associated with the plurality of objects.

9. A system comprising:
   one or more processors to:
      determine, based at least on sensor data obtained using a machine, a plurality of objects for tracking;
      determine that a number of objects associated with the plurality of objects is equal to or greater than a threshold number;
      determine, based at least on the number of objects being equal to or greater than the threshold number, one or more scores associated with the plurality of objects; and
      determine, based at least on the one or more scores, one or more objects from the plurality of objects for tracking.

10. The system of claim 9, wherein the one or more processors are further to:
    determine one or more values of one or more parameters associated with the plurality of objects,
    wherein the one or more scores associated with the plurality of objects are determined based at least on the one or more values.

11. The system of claim 10, wherein the one or more parameters associated with the plurality of objects comprise one or more of:
- classifications associated with the plurality of objects;
- distances to the plurality of objects;
- directions of travel of the plurality of objects;
- confidences associated with the plurality of objects; or
- times-to-collision estimates associated with the plurality of objects.

12. The system of claim 9, wherein the determination of the one or more objects from the plurality of objects for tracking comprises:
- determining the threshold number of objects from the plurality of objects that are associated with highest scores from the one or more scores; and
- determining that the one or more objects from the plurality of objects include the threshold number of the objects.

13. The system of claim 9, wherein the one or more processors are further to:
- determine that an object, from one or more second objects from the plurality of objects, is associated with a track; and
- based at least on the object being from the one or more second objects, determine to terminate the track associated with the object.

14. The system of claim 9, wherein the one or more processors are further to:
- determine that an object, from the one or more objects from the plurality of objects, is not associated with a track; and
- based at least on the one or more objects from the plurality of objects including the object, determine to create the track associated with the object.

15. The system of claim 9, wherein the sensor data is obtained using the machine at a first time, and wherein the one or more processors are further to:
- determine, based at least on second sensor data obtained using the machine at a second time, one or more second objects for tracking;
- determine that a second number of objects associated with the one or more second objects is less than the threshold number of objects; and
- based at least on the second number of objects being less than the threshold number of objects, refrain from determining one or more second scores associated with the one or more second objects.

16. The system of claim 9, wherein:
- the one or more scores are determined, at least, using one or more components of the machine; and
- the one or more processors are further to:
  - activate, based at least on the number of objects being equal to or greater than the threshold number of objects, the one or more components.

17. The system of claim 9, wherein the system is comprised in at least one of:
- a control system for an autonomous or semi-autonomous machine;
- a perception system for an autonomous or semi-autonomous machine;
- a system for performing simulation operations;
- a system for performing digital twin operations;
- a system for performing light transport simulation;
- a system for performing collaborative content creation for 3D assets;
- a system for generating or presenting at least one of mixed reality content, virtual reality content, or augmented reality content;
- a system for performing deep learning operations;
- a system implemented using an edge device;
- a system implemented using a robot;
- a system for performing conversational AI operations;
- a system for generating synthetic data;
- a system incorporating one or more virtual machines (VMs);
- a system implemented at least partially in a data center; or
- a system implemented at least partially using cloud computing resources.

18. One or more processors comprising processing circuitry to:
- determine, based at least on first sensor data obtained using a machine at a first time, a first number of objects for tracking;
- based at least on the first number of objects being less than a threshold number of objects, determining to track the first number of objects;
- determine, based at least on second sensor data obtained using the machine at a second time, a second number of objects for tracking; and
- based at least on the second number of objects being equal to or greater than the threshold number of objects, determine one or more scores associated with the second number of objects and use the one or more scores to track a portion of the second number of objects.

19. The one or more processors of claim 18, wherein the one or more processors are comprised in at least one of:
- a control system for an autonomous or semi-autonomous machine;
- a perception system for an autonomous or semi-autonomous machine;
- a system for performing simulation operations;
- a system for performing digital twin operations;
- a system for performing light transport simulation;
- a system for performing collaborative content creation for 3D assets;
- a system for generating or presenting at least one of mixed reality content, virtual reality content, or augmented reality content;
- a system for performing deep learning operations;
- a system implemented using an edge device;
- a system implemented using a robot;
- a system for performing conversational AI operations;
- a system for generating synthetic data;
- a system incorporating one or more virtual machines (VMs);
- a system implemented at least partially in a data center; or
- a system implemented at least partially using cloud computing resources.

20. The one or more processors of claim 18, wherein the processing circuitry is further to, based at least on the first number of objects being less than the threshold number of objects, refrain from determining one or more second scores associated with the first number of objects.

* * * * *